United States Patent
Shin et al.

(10) Patent No.: US 10,495,849 B2
(45) Date of Patent: Dec. 3, 2019

(54) OPTICAL LENS ASSEMBLY AND APPARATUS HAVING THE SAME

(71) Applicant: Samsung Electronics Co., Ltd., Gyeonggi-do (KR)

(72) Inventors: Jeong-kil Shin, Gyeonggi-do (KR); Byung-kwon Kang, Gyeonggi-do (KR); Han-eung Kim, Gyeonggi-do (KR); Hyun-jun Shin, Gyeonggi-do (KR); Liefeng Zhao, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 35 days.

(21) Appl. No.: 15/407,323

(22) Filed: Jan. 17, 2017

(65) Prior Publication Data
US 2017/0235109 A1 Aug. 17, 2017

(30) Foreign Application Priority Data
Feb. 17, 2016 (KR) .................. 10-2016-0018456

(51) Int. Cl.
| | | |
|---|---|---|
| *G02B 13/18* | (2006.01) | |
| *G02B 3/02* | (2006.01) | |
| *G02B 13/00* | (2006.01) | |
| *G02B 9/64* | (2006.01) | |
| *G02B 9/62* | (2006.01) | |

(Continued)

(52) U.S. Cl.
CPC ........... *G02B 13/0045* (2013.01); *G02B 9/34* (2013.01); *G02B 9/60* (2013.01); *G02B 9/62* (2013.01); *G02B 9/64* (2013.01); *G02B 13/004* (2013.01)

(58) Field of Classification Search
CPC ........ G02B 13/0045; G02B 9/34; G02B 9/60; G02B 9/64; G02B 13/004; G02B 9/62; G02B 13/002; G02B 13/0015; G02B 13/0055; G02B 13/0075
See application file for complete search history.

(56) References Cited

U.S. PATENT DOCUMENTS

| 4,155,626 A | 5/1979 | Grech |
|---|---|---|
| 8,116,014 B2 | 2/2012 | Taniyama |

(Continued)

FOREIGN PATENT DOCUMENTS

| CN | 101963693 A | 2/2011 |
|---|---|---|
| EP | 1 258 743 A2 | 11/2002 |

(Continued)

OTHER PUBLICATIONS

International Search Report dated May 18, 2017.
International Search Report dated Nov. 29, 2018.
European Search Report dated May 31, 2019.

*Primary Examiner* — Alicia M Harrington
(74) *Attorney, Agent, or Firm* — Cha & Reiter, LLC.

(57) ABSTRACT

An optical lens assembly utilized as part of an electronic device may be configured to provide a compact structure and/or a thin profile for the electronic device while maintaining high resolution, via the use of at least one lens having planar surfaces in partial portions thereof. An optical lens assembly may include at least two lenses arranged from an object side to an image side, where at least one of the at least two lenses includes an object side surface with a planar central region, an image side surface that also has a planar central region and a peripheral region having an aspherical surface. Various embodiments with differing lens arrangements are disclosed.

18 Claims, 24 Drawing Sheets

(51) Int. Cl.
  *G02B 9/60*  (2006.01)
  *G02B 9/34*  (2006.01)

(56) References Cited

U.S. PATENT DOCUMENTS

| | | |
|---|---|---|
| 8,184,383 B2 | 5/2012 | Shinohara |
| 8,498,061 B2 | 7/2013 | Sano |
| 8,873,165 B1 | 10/2014 | Chung et al. |
| 9,465,193 B2 | 10/2016 | Shin et al. |
| 2004/0264003 A1 | 12/2004 | Noda |
| 2007/0279767 A1 | 12/2007 | Murakami et al. |
| 2009/0040626 A1 | 2/2009 | Oh et al. |
| 2014/0346230 A1 | 11/2014 | Liu et al. |
| 2014/0354876 A1 | 12/2014 | Shin et al. |
| 2015/0022904 A1 | 1/2015 | Huang |
| 2015/0286036 A1 | 10/2015 | Kondo et al. |

FOREIGN PATENT DOCUMENTS

| | | |
|---|---|---|
| JP | 2003-270526 A | 9/2003 |
| JP | 2013-11824 A | 1/2013 |
| JP | 2015-165338 A | 9/2015 |
| KR | 10-2012-0018574 A | 3/2012 |
| KR | 10-2014-0142092 A | 12/2014 |
| WO | 2015/108194 A1 | 7/2015 |
| WO | 2016/022771 A1 | 2/2016 |

OPTICAL LENS ASSEMBLY AND APPARATUS HAVING THE SAME

CLAIM OF PRIORITY

This application claims the benefit under 35 U.S.C. § 119 of Korean Patent Application No. 10-2016-0018456, filed on Feb. 17, 2016, in the Korean Intellectual Property Office, the disclosure of which is incorporated herein in its entirety by reference.

BACKGROUND

1. Field

The present disclosure relates generally to optical lens assemblies, apparatuses having the same, and methods of forming images through the optical lens assemblies.

2. Description of the Related Art

Camera technology has greatly expanded in recent years beyond stand-alone cameras into a variety of ubiquitous electronic devices (apparatuses) such as mobile communication devices, home appliances, and so on. Modern electronic devices utilize a number of sensor modules to provide various services such as multimedia services, photo services, and video services. As the use of electronic devices has expanded, the role of the camera incorporated therein has become more prominent. Camera performance such as resolution, etc. of electronic devices has improved according to consumer demand. Various types of photos, e.g. landscapes, portraits, and self-shots ("selfies") can be taken the using the device cameras, and multimedia files, for example, photos/videos/audio, are typically shared on social network sites or other media.

As semiconductor and display technologies have advanced, optical lens assemblies for cameras of mobile devices have been developed in various ways, for example, improving from low resolution to high resolution, from a small sensor format to a larger sensor format, for example, from a ⅛" sensor to a ½" sensor, and with an increasing number of lens assemblies.

Mobile device markets are currently undergoing a trend towards reducing thickness of electronic devices with an integrated optical lens assembly. For example, device thicknesses have recently been reduced from about 10 to 6 mm. This trend may conflict with an increase in the number of lenses and an increase in sensor sizes. For example, it may difficult to achieve the high performance demanded by users by using a small number of lenses. Alternatively, it may be difficult to mount the optical lens assemblies that have proper optical characteristics and/or aberration characteristics while also providing a thin electronic device. Moreover, as lenses become smaller, manufacturing thereof becomes difficult.

SUMMARY

Small-sized optical lens assembles for electronic devices, for example, portable mobile devices, are disclosed, as well as electronic devices including the same, and methods of forming images using the optical lens assemblies.

Additional aspects will be set forth in part in the description which follows and, in part, will be apparent from the description, or may be learned by practice of the presented embodiments.

According to an embodiment, an optical lens assembly includes at least two lenses arranged from an object side to an image side, wherein at least one of the at least two lenses may include an object side surface having a planar central region, an image side surface having a planar central region and a peripheral region having an aspherical surface, and the at least one lens may satisfy the following equation:

$$0.01 < \text{"}\varphi\text{flat-object}/\varphi\text{full"} < 0.5,$$

where φflat-object is a diameter of the planar central region of the object side surface, and φfull is an effective diameter of the at least one lens.

According to an aspect of another embodiment, an optical lens assembly includes at least two lenses arranged from an object side to an image side, wherein at least one of the at least two lenses includes a partial lens region having zerorefractive power in a central region thereof, and the at least one lens may satisfy the following equation:

$$0.01 < \varphi\text{flat-object}/\varphi\text{full} < 0.5,$$

where φflat-object is a diameter of a partial lens region of the object side surface of the at least one lens, and φfull is an effective diameter of the at least one lens.

According to an aspect of another embodiment, an optical lens assembly includes, in an order from an object side to an image side: a first lens having a positive refractive power; a second lens having a positive refractive power; a third lens having a negative refractive power; a fourth lens; a fifth lens; and a sixth lens having a negative refractive power, a central region of at least one of the fourth lens and the fifth lens may have no refractive power, and the at least one of the fourth lens and the fifth lens may satisfy the following equation:

$$0.01 < \varphi\text{flat-object}/\varphi\text{full} < 0.5,$$

where φflat-object is a diameter of a central region of an object side surface of at least one of the fourth lens and the fifth lens, and φfull is an effective diameter of the fifth lens. Electronic devices including embodiments of the optical lens assembly, as well as methods of forming an image using an embodiment of the optical lens assembly, are also disclosed.

BRIEF DESCRIPTION OF THE DRAWINGS

These and/or other aspects will become apparent and more readily appreciated from the following description of various embodiments of the present disclosure, taken in conjunction with the accompanying drawings in which.

DETAILED DESCRIPTION

Figure 1:
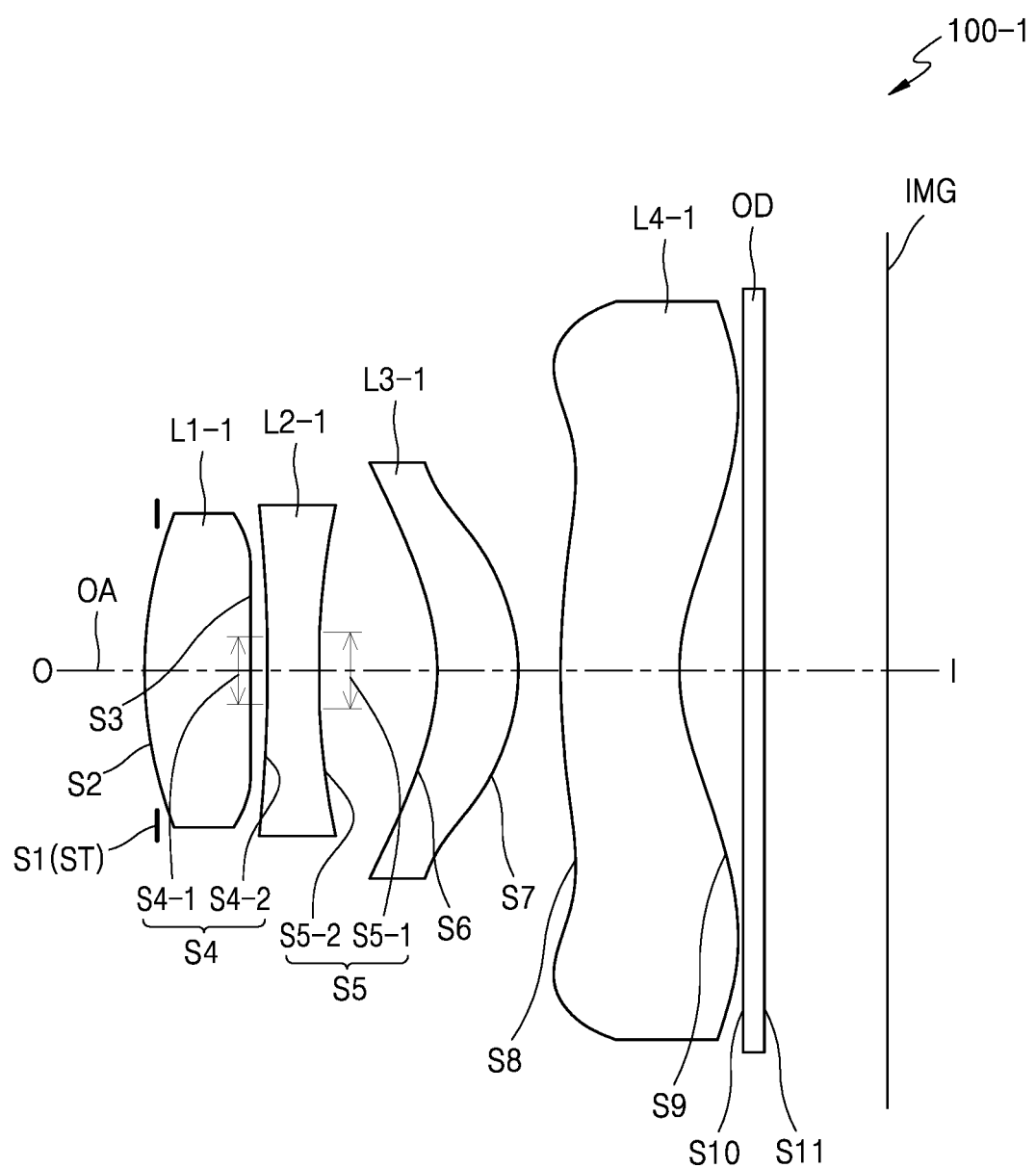
FIG. 1 is a cross-sectional view of an optical lens assembly according to a first embodiment of the present disclosure.

Hereinafter, various embodiments will be described with reference to the attached drawings. However, it will be understood that the technology described in this specification is not limited to particular embodiments but includes various modifications, equivalents, and/or alternatives of the embodiments of this document. Regarding the description of the drawings, like reference numerals may be used for like elements.

In this specification, expressions such as "have", "may have", "comprise", or "may comprise", specify the optional presence of corresponding features (example: values, functions, operations, or elements of a component) and do not preclude the presence of additional features.

In this specification, expressions such as "A or B", "at least one of A or/and B", or "one or more of A or/and B" may include all possible combinations of items listed together. For example, "A or B", "at least one of A and B", or "at least one of A or B" may specifies all cases including case (1) including at least one A, case (2) including at least one B, or case (3) at least one A and at least one B.

Expressions such as a "first", a "second" used in this specification may modify various elements regardless of order and/or importance and are used to distinguish one element from another and may not limit the elements. For example, a first user device and a second user device may specify different user devices regardless of order or importance. For example, a first element could be termed a second element without departing the scope of this specification, and similarly, the second element could be termed the first element.

When an element (example: a first element) is operatively or communicatively coupled with/to or connected to another element (example: a second element), it should be understood that the element is directly connected to another element or can be connected to another element via another element (example: a third element). On the other hand, when an element (example: the first element) is "directly connected" or "directly coupled" to another element (example: the second element), it will be understood that another element (example: the third element) is not present between the element and another element.

The term "configured to ~" used in this document may be interchangeably used with "suitable for ~", "having the capacity to ~", "designed to ~", "adapted to ~", "made to ~", "capable of ~" according to situations, for example. The term "configured to ~" may not specify only a thing that is hardwarely "specifically designed to". Instead, in some situations, the expression such as "an apparatus configured to ~" may specify a thing "capable of ~" together with another device or components. For example, the phrase "a processor configured to (or set to) perform A, B, and C" may mean an exclusive processor (example: an embedded processor) for performing a corresponding operation or a generic-purpose processor (example: a CPU or an application processor) that may perform operations by executing one or more software programs stored in a memory device.

The terms used in this document are used to describe a particular embodiment and do not limit the scope of other embodiments. The singular terms may include the plural forms unless the context clearly indicates otherwise. The terms used herein including technical or scientific terms may have the same meaning as a general meaning by those skilled in the art. The terms defined in a general dictionary among the terms used in this document may be interpreted in the same meaning or similar meaning as that of a context of the related technology and are not interpreted in an idealistic or excessively formal meaning unless the context clearly indicates otherwise. The terms defined in this document cannot be interpreted to preclude embodiments of this document even though the terms are defined in this document according to circumstances. As used herein, the term "and/or" includes any and all combinations of one or more of the associated listed items. Expressions such as "at least one of," when preceding a list of elements, modify the entire list of elements and do not modify the individual elements of the list.

An electronic device (interchangeably herein, "apparatus") according to various embodiments may include, for example, at least one of a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), a MP3 player, a mobile medical device, a camera, or a wearable device. According to various embodiments, the wearable device may include at least one of an accessory type (example: a watch, a ring, a bracelet, an ankle bracelet, a necklace, glasses, a contact lens, or a head-mounted-device (HMD)), a fabric or clothes integral type (example: electronic clothes), a body attachment type (example: a skin pad or tattoo), or a biological implantation type (example: an implantable circuit).

In some embodiments, the electronic apparatus may be a home appliance. The home appliance may include at least one of a television (TV), a digital video disk (DVD) player, an audio device, a refrigerator, an air conditioner, a cleaning device, an oven, a microwave oven, a washing machine, an air cleaner, a set-top box, a home automation control panel, a security control panel, a TV box (example: Samsung HomeSync™, Apple TV™, or Google TV™), a game console (example: Xbox™, PlayStation™), an electronic dictionary, an electronic key, a camcorder, or an electronic picture frame, for example.

In another embodiment, the electronic apparatus may include at least one of various medical devices (example: various portable medical measurement devices (a blood-sugar measuring instrument, a heart rate monitor, a blood pressure measuring instrument, or a body temperature measuring instrument, etc.), magnetic resonance angiography (MRA), magnetic resonance imaging (MRI), computed tomography (CT), a photographing device, or an ultrasonic device, etc.)), a navigation device, a global navigation satellite system (GNSS), an event data recorder (EDR), a flight data recorder (FDR), a vehicle infotainment device, ship electronic equipment (example: a ship navigation device, a gyrocompass, etc.), avionics, a security device, a vehicle head unit, an industrial or home robot, an automatic teller's machine (ATM) of a financial institution, a point of sales (POS) of a store, or a device for an internet of things (example: an electric bulb, various sensors, an electricity or gas meter, a spring cooler device, a fire alarming device, a thermostat, a streetlamp, a toaster, fitness equipment, a hot water tank, a heater, a boiler, etc.).

In some embodiment, the electronic apparatus may include at least one of a part of a furniture or building/structure, an electronic board, an electronic signature receiving device, a projector, or various measuring devices (example: a waterworks, electricity, gas or electric-wave measuring device, etc.). In various embodiments, the electronic apparatus may be one of the above-described various apparatuses or a combination of one or more apparatuses. An electronic apparatus according to an embodiment may be a flexible electronic apparatus. Also, the electronic apparatus according to the embodiment of this document is not limited to the above-described devices and may include a new electronic apparatus according to technological development.

Hereinafter, an electronic apparatus according to various embodiments will be described with reference to the attached drawings. In this document, the term a "user" may specify a person who uses the electronic apparatus or an apparatus that uses the electronic apparatus (example: an artificial intelligence (AI) electronic apparatus).

Hereinafter, an optical lens assembly according to various embodiments, an apparatus having the same, and a method of forming an image will be described in detail with reference to the attached drawings.

An optical lens assembly according to various embodiments may include at least two lenses arranged from an object side to an image side. At least one of at least two lenses may include a first region including planes on the object side and the image side, respectively, and a second region including an aspherical surface. The first region may be a central region through which an optical axis passes, and the second region may be a peripheral region that surrounds the central region.

FIG. 1 illustrates an optical lens assembly 100-1 according to a first embodiment of the present disclosure.

According to the first embodiment, the optical lens assembly 100-1 may include a first lens L1-1, a second lens L2-1, a third lens L3-1, and a fourth lens L4-1, which are arranged in a sequence along an optical axis OA, from an object side O to an image side I.

Hereinafter, according to various embodiments, when describing the configuration of each of the lenses, an image side may represent a direction in which an image plane IMG on which an image is formed exists and an object side may represent a direction in which an object being imaged exists. Also, according to various embodiments, an "object side surface" of a lens may represent a lens surface facing the object side, based on an optical axis OA, i.e., a left side surface of the drawing, and an "image side surface" of the lens may represent a lens surface facing the image plane, based on the optical axis OA, i.e., a right side surface of the drawing. The image plane IMG may be a plane of an imaging device surface or an image sensor surface, for example. An image sensor may include a complementary metal oxide semiconductor (CMOS) or a charge coupled device (CCD), for example. The image sensor is not limited thereto and may be any device that converts an image of the object into an electrical image signal.

First lens L1-1 may have positive refractive power, and may have a convex object side surface. Hereinafter, a lens having positive refractive power may be expressed as a positive lens, and a lens having negative refractive power may be expressed as a negative lens. First lens L1-1 may also be a biconvex lens. Second lens L2-1 may have planar (i.e., flat or substantially flat) regions on the object side surface and the image side surface, respectively. That is, a partial region of the object side surface of the second lens L2-1 may be planar, the partial region surface thereby lying in a flat plane. A partial region of the image side surface of the second lens L2-1 may also be planar. The second lens L2-1 may include, for example, a central region around the optical axis OA and a peripheral region that surrounds the central region. In particular, second lens L2-1 may include an object side surface S4 composed of a first central region S4-1 which is planar, and a first peripheral region S4-2 having an aspherical surface. (As is known in camera technology, an aspherical surface is one having a profile that is not a portion of a sphere or cylinder.) Also, the second lens L2-1 may include an image side surface S5 with a second central region S5-1 which is planar, and a second peripheral region S5-2 having an aspherical surface. (The sizes, i.e., the surface areas, of the first and second central regions S4-1 and S5-1 may be approximately the same. A central region of second lens L2-1 may be composed of the first and second central regions S4-1 and S5-1 and the portion of second lens L2-1 directly therebetween.) The second lens L2-1 may have zero refractive power in the central region thereof. Note that while the term "refractive power" typically refers to a refractive property of an overall lens, or sometimes to a refractive property on one side of a lens, herein the term refractive power may be used to describe the refractive property of just a particular region of a lens, relative to an optical axis of the lens. For instance, a refractive power of a central region of a lens, or of a peripheral region of a lens, may be described. In the case of a particular region, the refractive power of the particular region may be considered in isolation by ignoring the refractive power contribution of the remaining portion of the lens.

The first peripheral region S4-2 and the second peripheral region S5-2 of the second lens L2-1 may have non-zero (positive or negative) refractive powers. The first peripheral region S4-2 may be convex toward the object side O. The second peripheral region S5-2 may be convex toward the image side I.

The second lens L2-1 may have an infinite radius of curvature in the central region S5-1 (i.e., so that the entire surface of the central region S5-1 lies in a flat plane) and may have no aspherical coefficient. The radius of curvature in the peripheral region S5-2 may be infinite (in the case of a completely flat side for the lens), or finite, and may have an aspherical coefficient.

At least one of the third lens L3-1 and the fourth lens L4-1 may have a surface having at least one inflection point. The inflection point may be, for example, a point where a symbol of the radius of curvature changes from + to − or from − to +. Alternatively, the inflection point may be a point where the shape of a lens changes from a convex shape to a concave shape or from a concave shape to a convex shape. The radius of curvature may be a value indicating a degree of curvature in each of points of a curved surface or curve.

The third lens L3-1 may include a concave object side surface S6. An image side surface S7 of the third lens L3-1 may have at least one inflection point. The third lens L3-1 may have a convex shape toward the image side I in a region near the optical axis OA of the image side surface (within a predetermined radius from the optical axis OA). The object side surface S6 of the third lens L3-1 may have a concave shape toward the object side O.

According to various embodiments, the fourth lens L4-1 may have at least one inflection point on at least one of the object side surface S8 and the image side surface S9. The object side surface S8 of the fourth lens L4-1 may have a convex shape near the optical axis OA and a concave shape in an annular region farther from the optical axis OA (e.g. towards or within a peripheral region of the fourth lens). The image side surface of the fourth lens L4-1 may have a concave shape near the optical axis and a convex shape in a region farther from the optical axis OA (e.g. a peripheral region of the fourth lens), as illustrated in FIG. 1.

According to various embodiments, at least one of the first lens L1-1, the second lens L2-1, the third lens L3-1, and the fourth lens L4-1 may be an aspherical lens. According to an embodiment, each of the first lens L1-1, the second lens L2-1, the third lens L3-1 and the fourth lens L4-1 may be an aspherical lens.

According to various embodiments, an aperture ST may be further provided on the object side O of the first lens L1-1.

According to various embodiments, at least one optical device OD may be provided between the fourth lens L4-1 and the image plane IMG. The optical device OD may include a low pass filter, an infrared (IR)-cut filter, a cover glass, or any combination thereof. If an IR-cut filter is provided as the optical device OD, visible rays may transmit through the IR-cut filter, and IR rays may be emitted to the outside so that IR rays may not be delivered to the image plane IMG. The optical lens assembly 100-1 may also be configured without the optical device OD.

Figure 3:
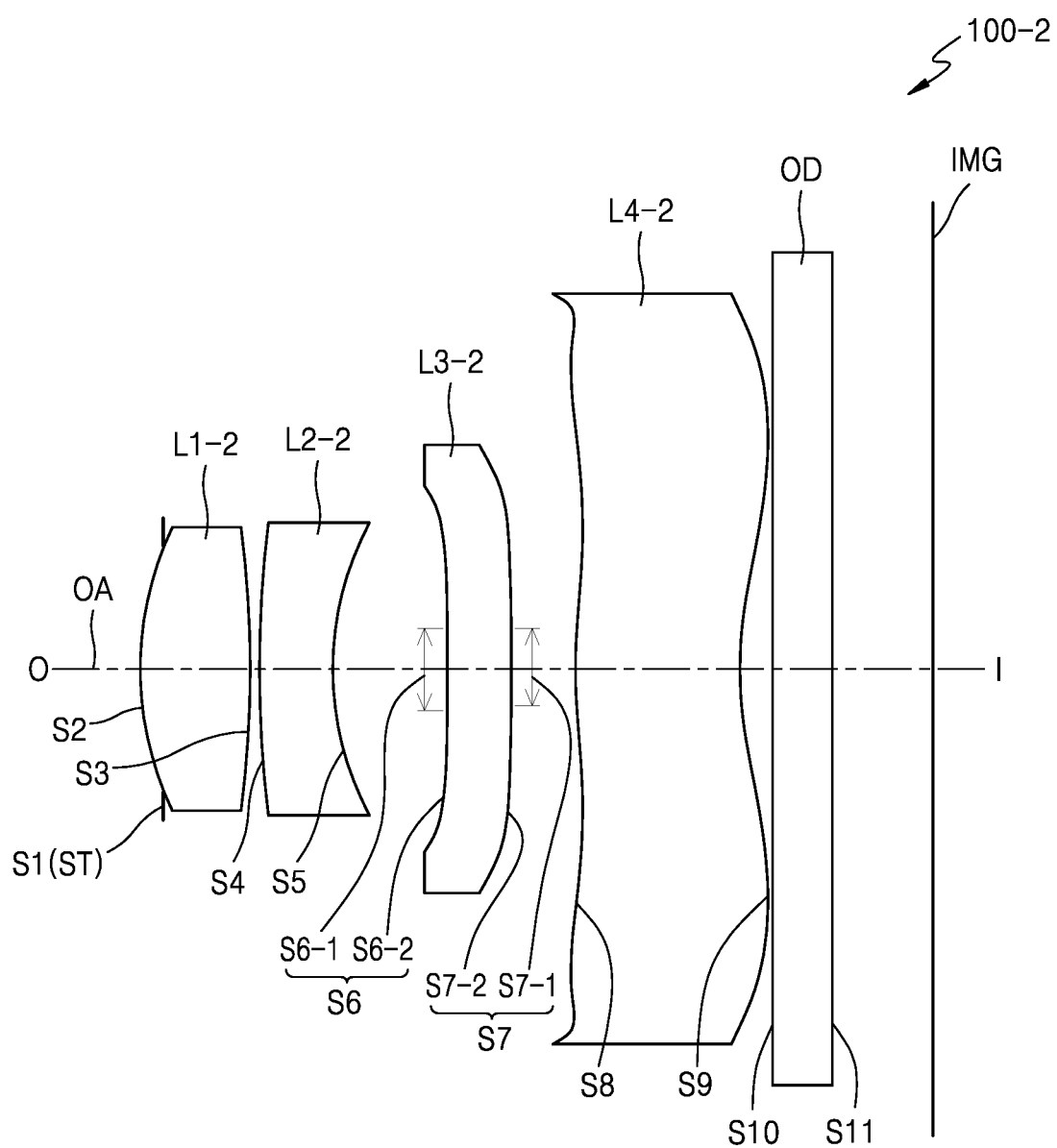
FIG. 3 is a cross-sectional view of an optical lens assembly according to a second embodiment.

FIG. 3 is a cross-sectional view of an optical lens assembly 100-2 according to a second embodiment.

Optical lens assembly 100-2 may include a first lens L1-2 having positive refractive power, a second lens L2-2 having negative refractive power, a third lens L3-2, and a fourth lens L4-2, which are arranged from an object side O to an image side I. In the current embodiment, descriptions of similar elements to those of the above-described embodiment will be omitted for brevity, but descriptions based on each of the lenses in FIG. 3 (example: the first lens L1-2, the second lens L2-2, the third lens L3-2, or the fourth lens L4-2) will be provided, as these may have configurations that differ from those in the previous embodiment, although the same legends may be used.

According to various embodiments, the first lens L1-2 may have a convex object side surface. The second lens L2-2 may be a concave meniscus lens with the concave surface S5 facing the image side.

According to an embodiment, the third lens L3-2 may include planar regions on each of an object side surface S6 and an image side surface S7. That is, a partial region of the object side surface S6 of the third lens L3-2 and a partial region of the image side surface S7 of the third lens L3-2 may each be a planar surface. The third lens L3-2 may include a first central region S6-1 which is planar on the object side surface S6 and a first peripheral region S6-2 having an aspherical surface. Also, the third lens L3-2 may include a second central region S7-1 which is planar on the image side surface S7 and a second peripheral region S7-2 having an aspherical surface. (The sizes, i.e., the surface areas, of the first and second central regions S6-1 and S7-1 may be approximately the same. A central region of the third lens L3-2 may be composed of the first and second central regions S6-1 and S7-1 and the portion of third lens L3-2 directly therebetween.) The third lens L3-2 may have zero refractive power in at least the overall central region, i.e., from the surface S6 through the lens to the surface S7. As noted above, while the term "refractive power" typically refers to a refractive property of an overall lens, or to one side of a lens, herein the term may refer to the refractive property of a particular region of a lens, relative to an optical axis of the lens. For instance, a refractive power of a central region of a lens may be characterized. For example, each of the first peripheral region S6-2 and the second peripheral region S7-2 of the third lens L3-2 may have a non-zero (positive or negative) refractive power. The first peripheral region S6-2 may be concave toward the object side, as shown. The second peripheral region S7-2 may be convex toward the image side.

According to various embodiments, at least one of the first lens L1-2, the second lens L2-2, the third lens L3-2, and the fourth lens L4-2 may be an aspherical lens. For example, the first lens L1-2, the second lens L2-2, the third lens L3-2, and the fourth lens L4-2 may be double-sided aspherical lenses, respectively. Thus, optical lens assembly 100-2 may be configured with a compact structure while maintaining high resolution performance. Also, at least one of the first lens L1-2, the second lens L2-2, the third lens L3-2 and the fourth lens L4-2 may be formed of a plastic material so that costs may be reduced and aspherical surfaces may be easily manufactured. For example, each of the first lens L1-2, the second lens L2-2, the third lens L3-2, and the fourth lens L4-2 may be a plastic lens.

Figure 5:
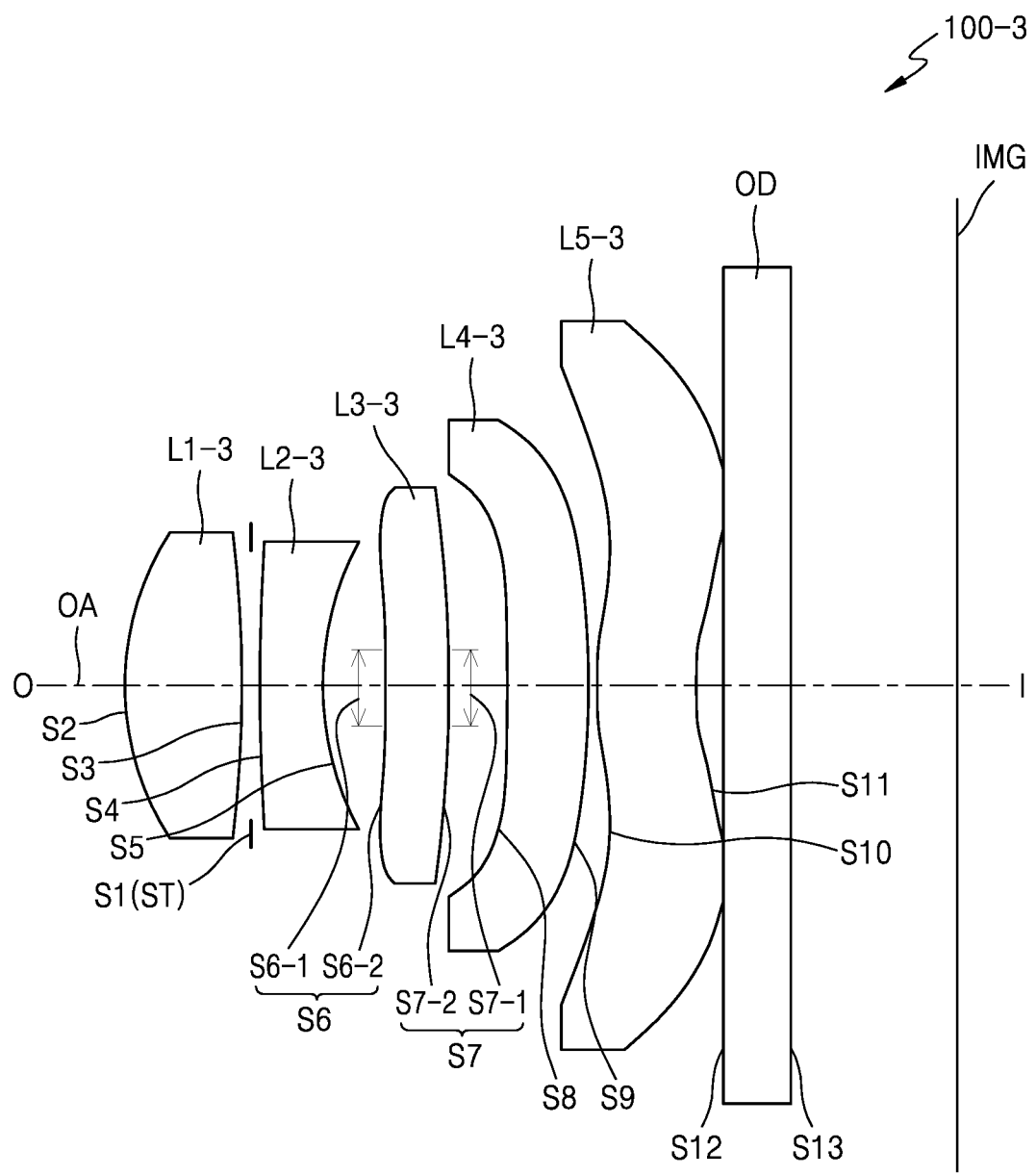
FIG. 5 is a cross-sectional view of an optical lens assembly according to a third embodiment.

FIG. 5 is a cross-sectional view of an optical lens assembly 100-3 according to a third embodiment. Optical lens assembly 100-3 may include a first lens L1-3 having positive refractive power, a second lens L2-3 having negative refractive power, a third lens L3-3, a fourth lens L4-3, and a fifth lens L5-3, which are arranged from an object side O to an image side I in sequence along an axis OA.

The first lens L1-3 may include a convex object side surface toward the object side O. The second L2-3 may include a concave image side surface. The second lens L2-3 may be a concave meniscus lens toward the image side I. An aperture ST may be provided between the first lens L1-3 and the second lens L2-3.

Third lens L3-3 may include planar surface regions on an object side surface S6 and an image side surface S7, respectively. That is, a partial region of the object side surface of the third lens L3-3 and a partial region of the image side surface of the third lens L3-3 may be planar. The third lens L3-3 may include, according to an embodiment, a first central region S6-1 which is a planar surface on the object side surface S6, and a first peripheral region S6-2 having an aspherical surface. Also, the third lens L3-3 may include a second central region S7-1 which is a planar surface on the image side surface S7, and a second peripheral region S7-2 having an aspherical surface. (The sizes, i.e., the surface areas, of the first and second central regions S6-1 and S7-1 may be approximately the same. A central region of third lens L3-3 may be composed of the first and second central regions S6-1 and S7-1 and the portion of second lens L3-3 directly therebetween.) The third lens L3-3 may have zero refractive power in the central region thereof. As noted above, refractive power may be considered for particular regions of a lens relative to distance from the optical axis of the lens. Thus refractive power of a lens' central region or peripheral region may be considered. According to an embodiment, each of the first peripheral region S6-2 and the second peripheral region S7-2 of the third lens L3-3 may have non-zero refractive power.

According to various embodiments, at least one of the first lens L1-3, the second lens L2-3, the third lens L3-3, the fourth lens L4-3, and the fifth lens L5-3 may be an aspherical lens. For instance, each of the first lens L1-3, the second lens L2-3, the third lens L3-3, the fourth lens L4-3 and the fifth lens L5-3 may be a double-sided aspherical lens. Thus, optical lens assembly 100-3 may be implemented with a compact structure and still provide high resolution performance. Also, at least one of the first lens L1-3, the second lens L2-3, the third lens L3-3, the fourth lens L4-3 and the fifth lens L5-3 may be formed of a plastic material so that costs may be reduced and aspherical surfaces may be easily manufactured. According to an embodiment, each of the first lens L1-3, the second lens L2-3, the third lens L3-3, the fourth lens L4-3 and the fifth lens L5-3 may be a plastic lens.

The image side surface of the fifth lens L5-3 may have at least one inflection point. The object side surface of the fifth lens L5-3 may have a convex shape near the optical axis and a concave shape in an annular region farther from the optical axis. The image side surface of the fifth lens L5-3 may have a concave shape near the optical axis and a convex shape in an annular region farther from the optical axis.

Figure 7:
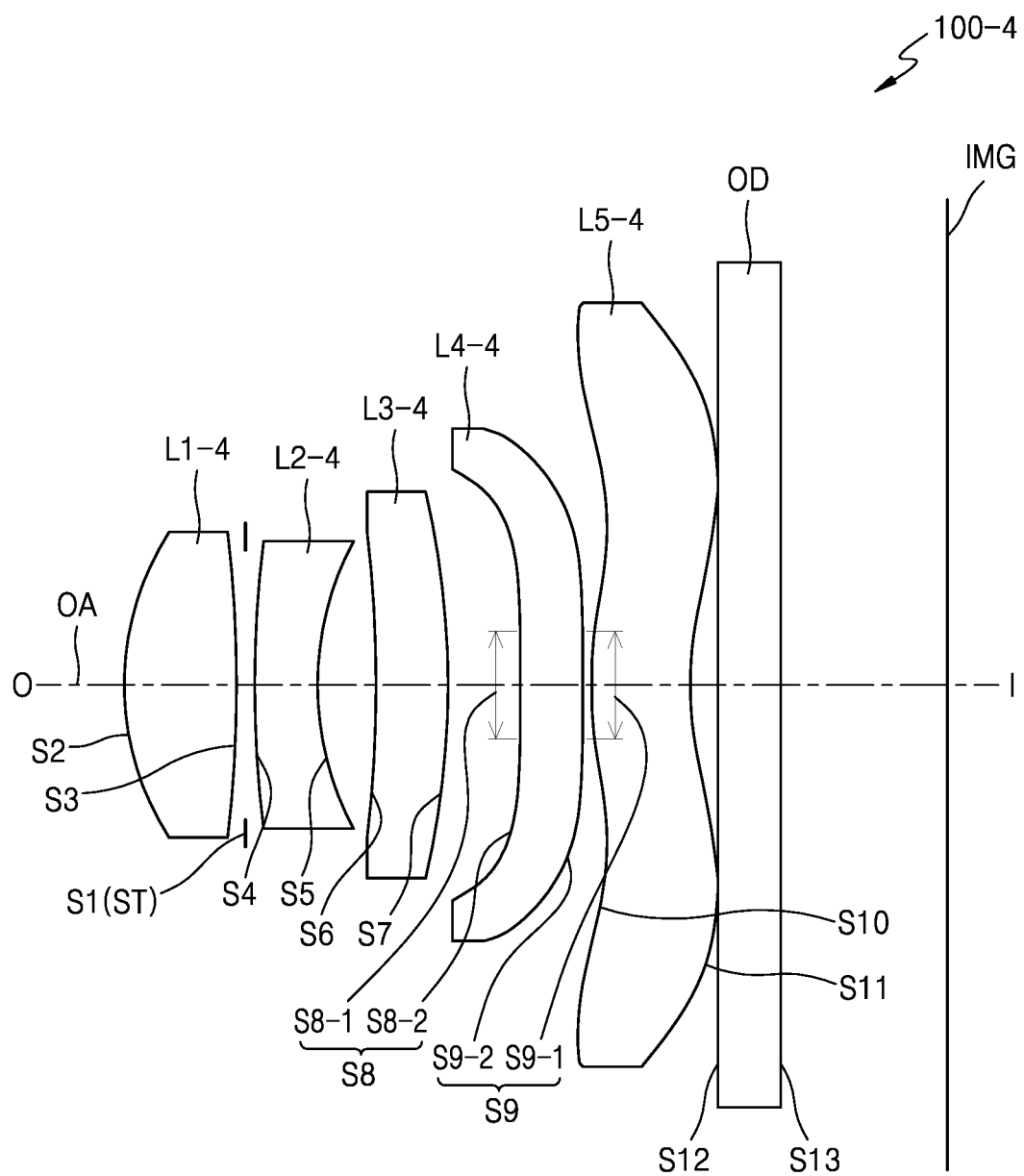
FIG. 7 is a cross-sectional view of an optical lens assembly according to a fourth embodiment.

FIG. 7 is a cross-sectional view of an optical lens assembly 100-4 according to a fourth embodiment. Optical lens assembly 100-4 may include a first lens L1-4, a second lens L2-4, a third lens L3-4, a fourth lens L4-4, and a fifth lens L5-4, which are arranged from an object side O to an image side I. In the current embodiment, descriptions of similar elements to those of the above-described embodiments will be omitted, and descriptions based on each of lenses (example: the first lens L1-4, the second lens L2-4, the third lens L3-4, the fourth lens L4-4 or the fifth lens L5-4) will be provided, since the lens configurations of FIG. 7 may differ from those of the earlier discussed embodiments (although the same legends may be used).

The optical lens assembly 100-4 may include the first lens L1-4, the second lens L2-4, the third lens L3-4, the fourth lens L4-4, and the fifth lens L5-4. The third lens L3-4 may have a convex shape toward the image side I. The fourth lens L4-4 may include a planar region on each of an object side surface S8 and an image side surface S9, for example. That is, a partial region of the object side surface of the fourth lens L4-4 and a partial region of the image side surface of the fourth lens L4-4 may be planar surfaces. The fourth lens L4-4 may include a first central region S8-1 which is planar on the object side surface S8 and a first peripheral region S8-2 having an aspherical surface. Also, the fourth lens L4-4 may include a second central region S9-1 which is planar on the image side surface S9 and a second peripheral region S9-2 having an aspherical surface. The fourth lens L4-4 may have zero refractive power in a central region thereof. (As noted above, refractive powers of particular regions of a lens relative to distance from the optical axis may be considered herein in isolation.) For example, each of the first peripheral region S8-2 and the second peripheral region S9-2 of the fourth lens L4-4 may have non-zero (positive or negative) refractive power. (The sizes, i.e., the surface areas, of the first and second central regions S8-1 and S9-1 may be approximately the same. A central region of fourth lens L4-4 may be composed of the first and second central regions S8-1 and S9-1 and the portion of fourth lens L4-4 directly therebetween.)

Figure 9:
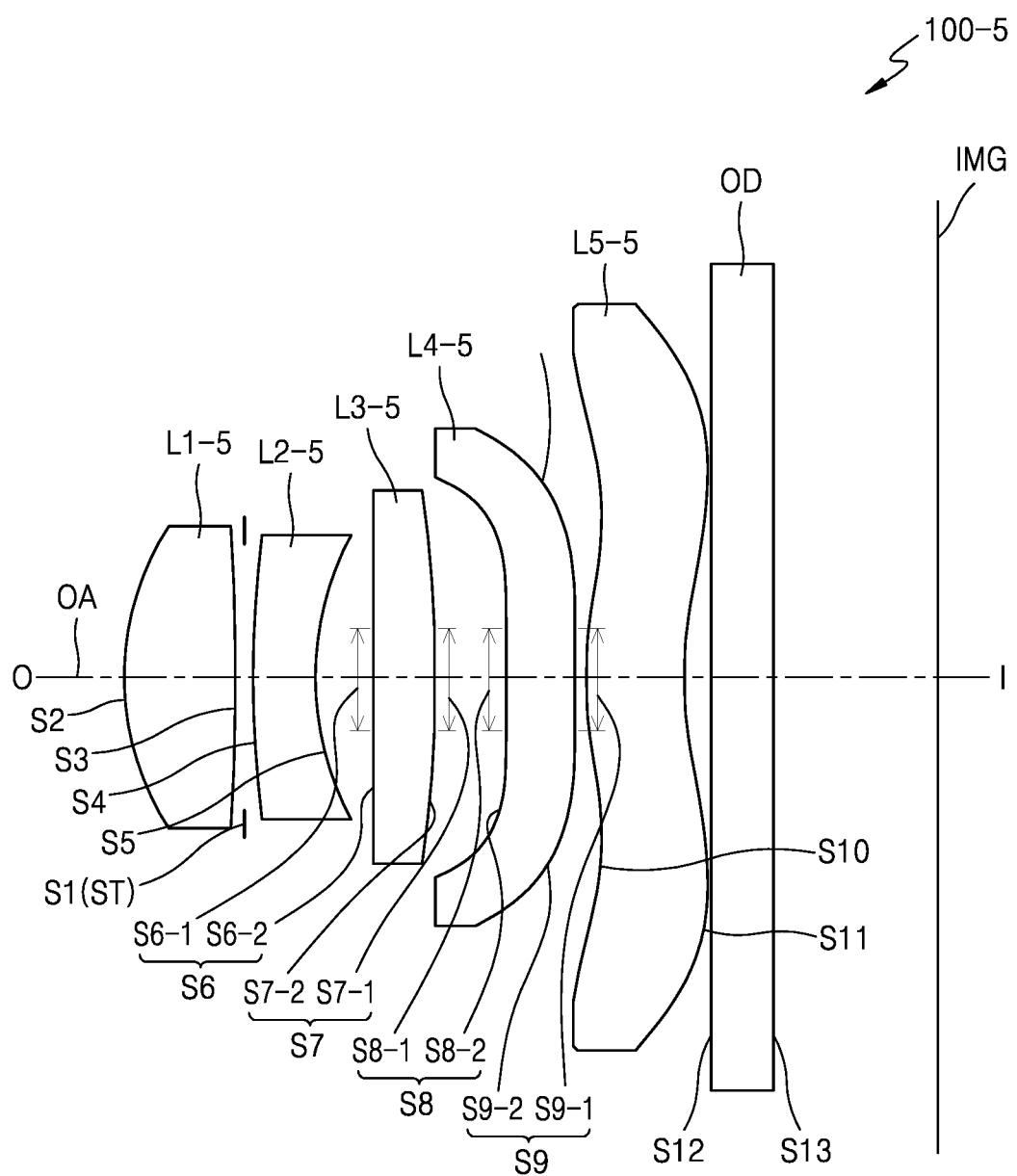
FIG. 9 is a cross-sectional view of an optical lens assembly according to a fifth embodiment.

FIG. 9 is a cross-sectional view of an optical lens assembly 100-5 according to a fifth embodiment. Optical lens assembly 100-5 may include a first lens L1-5 having positive refractive power, a second lens L2-5 having negative refractive power, a third lens L3-5, a fourth lens L4-5, and a fifth lens L5-5, which are arranged from an object side O to an image side I. In the current embodiment, descriptions of similar elements to those of the above-described embodiment will be omitted, and descriptions based on each of lenses (example: the first lens L1-5, the second lens L2-5, the third lens L3-5, the fourth lens L4-5, or the fifth lens L5-5) will be provided (since the configurations may differ from those described earlier even though the same legends may be used).

In the embodiment of FIG. 9, two lenses may include planar regions on an object side surface and an image side surface, respectively. For example, a partial region of an object side surface S6 of the third lens L3-5 and a partial region of an image side surface S7 of the third lens L3-5 may be planar. The third lens L3-5 may include, for example, a first central region S6-1 which is planar on the object side surface S6 and a first peripheral region S6-2 having an aspherical surface. The third lens L3-5 may include a second central region S7-1 which is planar on the image side surface S7 and a second peripheral region S7-2 having an aspherical surface. As noted above, refractive power may be considered for particular regions of a lens in isolation. For example, each of the first peripheral region S6-2 and the second peripheral region S7-2 of the third lens L3-5 may have non-zero refractive power. (The sizes, i.e., the surface areas, of the first and second central regions S6-1 and S7-1 of the third lens L3-5 may be approximately the same. A central region of third lens L3-5 may be composed of the first and second central regions S6-1 and S7-1 and the portion of second lens L3-5 directly therebetween.) A partial region of the object side surface S6 of the fourth lens L4-5 and a partial region of the image side surface S7 thereof may each be planar. The fourth lens L4-5 may include, for example, a third central region S8-1 which is planar on an object side surface S8 and a third peripheral region S8-2 having an aspherical surface. (The sizes of central regions S8-1 and S8-2 may be approximately the same.) The fourth lens L4-5 may include a fourth central region S9-1 which is planar on an image side surface S9 and a fourth peripheral region S9-2 having an aspherical surface. (The sizes of central regions S8-1 and S9-1 may be approximately the same.) The fourth lens L4-5 may have zero refractive power in a central region thereof (which may encompass both the central regions S8 and S9 and the portion of the lens L4-5 therebetween). For example, each of the first peripheral region S8-2 and the second peripheral region S9-2 of the fourth lens L4-5 may have non-zero refractive power.

The fifth lens L5-5 may have at least one inflection point on each of an object side surface and an image side surface. For example, the image side surface may be concave near the optical axis and convex in an annular region farther from the optical axis.

Figure 11:
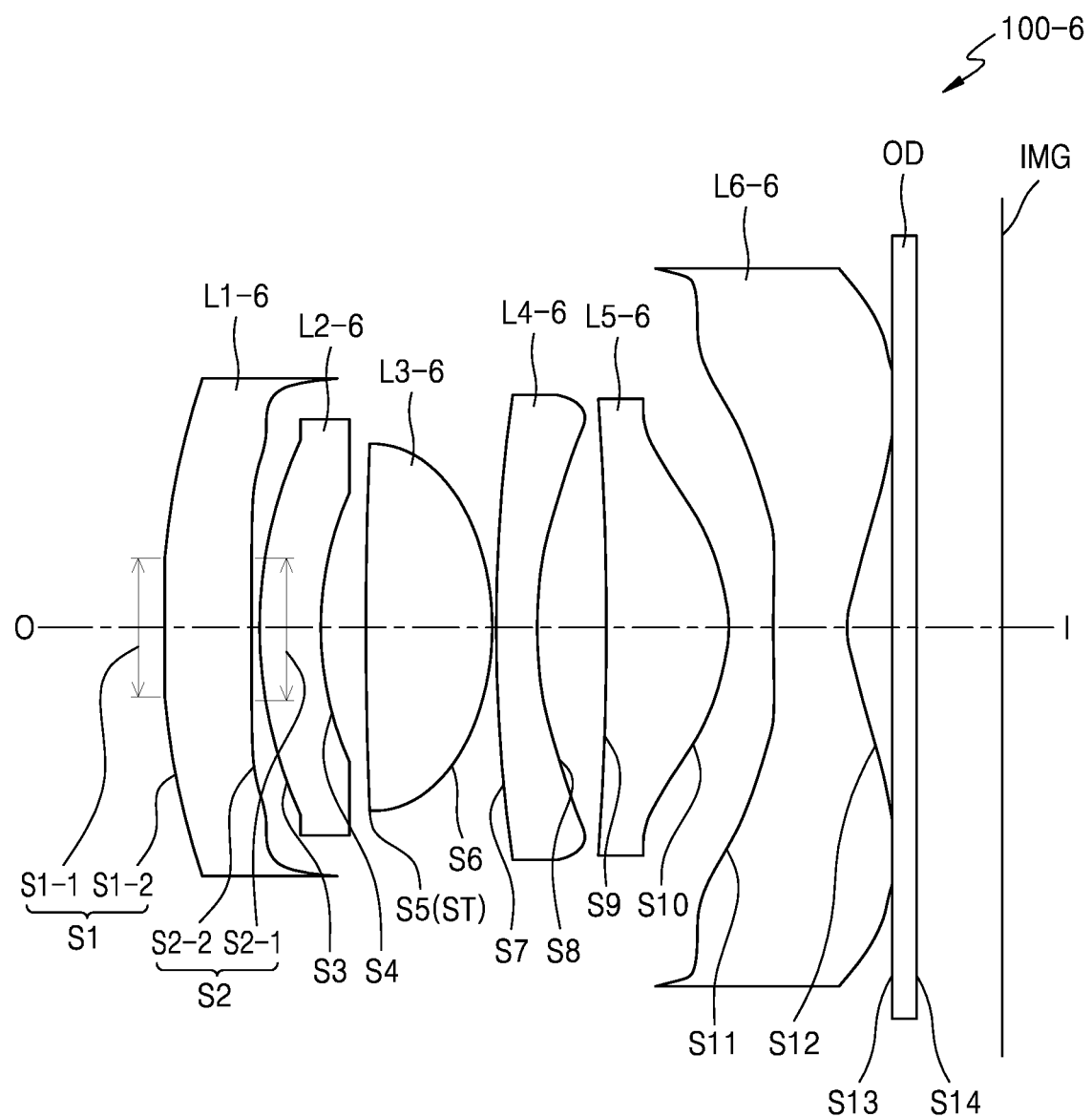
FIG. 11 is a cross-sectional view of an optical lens assembly according to a sixth embodiment.

FIG. 11 is a cross-sectional view of an optical lens assembly 100-6 according to a sixth embodiment.

According to various embodiments, the optical lens assembly 100-6 may include a first lens L1-6, a second lens L2-6 having a negative refractive power, a third lens L3-6, a fourth lens L4-6, a fifth lens L5-6, and a sixth lens L6-6, which are arranged from an object side O to an image side I.

In the embodiment of FIG. 11, descriptions of similar elements to those of the above-described fifth embodiment will be omitted. A partial region of an object side surface S1 of the first lens L1-6 and a partial region of an image side surface S2 thereof may be planes. The first lens L1-6 may include, for example, a first central region S1-1 which is planar on the object side surface S1 and a first peripheral region S1-2 having an aspherical surface on the object side surface S1. Also, the first lens L1-6 may include a second central region S2-1 which is planar on the image side surface S2 and a second peripheral region S2-2 having an aspherical surface. The first lens L1-6 may have zero refractive power in the central region thereof. For example, each of the first peripheral region S1-2 and the second peripheral region S2-2 of the first lens L1-6 may have non-zero refractive power. (The sizes, i.e., the surface areas, of the first and second central regions S1-1 and S2-1 may be approximately the same. A central region of first lens L1-6 may be composed of the first and second central regions S1-1 and S2-1 and the portion of first lens L1-6 directly therebetween.)

The second lens L2-6 may have a concave meniscus shape toward the image side S2. The third lens L3-6 may include a convex image side surface toward an image side. The fourth lens L4-6 may have a concave meniscus shape toward the image side, for example. The fifth lens L5-6 may have a concave object side surface and a convex image side surface, for example. The fifth lens L5-6 and the sixth lens L6-6 may be aspherical lenses. An object side surface of the sixth lens L6-6 may have a convex shape near the optical axis and a concave shape in an annular region farther from the optical axis (e.g., towards or within a peripheral region). An image side surface of the sixth lens L6-6 may have a concave shape near the optical axis and a convex shape in an annular region farther from the optical axis. For example, the sixth lens L6-6 may have a convex meniscus shape toward the object side in a region near the optical axis. For example, an aperture ST may be further provided at an object side of the third lens L3-6.

Figure 13:
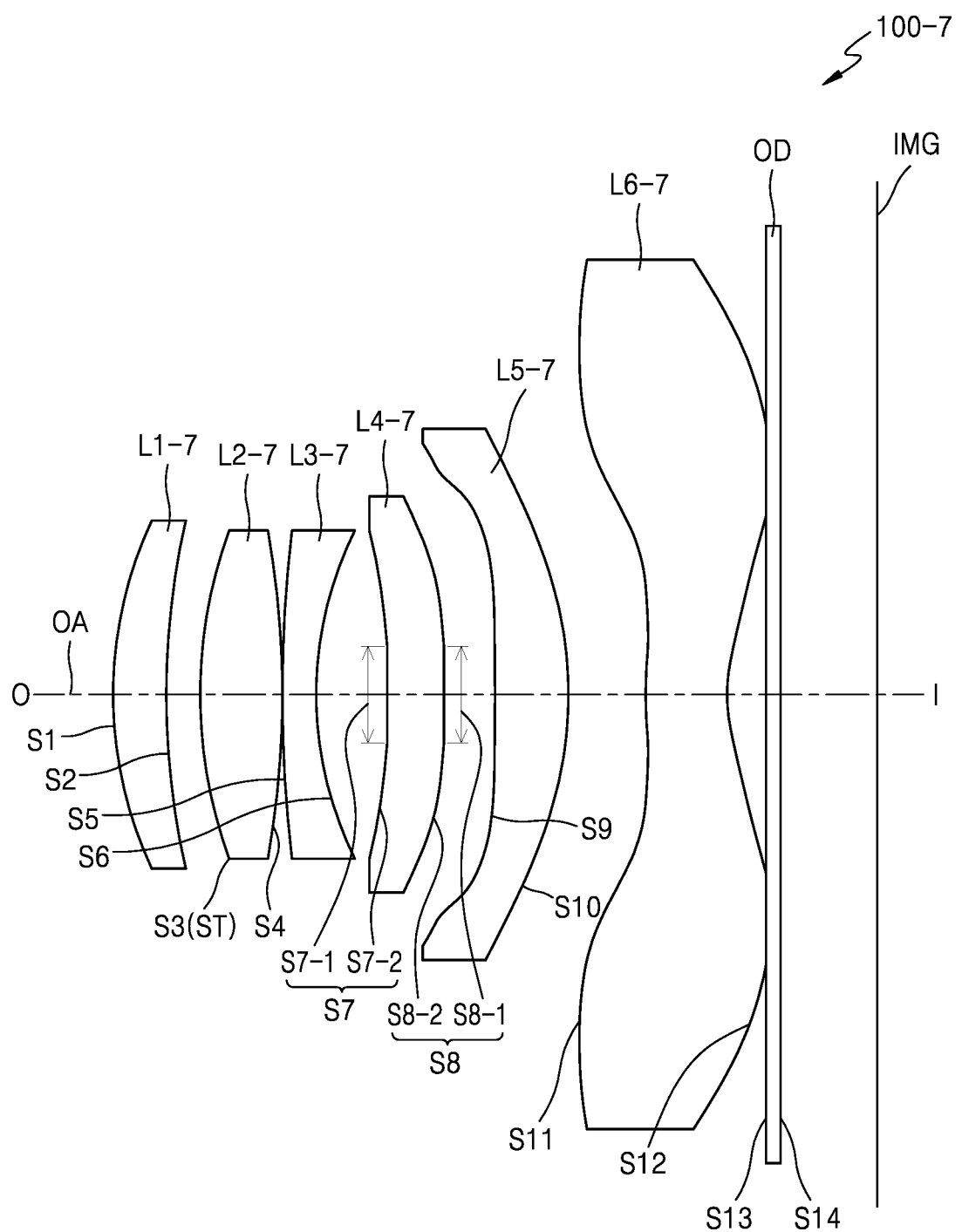
FIG. 13 is a cross-sectional view of an optical lens assembly according to a seventh embodiment.

FIG. 13 is a cross-sectional view of an optical lens assembly 100-7 according to a seventh embodiment. According to various embodiments, the optical lens assembly 100-7 may include a first lens L1-7, a second lens L2-7, a third lens L3-7, a fourth lens L4-7, a fifth lens L5-7, and a sixth lens L6-7, which are arranged from an object side O to an image side I. In the embodiment of FIG. 13, descriptions of similar elements to those of the above-described embodiment will be omitted, and descriptions based on each of lenses (example: the first lens L1-7, the second lens L2-7, the third lens L3-7, the fourth lens L4-7, the fifth lens L5-7, or the sixth lens L6-7) will be provided.

For example, the first lens L1-7 may have positive refractive power. The first lens L1-7 may have a convex meniscus shape toward the object side O. The second lens L2-7 may have positive refractive power. The second lens L2-7 may be a biconvex lens, for example. An aperture ST may be provided between the first lens L1-7 and the second lens L2-7. The third lens L3-7 may have negative refractive power, for example. The third lens L3-7 may have a convex meniscus shape toward the object side O. A partial region of an object side surface S7 of the fourth lens L4-7 and a partial region of an image side surface S8 thereof may each be planar. The fourth lens L4-7 may include, for example, a first central region S7-1 which is planar on the object side surface S7 and a first peripheral region S7-2 having an aspherical surface. The fourth lens L4-7 may include a second central region S8-1 which is planar on the image side surface S8 and a second peripheral region S8-2 having an aspherical surface. The fourth lens L4-7 may have zero refractive power in a central region thereof. For example, each of the first peripheral region S7-1 and the second peripheral region S8-2 may have positive or negative refractive power. (The sizes, i.e., the surface areas, of the first and second central regions S7-1 and S8-1 of the fourth lens S4-7 may be approximately the same. The central region of the fourth lens L4-7 may be composed of the first and second central regions S7-1 and S8-1 and the portion of the fourth lens L4-7 directly therebetween.)

The fifth lens L5-7 and the sixth lens L6-7 may include at least one inflection point. The sixth lens L6-7 may have negative refractive power.

Figure 15:
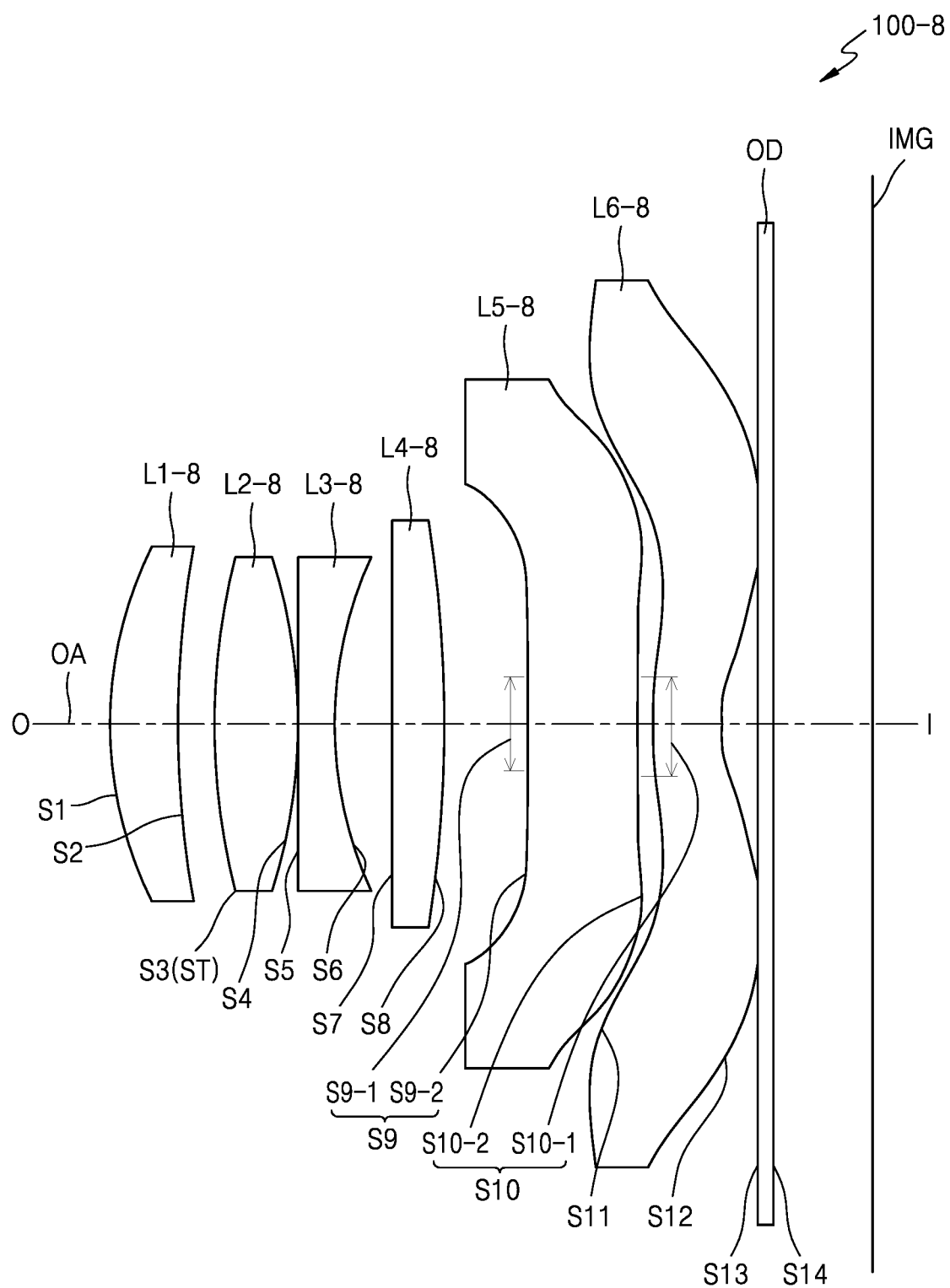
FIG. 15 is a cross-sectional view of an optical lens assembly according to an eighth embodiment.

FIG. 15 is a cross-sectional view of an optical lens assembly 100-8 according to an eighth embodiment.

Optical lens assembly 100-8 may include a first lens L1-8, a second lens L2-8, a third lens L3-8, a fourth lens L4-8, a fifth lens L5-8, and a sixth lens L6-8, which are arranged from an object side O to an image side I. In the embodiment of FIG. 15, descriptions of similar elements to those of the above-described embodiment will be omitted, and descriptions based on each of lenses (example: the first lens L1-8, the second lens L2-8, the third lens L3-8, the fourth lens L4-8, the fifth lens L5-8, or the sixth lens L6-8) will be provided. For example, a partial region of an object side surface S9 of the fifth lens L5-8 and a partial region of an image side surface S10 thereof may each be planar. The fifth lens L5-8 may include, for example, a first central region S9-1 which is planar on the object side surface S9 and a first peripheral region S9-2 having an aspherical surface. The fifth lens L5-8 may include a second central region S10-1 which is planar on the image side surface S10 and a second peripheral region S10-2 having an aspherical surface. The fifth lens L5-8 may have zero refractive power in a central region thereof. Each of the first peripheral region S9-2 and the second peripheral region S10-2 of the fifth lens L5-8 may have positive or negative refractive power. (The sizes, i.e., the surface areas, of the first and second central regions S9-1 and S10-1 may be approximately the same. A central region of the fifth lens L5-8 may be composed of the first and second central regions S9-1 and S10-1 and the portion of the fifth lens L5-8 directly therebetween.)

Figure 17:
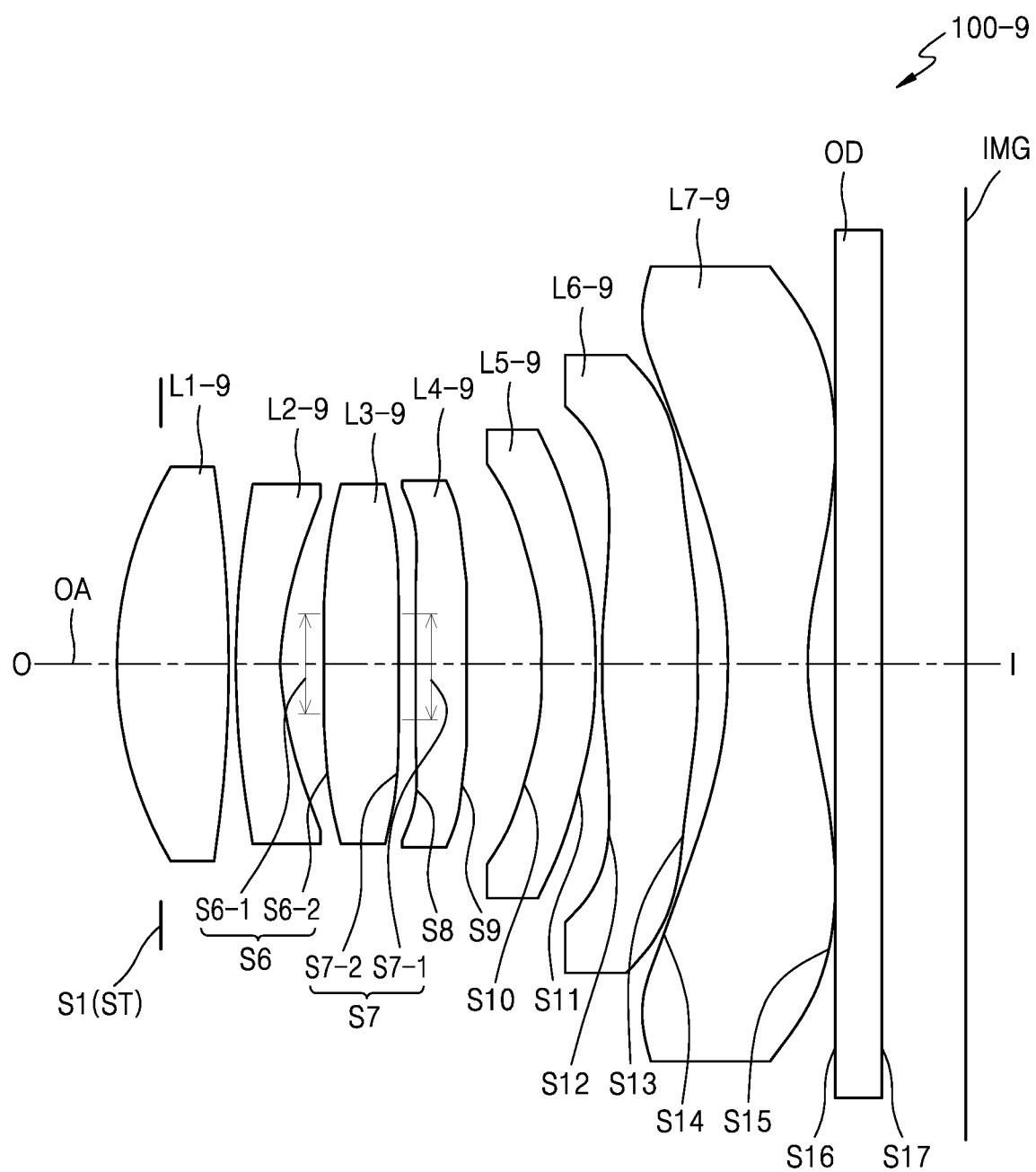
FIG. 17 is a cross-sectional view of an optical lens assembly according to a ninth embodiment.

FIG. 17 is a cross-sectional view of an optical lens assembly 100-9 according to a ninth embodiment.

Optical lens assembly 100-9 may include a first lens L1-9, a second lens L2-9, a third lens L3-9, a fourth lens L4-9, a fifth lens L5-9, a sixth lens L6-9, and a seventh lens L7-9, which are arranged from an object side O to an image side I.

First lens L1-9 may be a biconvex lens. The second lens L2-9 may have a concave meniscus shape toward the image side I. A partial region of an object side surface S6 of the third lens L3-9 and a partial region of an image side surface S7 thereof may each be planar. The third lens L3-9 may include, for example, a first central region S6-1 which is planar on the object side surface S6 and a first peripheral region S6-2 having an aspherical surface. The third lens L3-9 may include a second central region S7-1 which is planar on the image side surface S7 and a second peripheral region S7-2 having an aspherical surface. The third lens L3-9 may have zero refractive power in a central region thereof. The fourth lens L4-9 may be a convex meniscus lens toward the object side O. The fifth lens L5 may be a convex meniscus lens toward the image side I. The sixth lens L6-9 and the seventh lens L7-9 may have at least one inflection point, for example. (The sizes, i.e., the surface areas, of the first and second central regions S6-1 and S7-1 of third lens L3-9 may be approximately the same. A central region of third lens L3-9 may be composed of the first and second central regions S6-1 and S7-1 and the portion of third lens L3-9 directly therebetween.)

According to various embodiments, at least one of the first through seventh lenses may include an aspherical lens. For example, at least one of the first through seventh lenses may include at least one aspherical surface. For example, each of the first through seventh lenses may be an aspherical lens. At least one of the first through seventh lenses may include a plastic lens. For example, each of the first through seventh lenses may be a plastic lens. Optical lens assembly 100-9 may include an aperture ST on the object side O of the second lens L2-9.

In the figures illustrating the various embodiments described above, opposite central regions of lenses with planar central region surfaces are shown to have approximately the same size, i.e., surface area. However, an optical lens assembly according to various embodiments may satisfy the following equation.

$$0.01 < \text{``}\varphi\text{flat-object''}/\varphi\text{full} < 0.5 \quad (1)$$

where, when a central region configured as a planar surface is included in each of an object side surface and an image side surface of at least one lens, φflat-object is a diameter of the central region configured with a planar surface on an object side surface of the at least one lens, and φfull is an effective diameter of the at least one lens. (As is well known in lens technology, in the "boxing system" standard of lens measurement adopted by the Optical Manufacturers Association, the "effective diameter" of a lens may be defined as twice the distance from the geometric center of the lens' furthest edge of the lens shape.)

When Equation 1 is satisfied, lenses may be easily manufactured, and aberration may be satisfactorily corrected.

An optical lens assembly according to various embodiments may satisfy the following equation.

$$0.01 < \text{``}\varphi\text{flat-image''}/\varphi\text{full} < 0.5 \quad (2)$$

where, when a central region configured as a planar surface is included in each of an object side surface and an image side surface of at least one lens, φflat-image is a diameter of the central region configured with a planar surface on an image side surface of the at least one lens, and φfull is an effective diameter of the at least one lens. When Equation 2 is satisfied, lenses may be easily manufactured, and aberration may be satisfactorily corrected. Both sides of a partial region of a lens are manufactured with planar surfaces so that productivity of lenses may be improved and the size of a planar region is adjusted to minimize the occurrence of aberration and thus a problem relating to optical performance may be reduced.

An optical lens assembly according to various embodiments may have a compact size and high resolution. The optical lens assembly may be mounted on a mobile terminal device, for example, and may be applied to a digital camera, a camcorder, a personal computer or other electronic products.

Meanwhile, example aspherical surfaces used in an optical lens assembly according to various embodiments will be defined as described below.

When an optical axis direction is an x-axis and a direction perpendicular to the optical axis direction is a y-axis, the aspherical surfaces may be indicated using the following equation when a proceeding direction of rays is positive. Here, x is a distance from a vertex of a lens in the optical axis direction, y is a distance in a direction perpendicular to the optical axis, K is a conic constant, A, B, C, D, and . . . are aspherical coefficients, and c is a reciprocal (1/R) of a curvature radius at the vertex of the lens.

$$x = \frac{cy^2}{1 + \sqrt{1 - (K+1)c^2 y^2}} + Ay^4 + By^6 + Cy^8 + Dy^{10} + \ldots \quad (3)$$

In embodiments, the optical lens assembly may be implemented according to examples having the following various designs.

In each of the embodiments, lens surface numbers S1, S2, S3, . . . , and Sn (n is a natural number) are sequentially given from the object side O to the image side I, and a central region configured as a planar surface is numbered in the form of Sn-1, and a peripheral region configured of an aspherical surface is numbered in the form of Sn-2. EFL is a focal length of the optical lens assembly, F-number is an F number, FOV is an angle of view, R is a radius of curvature, Dn is a thickness of a lens or an aerial distance between lenses, IMH is an image height, Nd is a refractive index, and Vd is an Abbe's number. ST is an aperture. * signifies an aspherical surface.

<First Embodiment>

Table 1 shows design data of the optical lens assembly according to the first embodiment of FIG. 1 described above. Example design variables are:

EFL=3.02 mm
FOV=74 degree
F-number=2.0
IMH=2.285 mm
φflat-L2S1/φfull-L2=0.12
φflat-L2S2/φfull-L2=0.12

φflat-L2S1 is a diameter of a planar central region of an object side surface of a second lens, φflat-L2S2 is a diameter of a planar central region of an image side surface of the second lens, and φfull-L2 is an effective diameter of the second lens.

TABLE 1

| Lens surface | R (mm) | Dn (mm) | Nd | Vd | Effective diameter (mm) | Hole diameter (mm) |
|---|---|---|---|---|---|---|
| S1(ST) | infinity | −0.08 | | | 1.48 | 0 |
| S2* | 1.5826 | 0.5695 | 1.5373 | 55.7 | 1.5 | 0 |
| S3* | 6.7858 | 0.0882 | | | 1.6 | 0 |
| S4   S4-1 | infinity | 0 | 1.6483 | 22.4 | 0.2 | 0 |
| S4-2* | infinity | 0.27 | 1.6483 | 22.4 | 1.7 | 0.2 |
| S5   S5-1 | infinity | 0 | | | 0.2 | 0 |
| S5-2* | infinity | 0.6095 | | | 1.7 | 0.2 |
| S6* | −1.2435 | 0.4257 | 1.5373 | 55.7 | 1.9 | 0 |
| S7* | −0.8957 | 0.214 | | | 2.1 | 0 |
| S8* | 2.1594 | 0.6257 | 1.5465 | 56.1 | 3.1 | 0 |
| S9* | 1.007 | 0.3292 | | | 3.8 | 0 |
| S10 | infinity | 0.1100 | 1.5187 | 64.2 | 3.9 | 0 |
| S11 | infinity | 0.6100 | | | 4.0 | 0 |
| IMG | | 0.0200 | | | 4.57 | 0 |

In the first embodiment, the second lens L2-1 may include an object side surface S4 and an image side surface S5 each including a central region S4-1 and a central region S5-1 both configured as planar surfaces. The object side surface S4 may include the central region S4-1 having a planar surface with an effective diameter of 0.2 mm and a peripheral region S4-2 having a hole diameter of 0.2 mm. The image side surface S5 may include the central region S5-1 having a planar surface with an effective diameter of 0.2 mm and a peripheral region S5-2 having a hole diameter of 0.2 mm.

Table 2 shows aspherical coefficients in example design of the first embodiment.

TABLE 2

| Lens surface | R | K | A | B | C | D | E | F |
|---|---|---|---|---|---|---|---|---|
| S2 | 1.58E+00 | −1.95E+00 | −8.14E−03 | 3.61E−02 | −1.47E−01 | 6.56E−02 | −2.26E−01 | 0.00E+00 |
| S3 | 6.79E+00 | −1.47E+02 | −2.97E−01 | −3.81E−02 | −1.95E−02 | 1.04E−01 | −5.28E−02 | 0.00E+00 |
| S4-2 | Infinity | −2.00E+02 | −1.96E−01 | 1.28E−02 | 4.04E−02 | 2.25E−01 | −6.45E−02 | 0.00E+00 |
| S5-2 | Infinity | −2.00E+02 | 1.02E−01 | −4.33E−05 | 1.38E−01 | −2.05E−01 | 1.22E−01 | 0.00E+00 |
| S6 | −1.24E+00 | −4.74E+00 | −9.73E−02 | −1.39E−02 | 7.84E−02 | 2.00E−02 | −1.49E−02 | −9.00E−03 |
| S7 | −8.96E−01 | −2.48E+00 | −1.30E−01 | 5.41E−02 | −2.95E−02 | 3.67E−02 | 4.31E−02 | −1.99E−02 |
| S8 | 2.16E+00 | −5.57E+00 | −1.53E−01 | 4.53E−02 | −3.27E−04 | −3.67E−03 | 7.64E−04 | 1.96E−05 |
| S9 | 1.01E+00 | −4.20E+00 | −1.07E−01 | 5.44E−02 | −2.22E−02 | 5.65E−03 | −8.35E−04 | 5.23E−05 |

Figure 2:
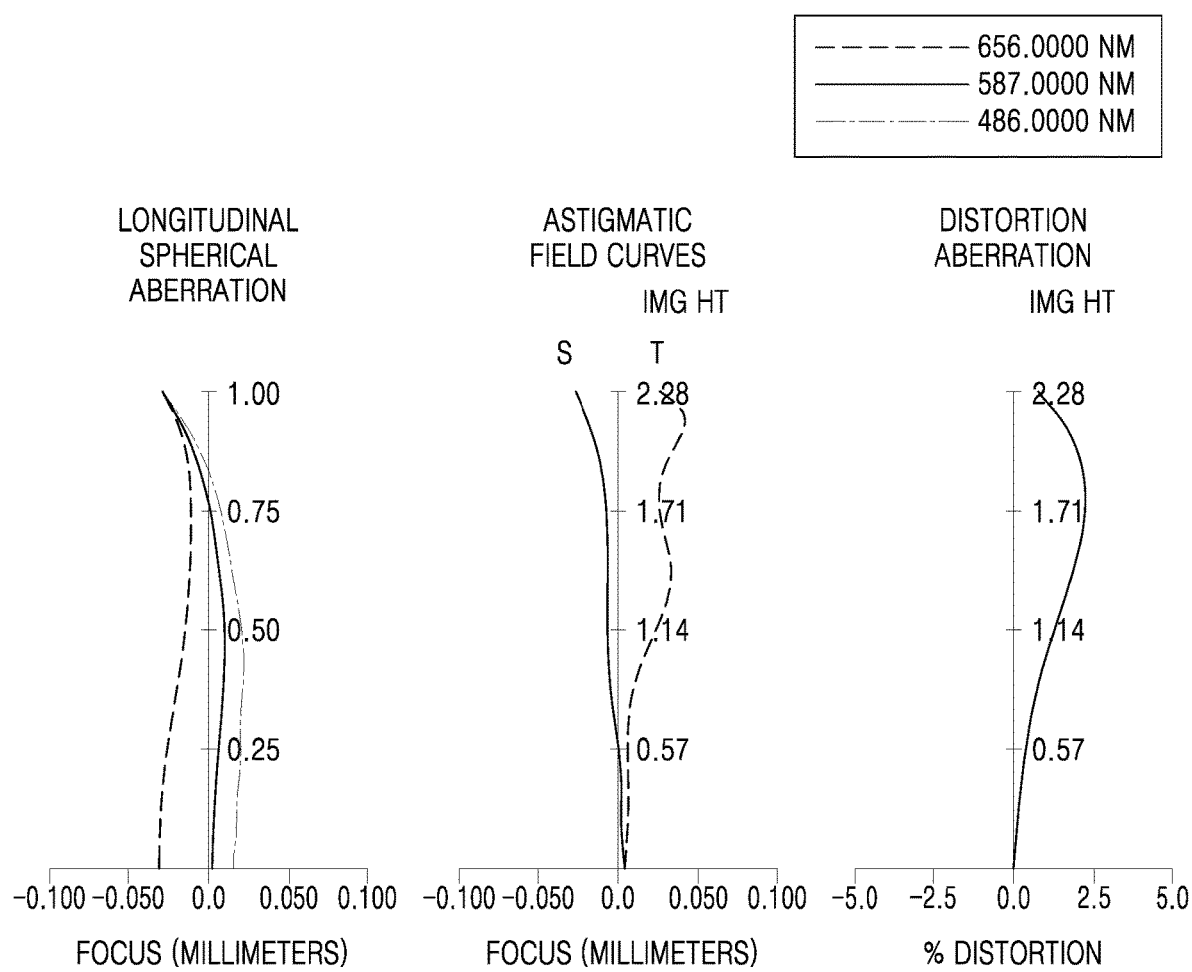
FIG. 2 shows a set of graphs depicting aberrations of the optical lens assembly of FIG. 1 according to the first embodiment.

FIG. 2 shows graphs of longitudinal spherical aberration, astigmatic field curves, and distortion aberration of the optical lens assembly according to the first embodiment. Longitudinal spherical aberration is indicated for light having a wavelength of 656.0000 nanometer (NM), light having a wavelength of 587.0000 NM, and light having a wavelength of 486.0000 NM, respectively, and astigmatic field curves include a tangential field curvature T and a sagittal field curvature S. Astigmatic field curves are indicated for light having a wavelength of 587.0000 NM, and distortion aberration is indicated for light having a wavelength of 587.0000 NM.

<Second Embodiment>

Table 3 shows design data of the optical lens assembly according to the second embodiment of FIG. 3 described above. Example variables are:

EFL=3.42 mm
FOV=66 degree
F-number=2.8
IMH=2.285 mm
φflat-L3S1/φfull-L3=0.09
φflat-L3S2/φfull-L3=0.09 where φflat-L3S1 is a diameter of a planar central region of an object side surface of a third lens, φflat-L3S2 is a diameter of a planar central region of an image side surface of the third lens, and φfull-L3 is an effective diameter of the third lens.

TABLE 3

| Lens surface | R (mm) | Dn (mm) | Nd | Vd | Effective diameter (mm) | Hole diameter (mm) |
|---|---|---|---|---|---|---|
| S1(ST) | Infinity | −0.12 | | | 1.221341378 | |
| S2* | 1.3500 | 0.5522 | 1.547 | 56.2 | 1.3 | 0 |
| S3* | −8.8895 | 0.0400 | | | 1.4 | 0 |

TABLE 3-continued

| Lens surface | | R (mm) | Dn (mm) | Nd | Vd | Effective diameter (mm) | Hole diameter (mm) |
|---|---|---|---|---|---|---|---|
| S4* | | 17.2093 | 0.3700 | 1.6384 | 23.4 | 1.4 | 0 |
| S5* | | 2.1401 | 0.5478 | | | 1.4 | 0 |
| S6 | S6-1 | Infinity | 0.0000 | 1.6384 | 23.4 | 0.2 | 0 |
| | S6-2* | Infinity | 0.3161 | 1.6384 | 23.4 | 1.8 | 0.2 |
| S7 | S7-1 | Infinity | 0.0000 | | | 0.2 | 0 |
| | S7-2* | Infinity | 0.3194 | | | 2.2 | 0.2 |
| S8* | | 2.4920 | 0.8000 | 1.547 | 56.2 | 3 | 0 |
| S9* | | 1.7854 | 0.1545 | | | 3.7 | 0 |
| S10 | | Infinity | 0.3000 | 1.5187 | 64.2 | 3.9 | 0 |
| S11 | | Infinity | 0.4950 | | | 3.8 | 0 |
| IMG | | | 0.0050 | | | 4.57 | 0 |

In the second embodiment, the third lens L3-2 may include an object side surface S6 and an image side surface S7 including a planar central region S6-1 and a planar central region S7-1, respectively. The object side surface S6 may include the planar central region S6-1 with an effective diameter of 0.2 mm and a peripheral region S6-2 having a hole diameter of 0.2 mm. The image side surface S7 may include the planar central region S7-1 with an effective diameter of 0.2 mm and a peripheral region S7-2 having a hole diameter of 0.2 mm.

Table 4 shows aspherical coefficients in the first embodiment.

TABLE 4

| Lens surface | R | K | A | B | C | D | E | F | G |
|---|---|---|---|---|---|---|---|---|---|
| S2 | 1.35E+00 | −5.55E−01 | −9.99E−03 | −3.76E−02 | −5.02E−02 | −1.18E−01 | 0.00E+00 | 0.00E+00 | 0.00E+00 |
| S3 | −8.89E+00 | 1.32E+02 | −2.36E−02 | −7.02E−03 | 2.12E−02 | −2.37E−02 | −5.48E−02 | 0.00E+00 | 0.00E+00 |
| S4 | 1.72E+01 | 7.96E+01 | 1.28E−02 | 1.17E−01 | 9.48E−02 | −1.35E−01 | 0.00E+00 | 0.00E+00 | 0.00E+00 |
| S5 | 2.14E+00 | −2.89E+00 | 1.28E−02 | 6.55E−02 | 2.52E−01 | 0.00E+00 | 0.00E+00 | 0.00E+00 | 0.00E+00 |
| S6-2 | infinity | 2.19E+04 | −3.81E−02 | −1.07E−01 | −5.59E−02 | 9.24E−02 | −1.25E−01 | −8.59E−02 | −5.99E−03 |
| S7-2 | infinity | 2.00E+02 | −1.12E−01 | 8.22E−02 | −8.14E−02 | 5.06E−03 | 1.28E−03 | −1.66E−03 | 4.93E−03 |
| S8 | 2.49E+00 | −2.12E+01 | −1.60E−01 | 5.29E−02 | −1.98E−03 | 3.79E−04 | −2.27E−05 | −2.69E−05 | −2.04E−05 |
| S9 | 1.79E+00 | −7.77E+00 | −7.60E−02 | 1.55E−02 | −3.35E−03 | 1.99E−04 | −1.06E−05 | 1.87E−05 | 4.42E−07 |

Figure 4:
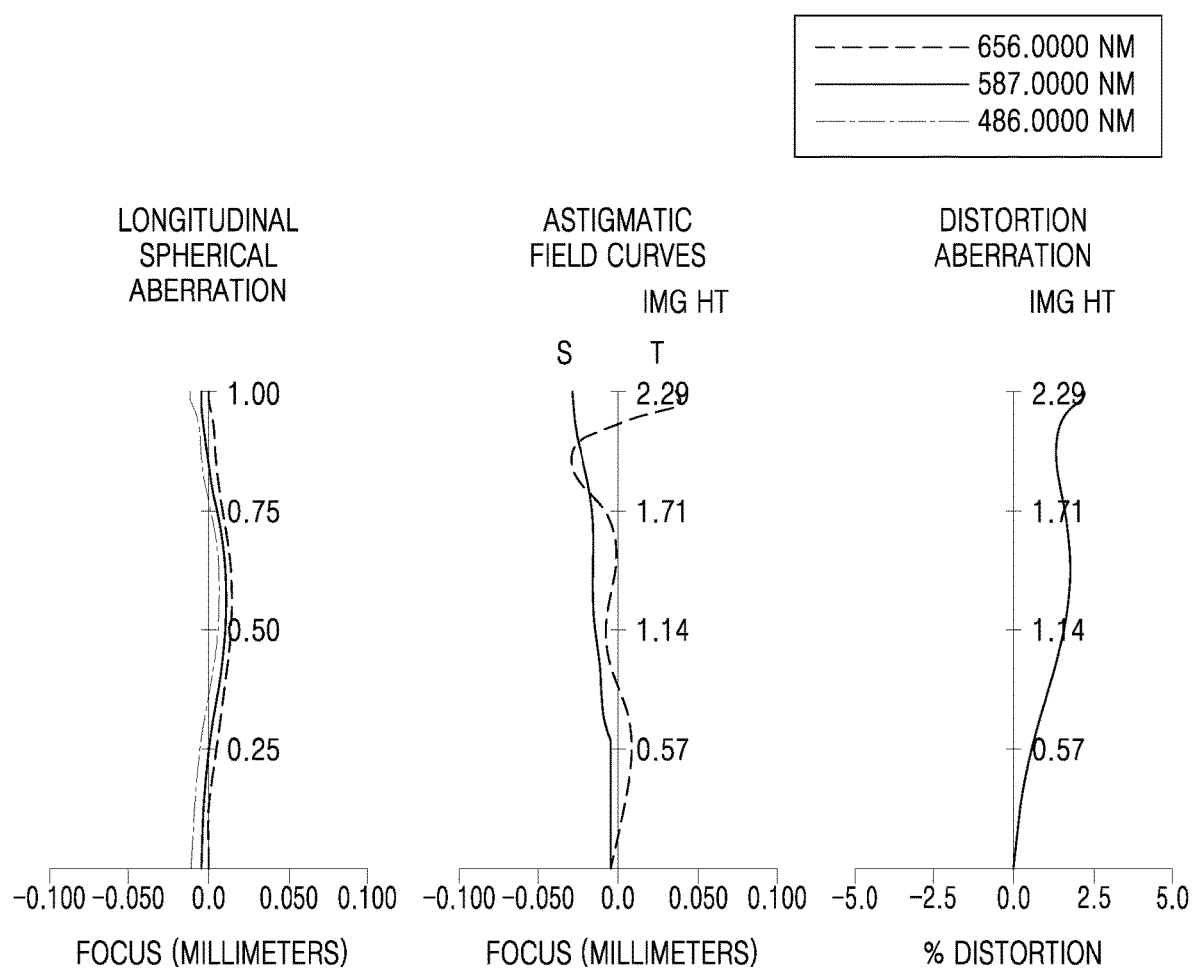
FIG. 4 shows a set of graphs depicting aberrations of the optical lens assembly of FIG. 3 according to the second embodiment.

FIG. 4 shows graphs of longitudinal spherical aberration, astigmatic field curves, and distortion aberration of the optical lens assembly according to the second embodiment.

<Third Embodiment>

Table 5 shows design data of the optical lens assembly according to the third embodiment of FIG. 5. Example design data is as follows:

EFL=3.40 mm
FOV=67 degree
F-number=2.3
IMH=2.300 mm
φflat-L3S1/φfull-L3=0.11
φflat-L3S2/φfull-L3=0.11 where φflat-L3S1 is a diameter of a planar central region of an object side surface of a third lens, φflat-L3S2 is a diameter of a planar central region of an image side surface of the third lens, and φfull-L3 is an effective diameter of the third lens.

TABLE 5

| | Lens surface | R (mm) | Dn (mm) | Nd | Vd | Effective diameter (mm) | Hole diameter (mm) |
|---|---|---|---|---|---|---|---|
| | S1* | 1.2781 | 0.5485 | 1.5334 | 55.9 | 1.50 | 0 |
| | S2* | −10.1664 | 0.0400 | | | 1.40 | 0 |
| | S3(ST) | infinity | 0.0400 | | | 1.30 | 0 |
| | S4* | 7.6992 | 0.3000 | 1.6411 | 23.9 | 1.30 | 0 |
| | S5* | 1.6504 | 0.2904 | | | 1.40 | 0 |
| S6 | S6-1 | infinity | 0.0000 | 1.5334 | 55.9 | 0.20 | 0 |
| | S6-2* | infinity | 0.3000 | 1.5334 | 55.9 | 1.60 | 0.2 |
| S7 | S7-1 | infinity | 0.0000 | | | 0.20 | 0 |
| | S7-2* | infinity | 0.3053 | | | 1.90 | 0.2 |
| | S8* | −5.7016 | 0.3710 | 1.6411 | 23.9 | 2.00 | 0 |
| | S9* | −4.6941 | 0.0400 | | | 2.50 | 0 |
| | S10* | 1.2551 | 0.4427 | 1.5334 | 55.9 | 3.10 | 0 |
| | S11* | 1.1029 | 0.1520 | | | 3.50 | 0 |
| | S12 | infinity | 0.3000 | 1.5187 | 64.2 | 3.80 | 0 |
| | S13 | infinity | 0.7819 | | | 3.95 | 0 |
| | IMG | | 0.0081 | | | 4.62 | 0 |

In the third embodiment, a third lens L3-3 may include an object side surface S6 and an image side surface S7 including a planar central region S6-1 and a planar central region S7-1, respectively. The object side surface S6 may include the planar central region S6-1 with an effective diameter of 0.2 mm and a peripheral region S6-2 having a hole diameter of 0.2 mm. The image side surface S7 may include the planar central region S7-1 with an effective diameter of 0.2 mm and a peripheral region S7-2 having a hole diameter of 0.2 mm.

Table 6 shows aspherical coefficients in the third embodiment.

TABLE 6

| Lens surface | R | K | A | B | C | D | E | F |
|---|---|---|---|---|---|---|---|---|
| S1 | 1.28E+00 | −7.86E−02 | −3.10E−02 | 9.74E−02 | −4.23E−01 | 6.52E−01 | −5.94E−01 | 0.00E+00 |
| S2 | −1.02E+01 | −3.25E+02 | −5.09E−02 | 1.13E−01 | −4.12E−01 | 1.46E−01 | 7.11E−02 | 0.00E+00 |
| S4 | 7.70E+00 | 4.39E+01 | −6.18E−02 | 2.48E−01 | −5.60E−01 | 1.20E−01 | 5.13E−01 | 0.00E+00 |
| S5 | 1.65E+00 | −5.78E+00 | 1.26E−01 | 2.25E−01 | −1.69E−01 | −3.59E−01 | 8.78E−01 | 0.00E+00 |
| S6-2 | Infinity | 0.00E+00 | −2.09E−01 | 2.30E−01 | 3.22E−01 | −7.25E−01 | 4.03E−01 | 0.00E+00 |
| S7-2 | infinity | 0.00E+00 | −2.48E−01 | 1.55E−01 | −2.50E−02 | 1.82E−01 | −1.33E−01 | 0.00E+00 |
| S8 | −5.70E+00 | −4.58E+02 | 6.76E−02 | −3.47E−01 | 1.19E−01 | 2.47E−02 | −7.72E−02 | 0.00E+00 |
| S9 | −4.69E+00 | 1.22E+01 | 9.95E−02 | −1.93E−01 | 8.93E−02 | −2.51E−02 | 4.87E−03 | 0.00E+00 |
| S10 | 1.26E+00 | −9.08E+00 | −2.45E−01 | −1.51E−03 | 9.64E−02 | −4.86E−02 | 1.02E−02 | −8.57E−04 |
| S11 | 1.10E+00 | −5.82E+00 | −1.90E−01 | 6.02E−02 | −1.48E−02 | 2.50E−03 | −4.98E−04 | 7.95E−05 |

Figure 6:
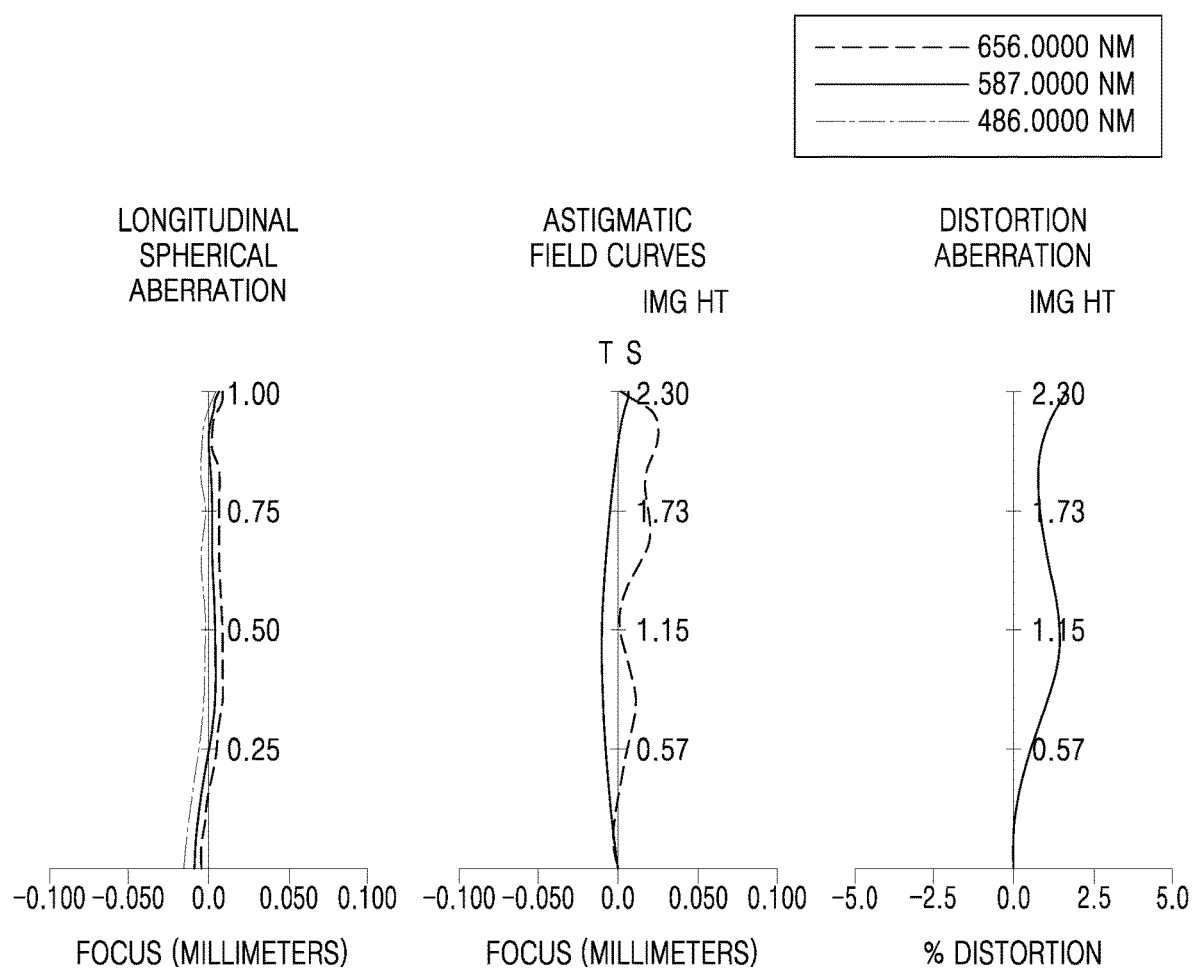
FIG. 6 shows a set of graphs depicting aberrations of the optical lens assembly of FIG. 5 according to the third embodiment.

FIG. 6 shows graphs of longitudinal spherical aberration, astigmatic field curves, and distortion aberration of the optical lens assembly according to the third embodiment.

<Fourth Embodiment>

Table 7 shows example design data of the optical lens assembly according to the fourth embodiment of FIG. 7. For example.

EFL=3.40 mm
FOV=67 degree
F-number=2.3
IMH=2.300 mm
φflat-L4S1/φfull-L4=0.08
φflat-L4S2/φfull-L4=0.08 where φflat-L4S1 is a diameter of a planar central region of an object side surface of a fourth lens, φflat-L4S2 is a diameter of a planar central region of an image side surface of the fourth lens, and φfull-L4 is an effective diameter of the fourth lens.

TABLE 7

| Lens surface | | R (mm) | Dn (mm) | Nd | Vd | Effective diameter (mm) | Hole diameter (mm) |
|---|---|---|---|---|---|---|---|
| | S1* | 1.2758 | 0.5516 | 1.5334 | 55.9 | 1.50 | 0 |
| | S2* | −8.7035 | 0.0400 | | | 1.40 | 0 |
| | S3(ST) | infinity | 0.0400 | | | 1.30 | 0 |
| | S4* | 6.8241 | 0.3000 | 1.6411 | 23.9 | 1.30 | 0 |
| | S5* | 1.5635 | 0.2744 | | | 1.40 | 0 |
| | S6* | −7.8179 | 0.3348 | 1.5334 | 55.9 | 1.50 | 0 |
| | S7* | −7.5877 | 0.3468 | | | 1.80 | 0 |
| S8 | S8-1 | infinity | 0.0000 | 1.6411 | 23.9 | 0.20 | 0 |
| | S8-2* | infinity | 0.3000 | 1.6411 | 23.9 | 2.10 | 0.2 |
| S9 | S9-1 | infinity | 0.0000 | | | 0.20 | 0 |
| | S9-2* | infinity | 0.0400 | | | 2.50 | 0.2 |
| | S10* | 1.5345 | 0.4774 | 1.5334 | 55.9 | 3.30 | 0 |
| | S11* | 1.4978 | 0.1252 | | | 3.60 | 0 |
| | S12 | infinity | 0.3000 | 1.5187 | 64.2 | 3.90 | 0 |
| | S13 | infinity | 0.7819 | | | 4.03 | 0 |
| | IMG | | 0.0081 | | | 4.61 | 0 |

In the fourth embodiment, a fourth lens L4-4 may include an object side surface S8 and an image side surface S9 each including a central region S8-1 and a central region S9-1 having both sides configured as planar surfaces. The object side surface S8 may include the planar central region S8-1 with an effective diameter of 0.2 mm and a peripheral region S8-2 having a hole diameter of 0.2 mm. The image side surface S9 may include the planar central region S9-1 with an effective diameter of 0.2 mm and a peripheral region S9-2 having a hole diameter of 0.2 mm.

Table 8 shows aspherical coefficients in the fourth embodiment.

TABLE 8

| Lens surface | R | K | A | B | C | D | E | F |
|---|---|---|---|---|---|---|---|---|
| S1 | 1.28E+00 | −6.85E−02 | −3.17E−02 | 1.10E−01 | −4.40E−01 | 6.42E−01 | −5.46E−01 | 0.00E+00 |
| S2 | −8.70E+00 | −2.27E+02 | −4.66E−02 | 1.36E−01 | −4.25E−01 | 4.02E−02 | 2.70E−01 | 0.00E+00 |
| S4 | 6.82E+00 | 3.77E+01 | −6.99E−02 | 2.51E−01 | −5.47E−01 | −2.44E−02 | 8.00E−01 | 0.00E+00 |
| S5 | 1.56E+00 | −5.43E+00 | 1.31E−01 | 2.18E−01 | −2.04E−01 | −3.13E−01 | 9.56E−01 | 0.00E+00 |
| S6 | −7.82E+00 | 0.00E+00 | −1.25E−01 | 1.63E−01 | 3.69E−01 | −6.92E−01 | 1.50E−01 | 0.00E+00 |
| S7 | −7.59E+00 | 2.25E+01 | −2.01E−01 | 2.06E−01 | −1.83E−02 | 1.47E−01 | −1.80E−01 | 0.00E+00 |
| S8-2 | infinity | 0.00E+00 | 2.56E−02 | −3.62E−01 | 1.24E−01 | 5.52E−02 | −9.97E−02 | 0.00E+00 |
| S9-2 | infinity | 0.00E+00 | −4.55E−02 | −1.85E−01 | 1.03E−01 | −3.28E−02 | 9.38E−04 | 0.00E+00 |
| S10 | 1.53E+00 | −1.20E+01 | −1.94E−01 | −8.41E−03 | 9.40E−02 | −4.89E−02 | 1.03E−02 | −7.93E−04 |
| S11 | 1.50E+00 | −8.59E+00 | −1.37E−01 | 4.70E−02 | −1.37E−02 | 2.81E−03 | −4.84E−04 | 5.14E−05 |

Figure 8:
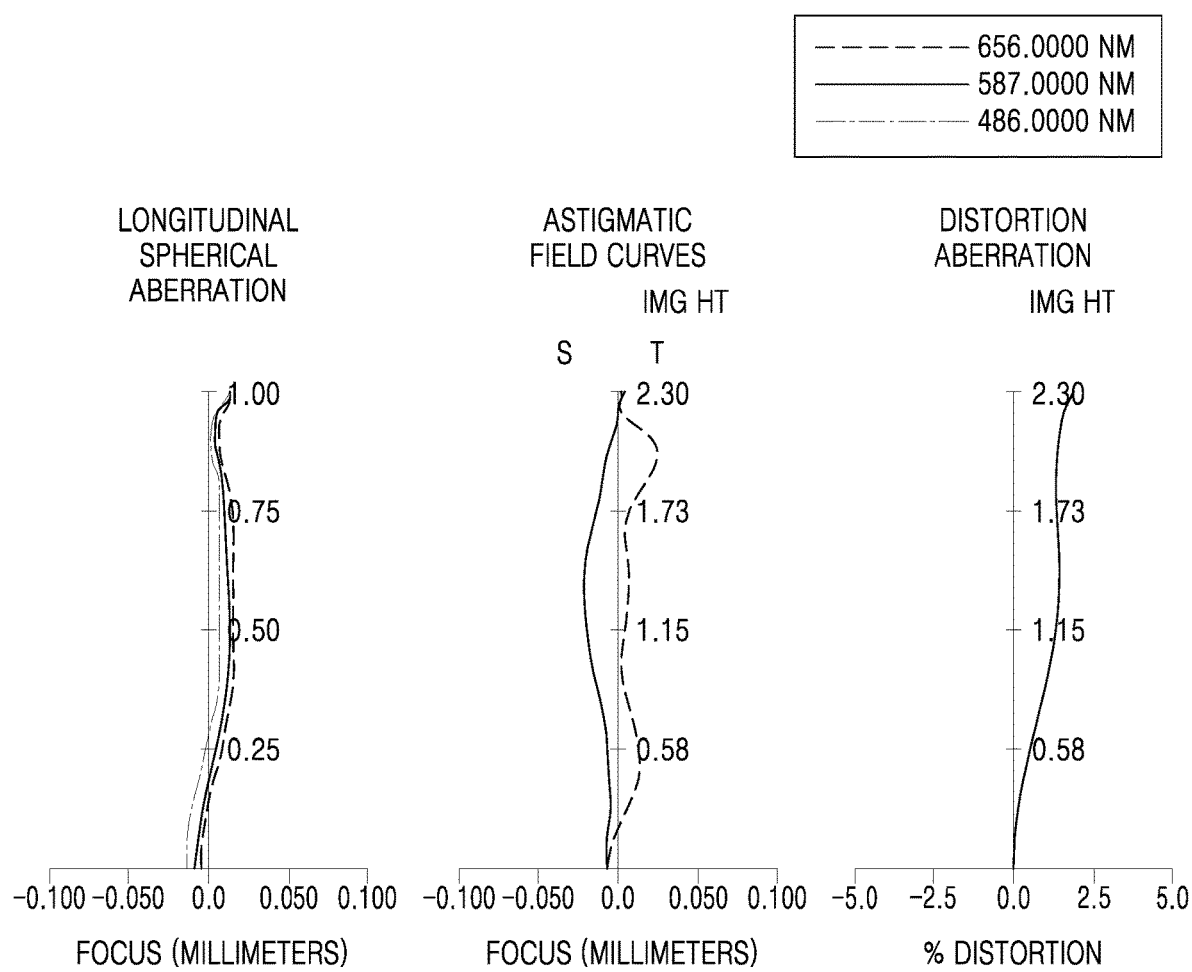
FIG. 8 shows a set of graphs depicting aberrations of the optical lens assembly of FIG. 7 according to the fourth embodiment.

FIG. 8 shows graphs of longitudinal spherical aberration, astigmatic field curves, and distortion aberration of the optical lens assembly according to the fourth embodiment.

<Fifth Embodiment>

Table 9 shows design data of the optical lens assembly according to the fifth embodiment of FIG. 9. For example.

EFL=3.40 mm
FOV=67 degree
F-number=2.3
IMH=2.300 mm
φflat-L3S1/φfull-L3=0.11
φflat-L3S2/φfull-L3=0.11
φflat-L4S1/φfull-L4=0.08
φflat-L4S2/φfull-L4=0.08

φflat-L3S1 is a diameter of a planar central region of an object side surface of a third lens, φflat-L3S2 is a diameter of a planar central region of an image side surface of the third lens, φfull-L3 is an effective diameter of the third lens, φflat-L4S1 is a diameter of a planar central region of an object side surface of a fourth lens, φflat-L4S2 is a diameter of a planar central region of an image side surface of the fourth lens, and φfull-L4 is an effective diameter of the fourth lens.

TABLE 9

| Lens surface | | R (mm) | Dn (mm) | Nd | Vd | Effective diameter (mm) | Hole diameter (mm) |
|---|---|---|---|---|---|---|---|
| | S1* | 1.2765 | 0.5470 | 1.5334 | 55.9 | 1.50 | 0 |
| | S2* | −12.5369 | 0.0400 | | | 1.40 | 0 |
| | S3(ST) | infinity | 0.0400 | | | 1.30 | 0 |
| | S4* | 5.9363 | 0.3000 | 1.6411 | 23.9 | 1.30 | 0 |
| | S5* | 1.5457 | 0.2818 | | | 1.40 | 0 |
| S6 | S6-1 | infinity | 0.0000 | 1.5334 | 55.9 | 0.20 | 0 |
| | S6-2* | infinity | 0.3000 | 1.5334 | 55.9 | 1.60 | 0.2 |
| S7 | S7-1 | infinity | 0.0000 | | | 0.20 | 0 |
| | S7-2* | infinity | 0.3398 | | | 1.80 | 0.2 |
| S8 | S8-1 | infinity | 0.0000 | 1.6411 | 23.9 | 0.20 | 0 |
| | S8-2* | infinity | 0.3378 | 1.6411 | 23.9 | 2.00 | 0.2 |
| S9 | S9-1 | infinity | 0.0000 | | | 0.20 | 0 |
| | S9-2* | infinity | 0.0400 | | | 2.40 | 0.2 |
| | S10* | 1.4225 | 0.4710 | 1.5334 | 55.9 | 3.30 | 0 |
| | S11* | 1.4337 | 0.1326 | | | 3.60 | 0 |
| | S12 | infinity | 0.3000 | 1.5187 | 64.2 | 3.90 | 0 |
| | S13 | infinity | 0.7819 | | | | 0 |
| | IMG | | 0.0081 | | | | 0 |

In the fifth embodiment, a third lens L3-5 may include an object side surface S6 and an image side surface S7 each including a central region S6-1 and a central region S7-1 having both sides configured as planar surfaces. The object side surface S6 may include the planar central region S6-1 with an effective diameter of 0.2 mm and a peripheral region S6-2 having a hole diameter of 0.2 mm. The image side surface S7 may include the planar central region S7-1 with an effective diameter of 0.2 mm and a peripheral region S7-2 having a hole diameter of 0.2 mm.

Also, a fourth lens L4-5 may include an object side surface S8 and an image side surface S9 each including a central region S8-1 and a central region S9-1 having both sides configured as planar surfaces. The object side surface S8 may include the planar central region S8-1 with an effective diameter of 0.2 mm and a peripheral region S8-2 having a hole diameter of 0.2 mm. The image side surface S9 may include the planar central region S9-1 with an effective diameter of 0.2 mm and a peripheral region S9-2 having a hole diameter of 0.2 mm.

Table 10 shows aspherical coefficients in the fifth embodiment.

TABLE 10

| Lens surface | R | K | A | B | C | D | E | F |
|---|---|---|---|---|---|---|---|---|
| S1 | 1.28E+00 | −5.75E−02 | −2.96E−02 | 1.04E−01 | −4.29E−01 | 6.30E−01 | −5.39E−01 | 0.00E+00 |
| S2 | −1.25E+01 | −3.22E+02 | −4.85E−02 | 1.16E−01 | −4.17E−01 | 1.50E−01 | 1.24E−01 | 0.00E+00 |
| S4 | 5.94E+00 | 1.58E+01 | −9.24E−02 | 2.54E−01 | −5.50E−01 | 1.32E−01 | 5.51E−01 | 0.00E+00 |
| S5 | 1.55E+00 | −5.80E+00 | 1.33E−01 | 2.24E−01 | −2.36E−01 | −3.14E−01 | 9.47E−01 | 0.00E+00 |
| S6-2 | infinity | 0.00E+00 | −1.87E−01 | 2.66E−01 | 3.09E−01 | −8.13E−01 | 4.47E−01 | 0.00E+00 |
| S7-2 | infinity | 0.00E+00 | −2.95E−01 | 2.43E−01 | −3.71E−02 | 1.34E−01 | −1.29E−01 | 0.00E+00 |

TABLE 10-continued

| Lens surface | R | K | A | B | C | D | E | F |
|---|---|---|---|---|---|---|---|---|
| S8-2 | infinity | 0.00E+00 | 4.93E−02 | −6.00E−01 | 3.31E−01 | 7.21E−02 | −2.46E−01 | 0.00E+00 |
| S9-2 | infinity | 0.00E+00 | −3.68E−02 | −2.54E−01 | 1.62E−01 | −4.36E−02 | −4.31E−03 | 0.00E+00 |
| S10 | 1.42E+00 | −1.15E+01 | −1.82E−01 | −1.40E−02 | 9.27E−02 | −4.86E−02 | 1.05E−02 | −8.19E−04 |
| S11 | 1.43E+00 | −8.11E+00 | −1.37E−01 | 4.70E−02 | −1.37E−02 | 2.81E−03 | −4.84E−04 | 5.14E−05 |

Figure 10:
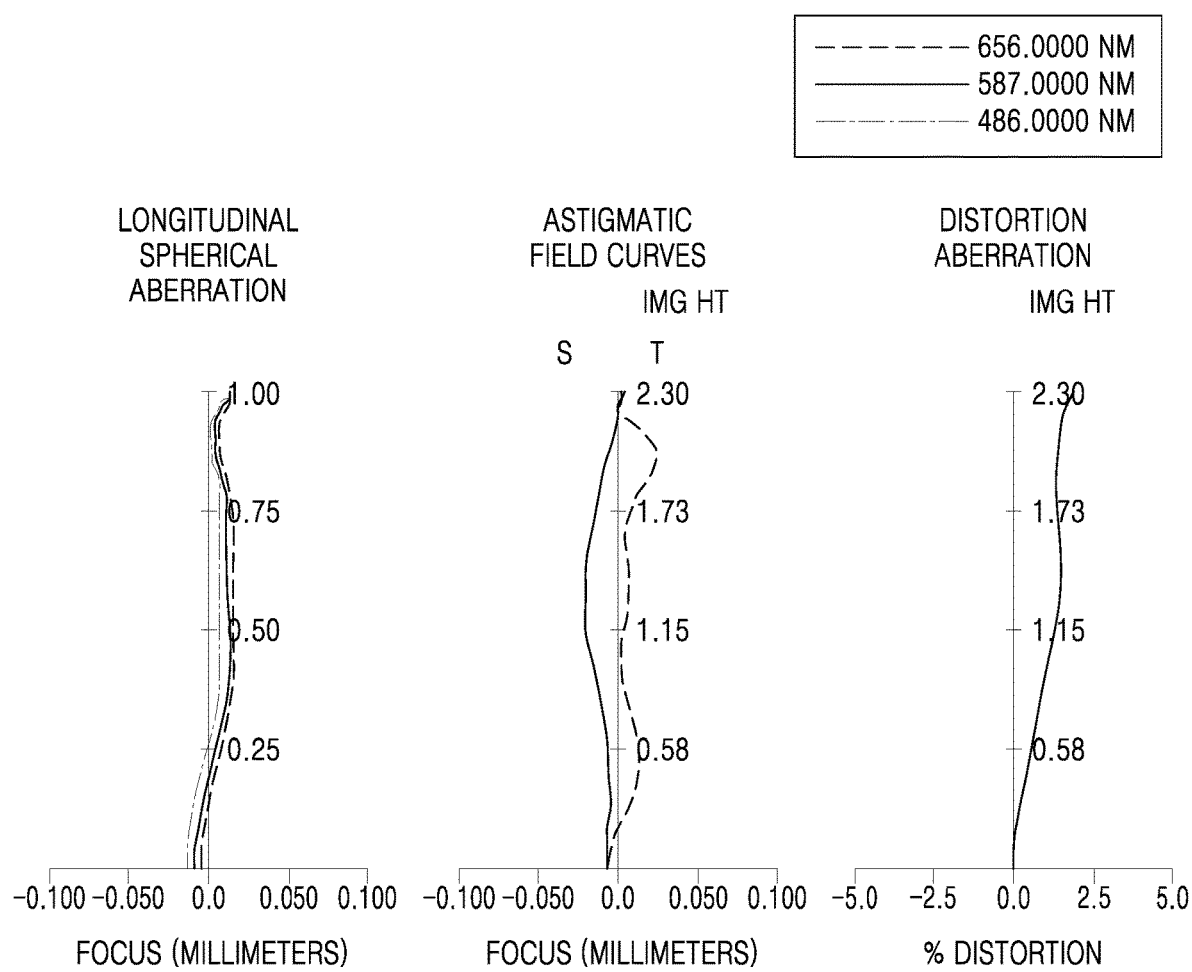
FIG. 10 shows a set of graphs depicting aberrations of the optical lens assembly of FIG. 9 according to the fifth embodiment.

FIG. 10 shows graphs of longitudinal spherical aberration, astigmatic field curves, and distortion aberration of the optical lens assembly according to the fifth embodiment.

<Sixth Embodiment>

Table 11 shows design data of the optical lens assembly according to the sixth embodiment of FIG. 11. For example.

EFL=2.15 mm
FOV=86 degree
F-number=1.8
IMH=2.000 mm
φflat-L1S1/φfull-L1=0.08
φflat-L1S2/φfull-L1=0.08 where φflat-L1S1 is a diameter of a planar central region of an object side surface of a first lens, φflat-L1S2 is a diameter of a planar central region of an image side surface of the first lens, and φfull-L1 is an effective diameter of the first lens.

TABLE 11

| Lens surface | | R | Dn (mm) | Nd | Vd | Effective diameter (mm) | Hole diameter (mm) |
|---|---|---|---|---|---|---|---|
| S1 | S1-1 | infinity | 0.0000 | 1.5471 | 56.1 | 0.20 | 0 |
| | S1-2* | 1000.0000 | 0.4150 | 1.5471 | 56.1 | 2.40 | 0.2 |
| S2 | S2-1 | infinity | 0.0000 | | | 0.20 | 0 |
| | S2-2* | 1000.0000 | 0.0506 | | | 1.90 | 0.2 |
| | S3* | 1.3206 | 0.2719 | 1.6417 | 23.9 | 1.60 | 0 |
| | S4* | 1.1918 | 0.2247 | | | 1.30 | 0 |
| | S5(ST)* | 4.3989 | 0.5774 | 1.5471 | 56.1 | 1.10 | 0 |
| | S6* | −1.4274 | 0.0200 | | | 1.50 | 0 |
| | S7* | 2.2508 | 0.1850 | 1.658 | 21.5 | 1.80 | 0 |
| | S8* | 1.3002 | 0.3334 | | | 1.90 | 0 |
| | S9* | −6.9679 | 0.5549 | 1.5471 | 56.1 | 2.00 | 0 |
| | S10* | −0.8279 | 0.2189 | | | 2.20 | 0 |
| | S11* | 3.5687 | 0.3400 | 1.5471 | 56.1 | 2.60 | 0 |
| | S12* | 0.6800 | 0.2095 | | | 3.40 | 0 |
| | S13 | infinity | 0.1100 | 1.5187 | 64.2 | 3.60 | 0 |
| | S14 | infinity | 0.3858 | | | 3.66 | 0 |
| | IMG | | 0.0035 | | | 4.00 | 0 |

In the sixth embodiment, a first lens L1-6 may include an object side surface S1 and an image side surface S2 each including a central region S1-1 and a central region S2-1 configured as planar surfaces. The object side surface S1 may include the planar central region S1- with an effective diameter of 0.2 mm and a peripheral region S1-2 having a hole diameter of 0.2 mm. The image side surface S2 may include the planar central region S2-1 with an effective diameter of 0.2 mm and a peripheral region S2-2 having a hole diameter of 0.2 mm.

Table 12 shows aspherical coefficients in the sixth embodiment.

TABLE 12

| Lens surface | R | K | A | B | C | D |
|---|---|---|---|---|---|---|
| S1-2 | 1.00E+03 | 0.00E+00 | 1.77E−01 | −1.27E−01 | 1.90E−01 | −3.08E−01 |
| S2-2 | 1.00E+03 | 0.00E+00 | −1.34E−01 | 2.26E+00 | −1.03E+01 | 2.81E+01 |
| S3 | 1.32E+00 | −1.10E+01 | −1.95E−01 | 2.13E+00 | −1.39E+01 | 4.73E+01 |
| S4 | 1.19E+00 | −7.73E−01 | −7.56E−01 | 6.30E+00 | −6.03E+01 | 3.61E+02 |
| S5 | 4.40E+00 | 3.54E+01 | −1.93E−01 | 4.70E−02 | −5.14E+00 | 4.07E+01 |
| S6 | −1.43E+00 | −2.03E+01 | −8.76E−01 | 2.37E+00 | −6.90E+00 | 1.52E+01 |
| S7 | 2.25E+00 | −3.19E+00 | −4.14E−01 | 7.52E−01 | −5.25E−01 | −3.19E+00 |
| S8 | 1.30E+00 | −2.30E+01 | −4.03E−01 | 8.83E−01 | −1.27E+00 | 4.12E−01 |
| S9 | −6.97E+00 | 4.03E+00 | 6.61E−02 | −5.79E−01 | 2.40E+00 | −5.99E+00 |
| S10 | −8.28E−01 | −1.76E+00 | 6.84E−02 | −1.57E−01 | −2.44E−01 | 2.19E+00 |
| S11 | 3.57E+00 | −3.50E+02 | −6.32E−01 | 7.22E−01 | −3.17E−01 | −3.58E−01 |
| S12 | 6.80E−01 | −5.53E+00 | −3.42E−01 | 4.52E−01 | −4.43E−01 | 2.98E−01 |

TABLE 12-continued

| Lens surface | E | F | G | H | J |
|---|---|---|---|---|---|
| S1-2 | 3.70E−01 | −2.70E−01 | 1.01E−01 | −1.06E−02 | −3.19E−03 |
| S2-2 | −4.90E+01 | 5.42E+01 | −3.63E+01 | 1.31E+01 | −1.87E+00 |
| S3 | −9.29E+01 | 1.08E+02 | −6.89E+01 | 1.82E+01 | 0.00E+00 |
| S4 | −1.30E+03 | 2.84E+03 | −3.45E+03 | 1.81E+03 | 0.00E+00 |
| S5 | −1.95E+02 | 5.52E+02 | −8.54E+02 | 5.49E+02 | 0.00E+00 |
| S6 | −4.45E+01 | 1.43E+02 | −3.05E+02 | 3.41E+02 | −1.55E+02 |
| S7 | 1.44E+01 | −2.62E+01 | 2.28E+01 | −7.81E+00 | 0.00E+00 |
| S8 | 3.11E+00 | −6.62E+00 | 5.57E+00 | −1.78E+00 | 0.00E+00 |
| S9 | 1.00E+00 | −1.05E+01 | 6.20E+00 | −1.63E+00 | 0.00E+00 |
| S10 | −5.11E+00 | 6.40E+00 | −4.02E+00 | 9.72E−01 | 0.00E+00 |
| S11 | 6.13E−01 | −3.59E−01 | 9.68E−02 | −1.01E−02 | 0.00E+00 |
| S12 | −1.36E−01 | 3.99E−02 | −6.63E−03 | 4.72E−04 | 0.00E+00 |

Figure 12:
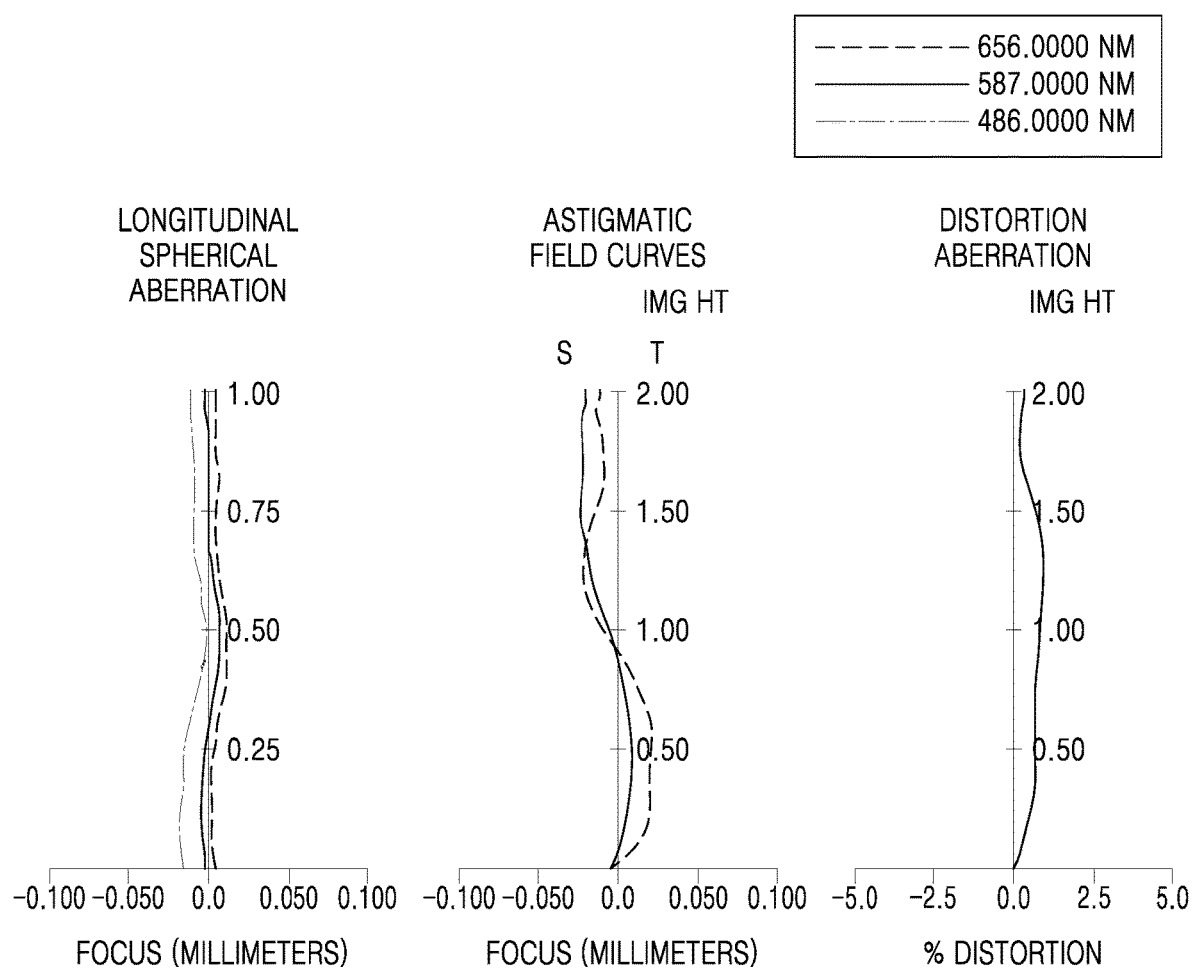
FIG. 12 shows a set of graphs depicting aberrations of the optical lens assembly of FIG. 11 according to the sixth embodiment.

FIG. 12 shows graphs of longitudinal spherical aberration, astigmatic field curves, and distortion aberration of the optical lens assembly according to the sixth embodiment.

<Seventh Embodiment>

Table 13 shows design data of the optical lens assembly according to the seventh embodiment of FIG. 13. For example.

EFL=4.19 mm
FOV=78 degree
F-number=1.8
IMH=3.500 mm
φflat-L4S1/φfull-L4=0.07
φflat-L4S2/φfull-L4=0.07 where φflat-L4S1 is a diameter of a planar central region of an object side surface of a fourth lens, φflat-L4S2 is a diameter of a planar central region of an image side surface of the fourth lens, and φfull-L4 is an effective diameter of the fourth lens.

TABLE 13

| Lens surface | | R (mm) | Dn (mm) | Nd | Vd | Effective diameter (mm) | Hole diameter (mm) |
|---|---|---|---|---|---|---|---|
| | S1* | 2.2171 | 0.3749 | 1.5448 | 56.1 | 2.40 | 0 |
| | S2* | 3.3316 | 0.2171 | | | 2.30 | 0 |
| | S3(ST)* | 2.8255 | 0.5401 | 1.5448 | 56.1 | 2.30 | 0 |
| | S4* | −7.7208 | 0.0280 | | | 2.30 | 0 |
| | S5* | 5.4001 | 0.2200 | 1.6511 | 21.5 | 2.20 | 0 |
| | S6* | 2.0284 | 0.4898 | | | 2.20 | 0 |
| S7 | S7-1 | infinity | 0.0000 | 1.6151 | 26 | 0.20 | 0 |
| | S7-2* | infinity | 0.3765 | 1.6151 | 26 | 2.40 | 0.2 |
| S8 | S8-1 | infinity | 0.0000 | | | 0.20 | 0 |
| | S8-2* | infinity | 0.3380 | | | 2.70 | 0.2 |
| | S9* | −1459.2236 | 0.4921 | 1.5448 | 56.1 | 3.20 | 0 |
| | S10* | −2.6592 | 0.5313 | | | 3.70 | 0 |
| | S11* | 3.4092 | 0.5600 | 1.5355 | 55.8 | 5.40 | 0 |
| | S12* | 1.201 | 0.2623 | | | 6.10 | 0 |
| | S13 | infinity | 0.1100 | 1.5187 | 64.2 | 6.59 | 0 |
| | S14 | infinity | 0.6339 | | | 6.65 | 0 |
| | IMG | | −0.0039 | | | 7.21 | 0 |

In the seventh embodiment, a fourth lens L4-7 may include an object side surface S7 and an image side surface S8 each including a central region S7-1 and a central region S8-1 having both sides configured as planar surfaces. The object side surface S7 may include the planar central region S7-1 with an effective diameter of 0.2 mm and a peripheral region S7-2 having a hole diameter of 0.2 mm. The image side surface S8 may include the planar central region S8-1 with an effective diameter of 0.2 mm and a peripheral region S8-2 having a hole diameter of 0.2 mm.

Table 14 shows aspherical coefficients in the seventh embodiment.

TABLE 14

| Lens surface | R | K | A | B | C | D |
|---|---|---|---|---|---|---|
| S1 | 2.22E+00 | −1.19E+00 | −2.02E−02 | 1.64E−02 | −7.88E−02 | 1.24E−01 |
| S2 | 3.33E+00 | −4.74E+01 | 9.47E−02 | −2.47E−01 | 3.17E−01 | −2.51E−01 |

TABLE 14-continued

| | | | | | | |
|---|---|---|---|---|---|---|
| S3 | 2.83E+00 | −1.34E+01 | 4.86E−02 | −9.75E−02 | 1.53E−01 | −1.83E−01 |
| S4 | −7.72E+00 | −1.01E+01 | 6.92E−02 | −2.74E−01 | 4.95E−01 | −5.88E−01 |
| S5 | 5.40E+00 | −8.31E+01 | 5.23E−02 | −2.23E−01 | 4.53E−01 | −5.87E−01 |
| S6 | 2.03E+00 | −8.90E+00 | 3.11E−02 | 3.07E−02 | −7.79E−02 | 1.13E−01 |
| S7-2 | infinity | 0.00E+00 | −9.55E−02 | −1.68E−02 | 2.02E−01 | −5.02E−01 |
| S8-2 | infinity | 0.00E+00 | −1.03E−01 | −3.83E−02 | 1.32E−01 | −2.03E−01 |
| S9 | −1.46E+03 | −9.63E+02 | −3.11E−02 | 2.49E−02 | −1.40E−01 | 2.49E−01 |
| S10 | −2.66E+00 | 6.32E−02 | −3.64E−02 | 1.21E−01 | −1.81E−01 | 1.80E−01 |
| S11 | 3.41E+00 | −3.81E+01 | −2.51E−01 | 1.58E−01 | −7.09E−02 | 2.39E−02 |
| S12 | 1.20E+00 | −5.40E+00 | −1.17E−01 | 6.94E−02 | −2.98E−02 | 8.75E−03 |

| Lens surface | E | F | G | H | J |
|---|---|---|---|---|---|
| S1 | −1.10E−01 | 5.21E−02 | −1.00E−02 | 0.00E+00 | 0.00E+00 |
| S2 | 1.18E−01 | −2.32E−02 | 0.00E+00 | 0.00E+00 | 0.00E+00 |
| S3 | 1.74E−01 | −9.32E−02 | 2.04E−02 | 0.00E+00 | 0.00E+00 |
| S4 | 4.42E−01 | −1.89E−01 | 3.55E−02 | 0.00E+00 | 0.00E+00 |
| S5 | 4.50E−01 | −1.88E−01 | 3.40E−02 | 0.00E+00 | 0.00E+00 |
| S6 | −1.10E−01 | 6.15E−02 | −1.35E−02 | 0.00E+00 | 0.00E+00 |
| S7-2 | 7.07E−01 | −5.82E−01 | 2.59E−01 | −4.84E−02 | 0.00E+00 |
| S8-2 | 1.88E−01 | −1.04E−01 | 3.15E−02 | −3.89E−03 | 0.00E+00 |
| S9 | −2.57E−01 | 1.63E−01 | −6.27E−02 | 1.34E−02 | −1.21E−03 |
| S10 | −1.16E−01 | 4.71E−02 | −1.14E−02 | 1.51E−03 | −8.34E−05 |
| S11 | −5.49E−03 | 8.12E−04 | −7.38E−05 | 3.75E−06 | −8.17E−08 |
| S12 | −1.74E−03 | 2.28E−04 | −1.87E−05 | 8.59E−07 | −1.69E−08 |

Figure 14:
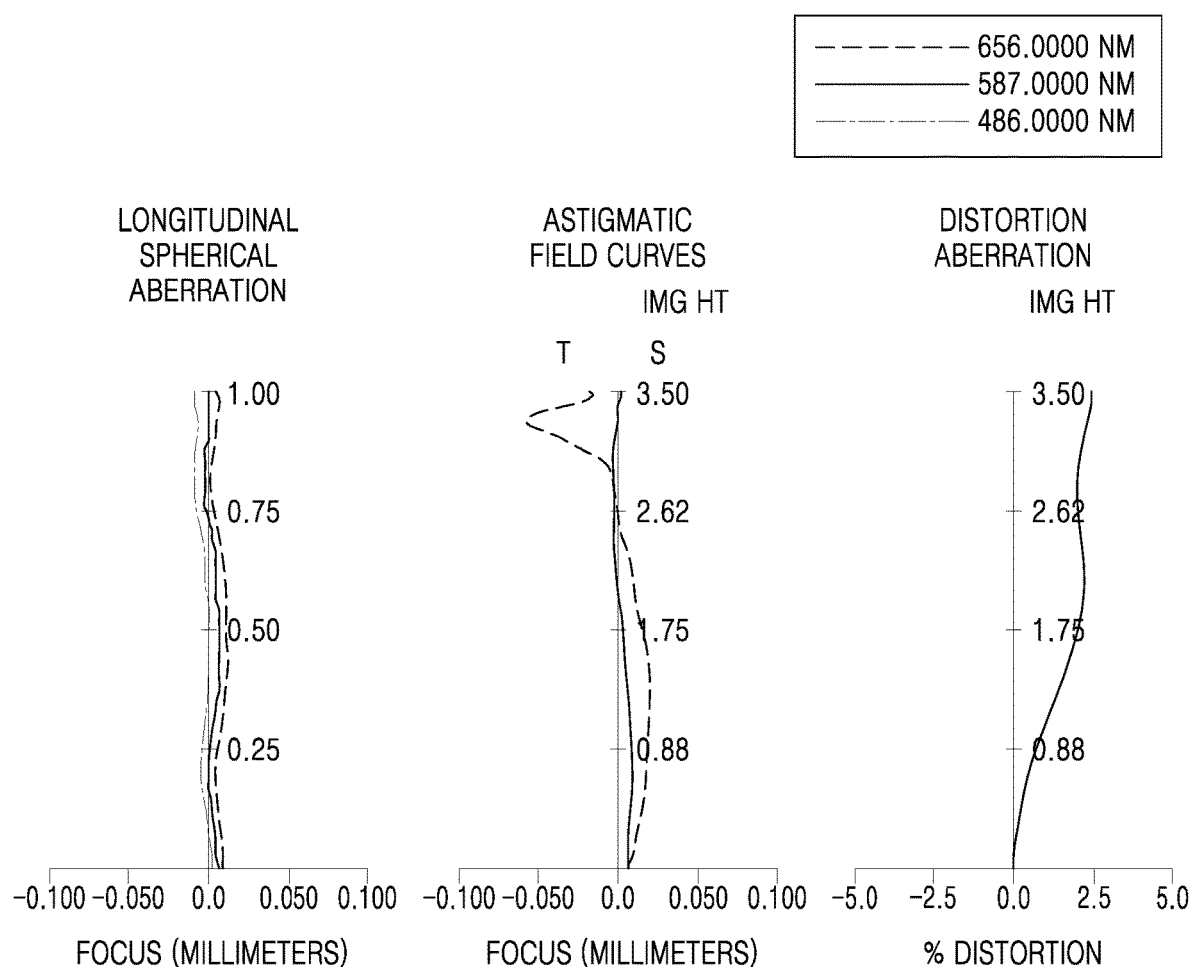
FIG. 14 shows a set of graphs depicting aberrations of the optical lens assembly of FIG. 13 according to the seventh embodiment.

FIG. 14 show graphs of longitudinal spherical aberration, astigmatic field curves, and distortion aberration of the optical lens assembly according to the seventh embodiment.

<Eighth Embodiment>

Table 15 shows design data of the optical lens assembly according to the eighth embodiment of FIG. 15. For example.

EFL=4.25 mm
FOV=77 degree
F-number=1.8
IMH=3.500 mm
φflat-L5S1/φfull-L5=0.04
φflat-L5S2/φfull-L5=0.04

φflat-L5S1 is a diameter of a planar central region of an object side surface of a fifth lens, φflat-L5S2 is a diameter of a planar central region of an image side surface of the fifth lens, and φfull-L5 is an effective diameter of the fifth lens.

In the eighth embodiment, a fifth lens L5-8 may include an object side surface S9 and an image side surface S10 each including a central region S9-1 and a central region S10-1 having both sides configured as planar surfaces. The object side surface S9 may include the planar central region S9-1 with an effective diameter of 0.2 mm and a peripheral region S9-2 having a hole diameter of 0.2 mm. The image side surface S10 may include the planar central region S10-1 with an effective diameter of 0.2 mm and a peripheral region S10-2 having a hole diameter of 0.2 mm.

Table 16 shows aspherical coefficients in the eighth embodiment.

TABLE 15

| Lens surface | | R (mm) | Dn (mm) | Nd | Vd | Effective diameter (mm) | Hole diameter (mm) |
|---|---|---|---|---|---|---|---|
| | S1* | 2.2000 | 0.4500 | 1.5465 | 56.1 | 2.40 | 0 |
| | S2* | 4.3086 | 0.2378 | | | 2.30 | 0 |
| | S3(ST) | 3.4688 | 0.5680 | 1.5465 | 56.1 | 2.30 | 0 |
| | S4* | −6.9549 | 0.0200 | | | 2.30 | 0 |
| | S5* | 8.5788 | 0.2400 | 1.6574 | 21.5 | 2.30 | 0 |
| | S6* | 2.3092 | 0.3941 | | | 2.20 | 0 |
| | S7* | 22.4150 | 0.3454 | 1.6574 | 21.5 | 2.50 | 0 |
| | S8* | −11.1119 | 0.5717 | | | 2.80 | 0 |
| S9 | S9-1 | infinity | 0.0000 | 1.5465 | 56.1 | 0.20 | 0 |
| | S9-2* | −1000.0000 | 0.7322 | 1.5465 | 56.1 | 3.40 | 0.2 |
| S10 | S10-1 | infinity | 0.0000 | | | 0.20 | 0 |
| | S10-2* | 100.0000 | 0.0939 | | | 4.70 | 0.2 |
| | S11* | 1.6088 | 0.4744 | 1.5371 | 55.7 | 5.60 | 0 |
| | S12* | 1.047 | 0.2603 | | | 6.00 | 0 |
| | S13 | infinity | 0.1100 | 1.5187 | 64.2 | 6.70 | 0 |
| | S14 | infinity | 0.6520 | | | 6.77 | 0 |
| | IMG | | 0.0200 | | | 7.41 | 0 |

TABLE 16

| Lens Surface | R | K | A | B | C | D |
|---|---|---|---|---|---|---|
| S1 | 2.20E+00 | −1.49E+00 | −1.36E−02 | 3.28E−02 | −1.30E−01 | 2.26E−01 |
| S2 | 4.31E+00 | −2.38E+00 | −3.36E−02 | −4.58E−02 | 1.54E−01 | −3.35E−01 |
| S3 | 3.47E+00 | −1.85E+00 | −2.10E−02 | 5.94E−03 | −5.49E−02 | 1.08E−01 |
| S4 | −6.95E+00 | −6.09E+00 | −2.22E−02 | −9.90E−02 | 2.02E−01 | −1.93E−01 |
| S5 | 8.58E+00 | 4.80E+01 | −1.18E−01 | 6.54E−02 | −9.65E−02 | 3.39E−01 |
| S6 | 2.31E+00 | −9.20E+00 | −7.57E−03 | 1.95E−02 | 3.91E−02 | −6.57E−02 |
| S7 | 2.24E+01 | −1.42E+02 | −9.95E−03 | −5.43E−02 | 1.28E−01 | −1.93E−01 |
| S8 | −1.11E+01 | 5.59E+01 | 4.03E−03 | −7.80E−02 | 1.17E−01 | −9.54E−02 |
| S9-2 | −1.00E+03 | 0.00E+00 | 1.17E−01 | −2.99E−01 | 4.58E−01 | −5.61E−01 |
| S10-2 | 1.00E+02 | −3.61E+01 | −9.17E−01 | 1.21E−01 | −1.55E−01 | 9.06E−02 |
| S11 | 1.61E+00 | −7.00E+00 | −2.95E−01 | 2.66E−01 | −1.53E−01 | 5.18E−02 |
| S12 | 1.05E+00 | −4.70E+00 | −1.43E−01 | 8.53E−02 | −3.58E−02 | 8.76E−03 |

| Lens Surface | E | F | G | H | J |
|---|---|---|---|---|---|
| S1 | −2.31E−01 | 1.39E−01 | −4.40E−02 | 5.55E−03 | 0.00E+00 |
| S2 | 4.86E−01 | −4.02E−01 | 1.77E−01 | −3.22E−02 | 0.00E+00 |
| S3 | −7.19E−02 | 1.72E−02 | −1.04E−03 | 0.00E+00 | 0.00E+00 |
| S4 | 8.79E−02 | −1.53E−02 | −4.09E−04 | 0.00E+00 | 0.00E+00 |
| S5 | −5.72E−01 | 4.66E−01 | −1.81E−01 | 2.67E−02 | 0.00E+00 |
| S6 | 2.52E−02 | 2.40E−02 | −2.67E−02 | 8.66E−03 | 0.00E+00 |
| S7 | 2.23E−01 | −1.68E−01 | 7.11E−02 | −1.33E−02 | 0.00E+00 |
| S8 | 5.26E−02 | −1.14E−02 | −2.27E−03 | 9.61E−04 | 0.00E+00 |
| S9-2 | 4.50E−01 | −2.25E−01 | 6.69E−02 | −1.06E−02 | 6.86E−04 |
| S10-2 | −3.10E−02 | 6.33E−03 | −7.34E−04 | 4.23E−05 | −8.24E−07 |
| S11 | −1.05E−02 | 1.30E−03 | −9.61E−05 | 3.87E−06 | −6.46E−08 |
| S12 | −1.11E−03 | 4.35E−05 | 5.03E−06 | −6.03E−07 | 1.83E−08 |

Figure 16:
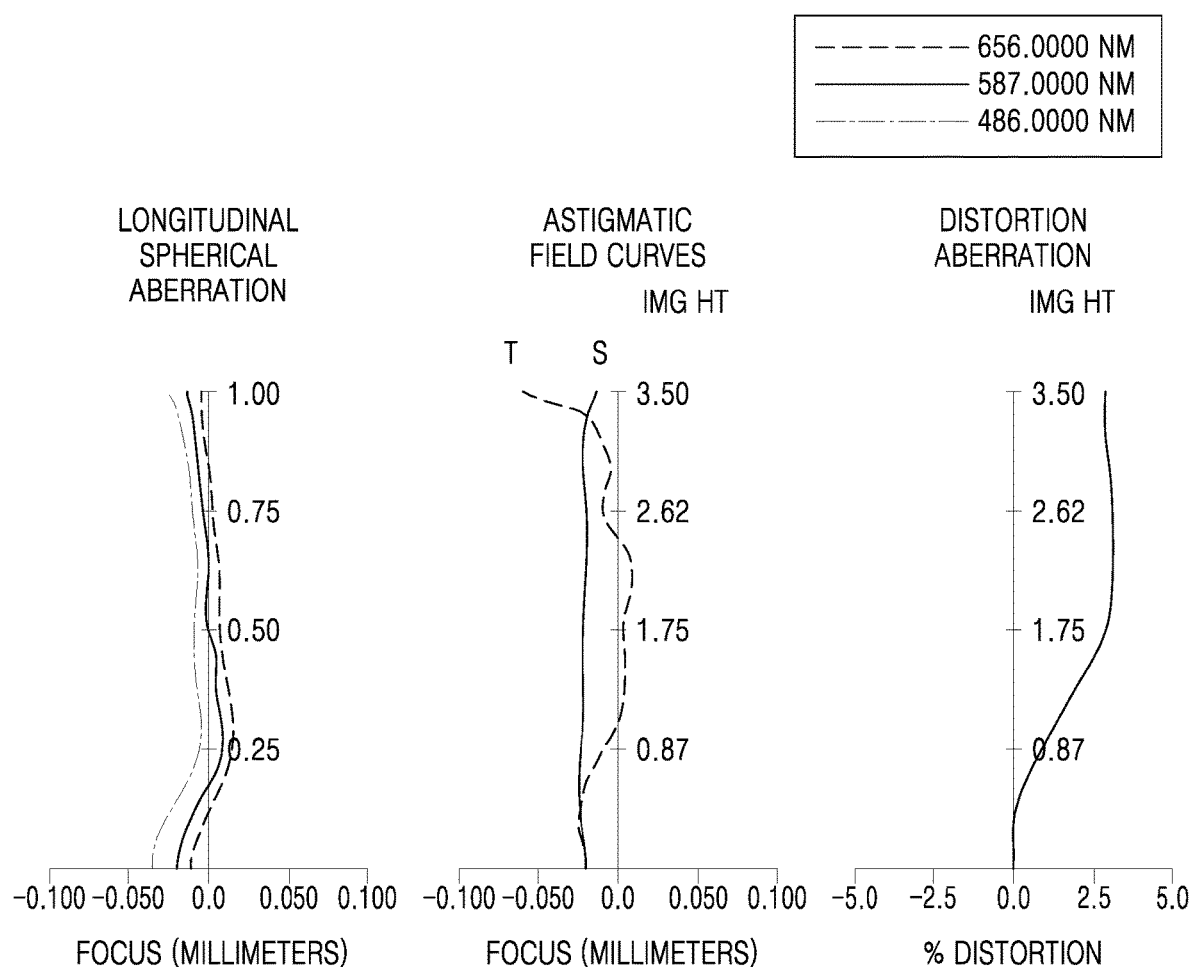
FIG. 16 shows a set of graphs depicting aberrations of the optical lens assembly of FIG. 15 according to the eight embodiment.

FIG. 16 are example graphs of longitudinal spherical aberration, astigmatic field curves, and distortion aberration of the optical lens assembly according to the eighth embodiment.

<Ninth Embodiment>

Table 17 shows design data of the optical lens assembly according to the ninth embodiment of FIG. 17. For example.
EFL=4.05 mm
FOV=71 degree
F-number=1.7
IMH=2.934 mm
φflat-L3S1/φfull-L3=0.09
φflat-L3S2/φfull-L3=0.09
where φflat-L3S1 is a diameter of a planar central region of an object side surface of a third lens, φflat-L3S2 is a diameter of a planar central region of an image side surface of the third lens, and φfull-L3 is an effective diameter of the third lens.

TABLE 17

| Lens surface | | R (mm) | Dn (mm) | Nd | Vd | Effective diameter (mm) | Hole diameter (mm) |
|---|---|---|---|---|---|---|---|
| | S1(ST) | Infinity | −0.2800 | | | 2.40 | 0 |
| | S2* | 2.1990 | 0.6730 | 1.5375 | 56.2 | 2.40 | 0 |
| | S3* | −7.2010 | 0.0250 | | | 2.30 | 0 |
| | S4* | 2.9520 | 0.2800 | 1.642 | 23.9 | 2.20 | 0 |
| | S5* | 1.5680 | 0.2700 | | | 2.00 | 0 |
| S6 | S6-1 | Infinity | 0.0000 | 1.5375 | 56.2 | 0.20 | 0 |
| | S6-2* | −184.3160 | 0.4310 | 1.5375 | 56.2 | 2.10 | 0.2 |
| S7 | S7-1 | Infinity | 0.0000 | | | 0.20 | 0 |
| | S7-2* | −300.0000 | 0.0910 | | | 2.20 | 0.2 |
| | S8* | 3.4440 | 0.3210 | 1.5375 | 56.2 | 2.20 | 0 |
| | S9* | 45.3450 | 0.4700 | | | 2.30 | 0 |
| | S10* | −1.6270 | 0.3300 | 1.642 | 23.9 | 2.40 | 0 |
| | S11* | −2.488 | 0.0250 | | | 2.80 | 0 |
| | S12* | 3.497 | 0.5870 | 1.5375 | 56.2 | 3.10 | 0 |
| | S13* | −2.485 | 0.1580 | | | 3.80 | 0 |
| | S14* | −3.67 | 0.5000 | 1.5375 | 56.2 | 4.00 | 0 |
| | S15* | 1.802 | 0.2000 | | | 4.80 | 0 |
| | S16 | Infinity | 0.3000 | 1.5187 | 64.2 | 5.21 | 0 |
| | S17 | Infinity | 0.4733 | | | 5.39 | 0 |
| | IMG | | 0.0065 | | | 5.88 | 0 |

In the ninth embodiment, a third lens L3-9 may include an object side surface S6 and an image side surface S7 each including a central region S6-1 and a central region S7-1 having both sides configured as planar surfaces. The object side surface S6 may include the planar central region S6-1 with an effective diameter of 0.2 mm and a peripheral region S6-2 having a hole diameter of 0.2 mm. The image side surface S7 may include the planar central region S7-1 with an effective diameter of 0.2 mm and a peripheral region S7-2 having a hole diameter of 0.2 mm.

Table 18 shows aspherical coefficients in the ninth embodiment.

TABLE 18

| Lens Surface | R | K | A | B | C | D | E | F | G |
|---|---|---|---|---|---|---|---|---|---|
| S2 | 2.20E+00 | −4.64E−01 | 1.36E−03 | −8.86E−03 | 2.26E−03 | −4.70E−03 | 2.72E−03 | −1.34E−03 | 0.00E+00 |
| S3 | −7.20E+00 | 0.00E+00 | 2.31E−02 | −7.27E−03 | −8.46E−03 | 2.59E−03 | 1.83E−03 | −1.64E−03 | 0.00E+00 |
| S4 | 2.95E+00 | −2.02E+01 | −1.90E−02 | −1.49E−02 | 1.87E−02 | −1.08E−03 | −3.97E−03 | 4.17E−04 | 5.04E−07 |
| S5 | 1.57E+00 | −4.27E+00 | −1.42E−02 | −1.93E−02 | 3.71E−02 | −2.42E−02 | 8.75E−03 | 3.16E−04 | −5.85E−08 |
| S6-2 | −1.84E+02 | 0.00E+00 | 8.39E−02 | −5.13E−02 | 3.66E−02 | −2.65E−02 | 2.80E−02 | −1.07E−02 | −8.10E−06 |
| S7-2 | −3.00E+02 | 0.00E+00 | −4.46E−02 | −1.26E−02 | 2.67E−02 | −1.06E−02 | −7.50E−03 | −9.94E−12 | −6.66E−13 |
| S8 | 3.44E+00 | 0.00E+00 | −1.37E−01 | −4.33E−02 | −3.94E−02 | 5.92E−02 | −1.49E−02 | 1.74E−11 | 1.07E−12 |
| S9 | 4.53E+01 | 0.00E+00 | −2.06E−02 | −9.79E−02 | −1.09E−02 | 5.62E−02 | −1.93E−02 | 5.57E−03 | 2.18E−06 |
| S10 | −1.63E+00 | 5.48E+00 | 2.40E−01 | −1.63E−01 | 6.03E−02 | −1.14E−02 | −3.12E−03 | 2.39E−03 | 0.00E+00 |
| S11 | −2.49E+00 | −1.58E+00 | −4.20E−03 | 1.88E−02 | −7.28E−03 | −2.52E−04 | 3.66E−04 | 0.00E+00 | 0.00E+00 |
| S12 | 3.50E+00 | −1.26E+01 | −8.96E−02 | 3.52E−02 | −1.79E−02 | 4.60E−04 | 7.65E−04 | 0.00E+00 | 0.00E+00 |
| S13 | −2.49E+00 | −2.98E+01 | 6.37E−02 | −3.55E−02 | 2.46E−03 | 1.07E−03 | −1.95E−04 | 0.00E+00 | 0.00E+00 |
| S14 | −3.67E+00 | −7.98E−01 | −6.52E−03 | 1.34E−03 | 2.10E−04 | 5.75E−05 | 8.44E−07 | −1.79E−06 | 4.72E−08 |
| S15 | 1.80E+00 | −1.43E+01 | −3.37E−02 | 5.07E−03 | −8.00E−04 | −2.42E−06 | 5.48E−06 | 6.49E−07 | −2.81E−08 |

Figure 18:
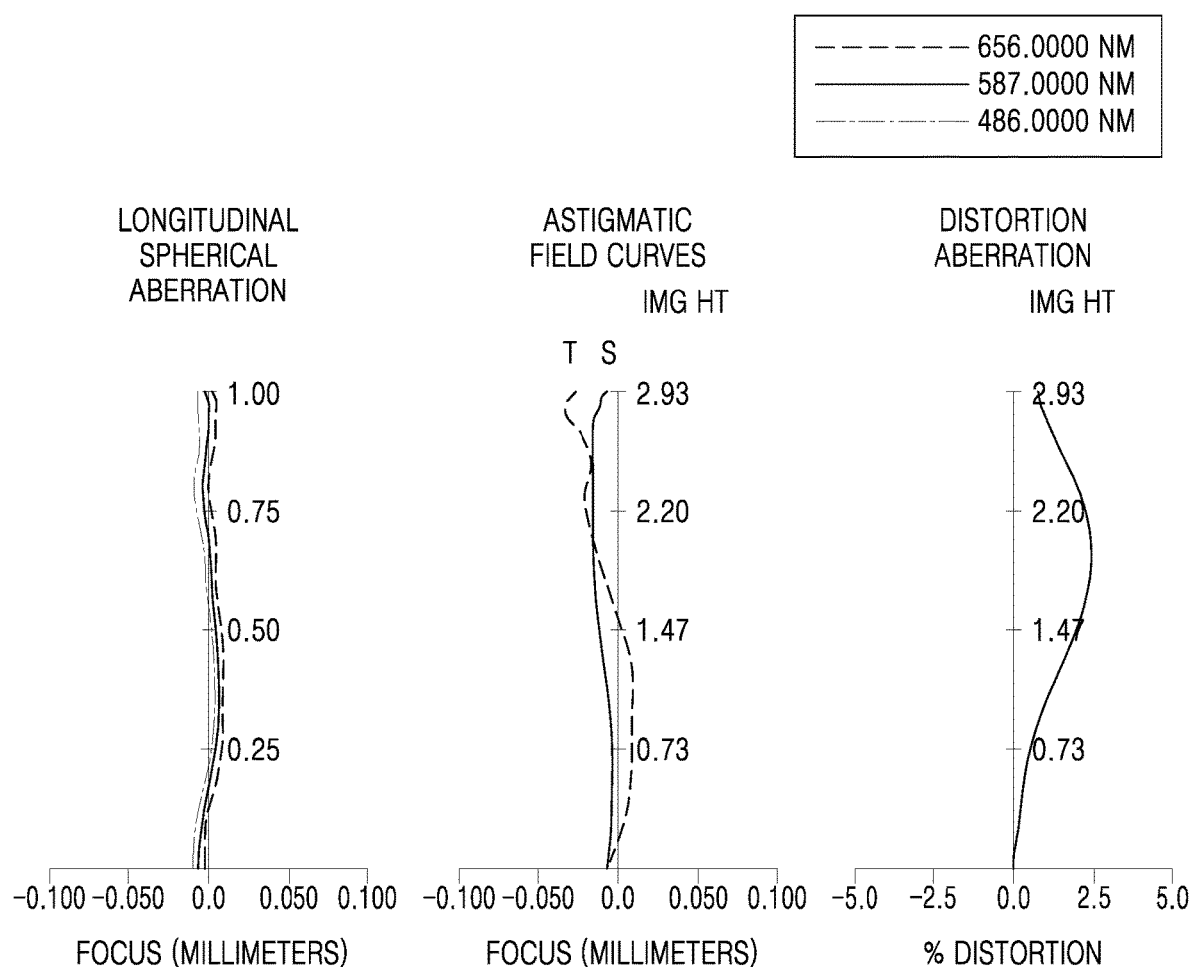
FIG. 18 shows a set of graphs depicting aberrations of the optical lens assembly of FIG. 17 according to the ninth embodiment.

FIG. 18 shows graphs of longitudinal spherical aberration, astigmatic field curves, and distortion aberration of the optical lens assembly according to the ninth embodiment.

An optical lens assembly according to various embodiments may be applied to a photographing apparatus having an image sensor. An optical lens assembly according to exemplary embodiments may be applied to various photographing apparatuses, such as a digital camera, an exchange lens camera, a video camera, a mobile phone camera, and a camera for a small-sized mobile device.

The following Table shows a refractive power of an optical lens assembly according to various embodiments.

TABLE 19

| | First lens | Second lens | Third lens | Fourth lens | Fifth lens | Sixth lens | Seventh lens |
|---|---|---|---|---|---|---|---|
| First embodiment | 3.70 | infinity | 4.17 | −4.27 | — | — | — |
| Second embodiment | 2.18 | −3.87 | Infinity | −19.20 | — | — | — |
| Third embodiment | 2.16 | −3.34 | Infinity | 36.22 | 1411.02 | — | — |
| Fourth embodiment | 2.13 | −3.24 | 370.75 | infinity | 33.33 | — | — |
| Fifth embodiment | 2.20 | −3.35 | infinity | infinity | 21.85 | — | — |
| Sixth embodiment | infinity | −109.09 | 2.04 | −5.07 | 1.66 | −1.60 | — |
| Seventh embodiment | 10.87 | 3.87 | −5.12 | infinity | 4.89 | −3.80 | — |
| Eighth embodiment | 7.65 | 4.37 | −4.88 | 11.35 | infinity | −7.97 | — |
| Ninth embodiment | 3.21 | −5.66 | infinity | 6.92 | −8.61 | 2.80 | −2.18 |

For example, an optical lens assembly 100-1 (FIG. 1) according to the first embodiment may include a first lens L1-1 having a positive refractive power, a second lens L2-1 having zero refractive power in a central region thereof, a third lens L3-1 having a positive refractive power, and a fourth lens L4-1 having a negative refractive power.

For example, an optical lens assembly 100-2 (FIG. 3) according to the second embodiment may include a first lens L1-2 having a positive refractive power, a second lens L2-2 having a negative refractive power, a third lens L3-2 having zero refractive power, and a fourth lens L4-2 having a negative refractive power.

For example, an optical lens assembly 100-3 (FIG. 5) according to the third embodiment may include a first lens L1-3 having a positive refractive power, a third lens L2-3 having a negative refractive power, a third lens L3-3 having zero refractive power, a fourth lens L4-3 having a positive refractive power, and a fifth lens L5-3 having a positive refractive power.

For example, an optical lens assembly 100-4 (FIG. 7) according to the fourth embodiment may include a first lens L1-4 having a positive refractive power, a second lens L2-4 having a negative refractive power, a third lens L3-4 having a positive refractive power, a fourth lens L4-4 having zero refractive power, and a fifth lens L5-4 having a positive refractive power.

For example, an optical lens assembly 100-5 according to the fifth embodiment (FIG. 9) may include a first lens L1-5 having a positive refractive power, a second lens L2-5 having a negative refractive power, a third lens L3-5 having zero refractive power in a central region thereof, a fourth lens L4-5 having zero refractive power in a central region thereof, and a fifth lens L5-5 having a positive refractive power.

For example, an optical lens assembly 100-6 according to the sixth embodiment (FIG. 11) may include a first lens L1-6 having zero refractive power in a central region thereof, a second lens L2-6 having a negative refractive power, a third lens L3-6 having a positive refractive power, a fourth lens L4-6 having a negative refractive power, a fifth lens L5-6 having a positive refractive power, a sixth lens L6-6 having a negative refractive power.

For example, an optical lens assembly 100-7 according to the seventh embodiment (FIG. 13) may include a first lens L1-7 having a positive refractive power, a second lens L2-7 having a positive refractive power, a third lens L3-7 having a negative refractive power, a fourth lens L4-7 having zero refractive power in a central region thereof, a fifth lens L5-7 having a positive refractive power, and a sixth lens L6-7 having a negative refractive power.

For example, an optical lens assembly 100-8 according to the eighth embodiment (FIG. 15) may include a first lens L1-8 having a positive refractive power, a second lens L2-8 having a positive refractive power, a third lens L3-8 having a negative refractive power, a fourth lens L4-8 having a positive refractive power, a fifth lens L5-8 having zero refractive power in a central region thereof, and a sixth lens L6-8 having a negative refractive power.

For example, an optical lens assembly 100-9 according to a ninth embodiment (FIG. 17) may include a first lens L1-9 having a positive refractive power, a second lens L2-9 having a negative refractive power, a third lens L3-9 having zero refractive power in a central region thereof, a fourth lens L4-9 having a positive refractive power, a fifth lens L5-9 having a negative refractive power, a sixth lens L6-9 having a positive refractive power, and a seventh lens L7-9 having a negative refractive power.

Figure 19:
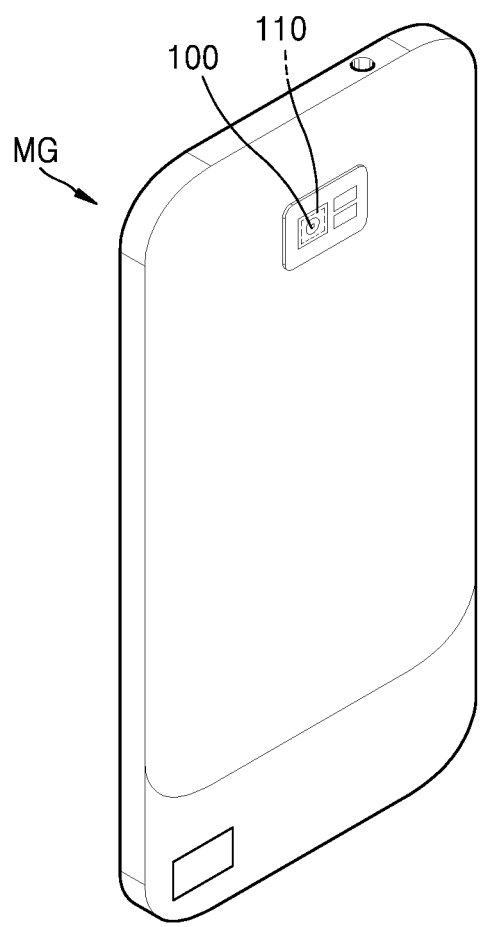
FIG. 19 is a rear view of an electronic apparatus having an optical lens assembly according to various embodiments.

FIG. 19 illustrates an example of an electronic apparatus MG having an optical lens assembly according to an exemplary embodiment. In FIG. 19, the electronic apparatus MG is applied to a mobile phone. However, as discussed earlier, applications to other types of electronic apparatuses are contemplated. The electronic apparatus MG may include an optical lens assembly 100 and an image sensor 110 that receives an image formed by the optical lens assembly 100 and converts the image into an electrical image signal. One of the optical lens assemblies described with reference to FIGS. 1 through 18 may be used as the optical lens assembly 100. The optical lens assembly according to various embodiments may be applied to a photographing apparatus, such as a small-sized digital camera, a mobile phone, etc. so that the photographing apparatus capable of performing photographing with high performance may be implemented.

Figure 20:
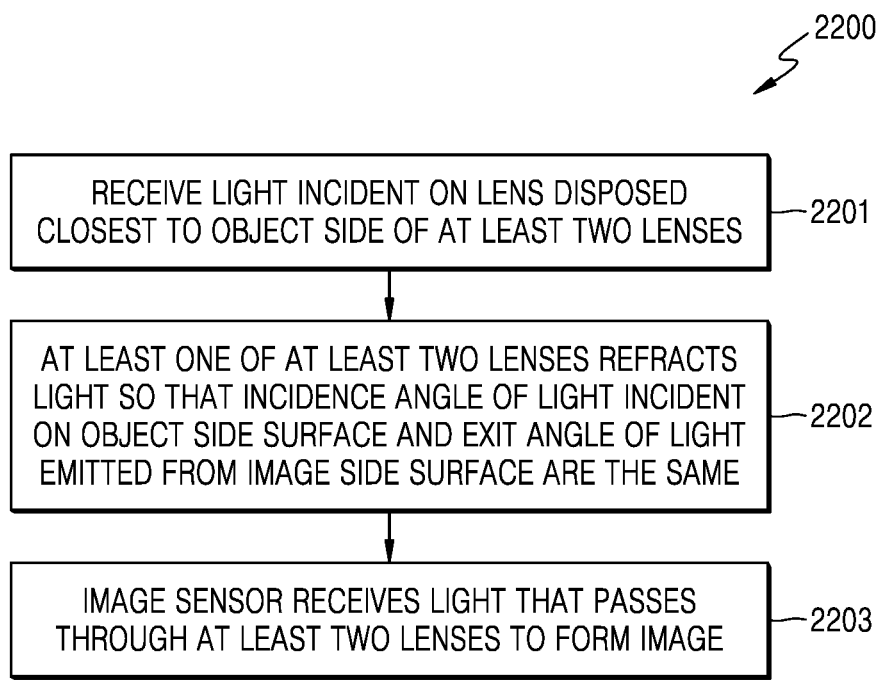
FIG. 20, FIG. 21 and FIG. 22 are flowcharts illustrating an upper level of a method of performing image capturing using an optical lens assembly in an electronic apparatus according to various embodiments.
Figure 21:
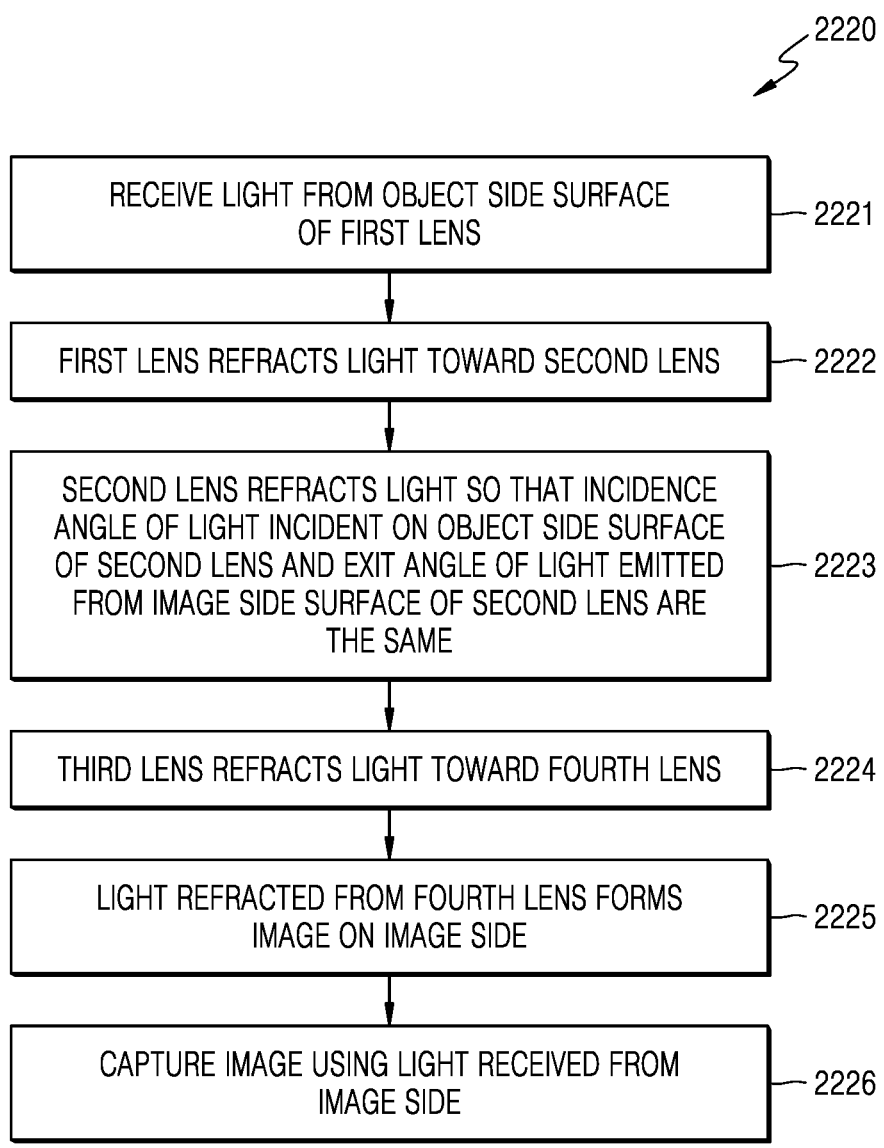
Figure 22:
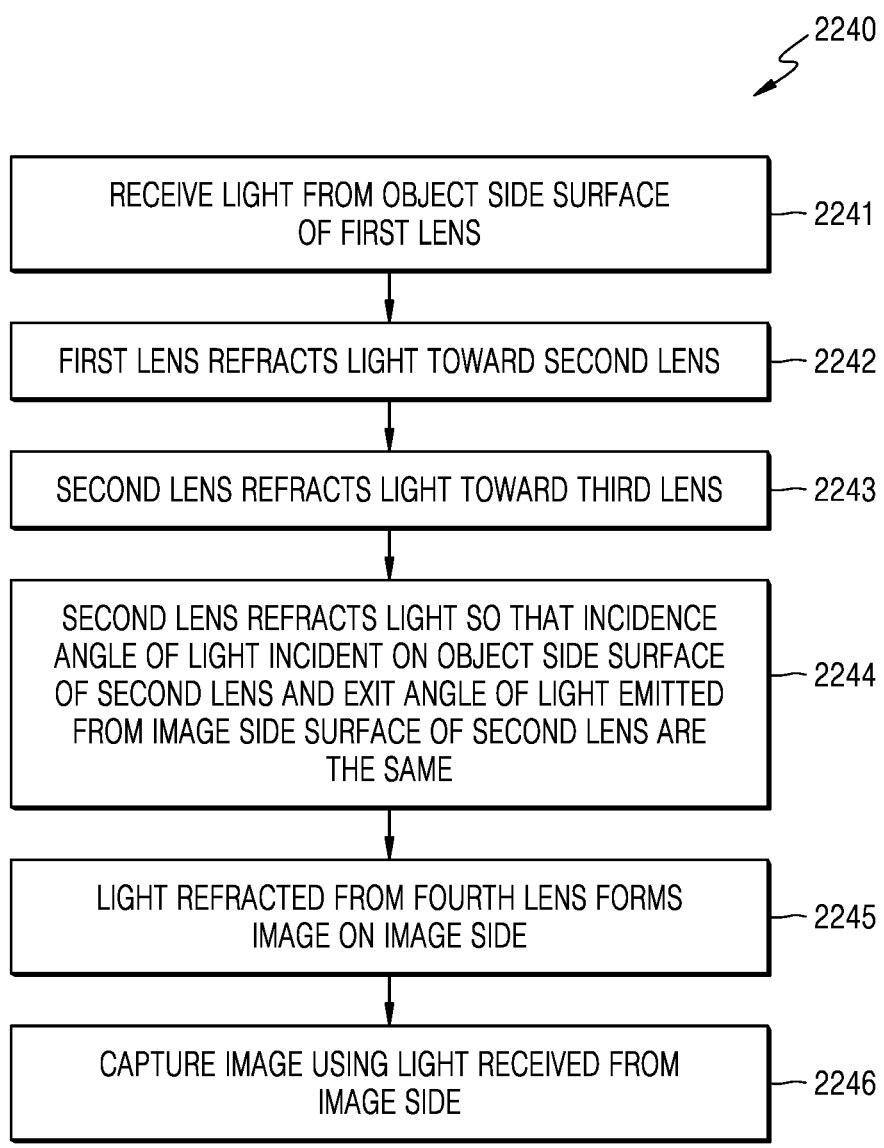

FIGS. 20 through 22 are high-level flowcharts 2200, 2220, and 2240 illustrating a method of performing image capturing using the optical lens assembly 100 illustrated in FIGS. 1 through 18, in an electronic apparatus according to various embodiments.

FIG. 20 is the high-level flowchart 2200 illustrating the method of performing image capturing in an electronic apparatus according to various embodiments. In a method of forming an image according to various embodiments, light may be incident onto a lens disposed closest to an object side of at least two lenses in operation 2201. In operation 2202, at least one of the at least one lenses may refract light so that an incidence angle of light incident onto an object side surface and an exit angle of light emitted from an image side surface may be the same. In operation 2203, an image sensor may receive light that passes through the at least two lenses to form an image.

FIG. 21 is a high-level flowchart 2220 illustrating a method of performing image capturing using the optical lens assembly 100-1 illustrated in FIG. 1, in an electronic apparatus according to various embodiments. In one embodiment, in operation 2221, for example, the optical lens assembly 100-1 may receive light from an object side surface of a first lens L1-1 included in the optical lens assembly 100-1.

In operation 2222, for example, the first lens L1-1 included in the optical lens assembly may refract the light toward a second lens L2-1.

In operation 2223, for example, the second lens L2-1 included in the optical lens assembly may refract light so that an incidence angle of light incident onto an object side surface of the second lens L2-1 and an exit angle of light emitted from an image side surface of the second lens L2-1 may be the same, and may cause the light to be incident onto a third lens L3-1.

In operation 2224, for example, the third lens L3-1 included in the optical lens assembly may refract the light toward a fourth lens L4-1.

In operation 2225, for example, the light refracted from the fourth lens L41 may form an image on an image side IMG. According to various embodiments, the light may form an image on the image side IMG using an optical device OD. The optical device OD may include at least one of a low pass filter, an infrared (IR)-cut filter, or a cover glass, for example.

In operation 2226, for example, the electronic apparatus including the optical lens assembly may capture the image using the light received from the image side IMG. For example, the electronic apparatus including the optical lens assembly may capture the image using an image sensor (not shown) that constitutes at least a part of a camera module (example: the camera module 225 of FIG. 23, the camera module 391 of FIG. 24) included in the electronic apparatus.

FIG. 22 is a high-level flowchart 2240 illustrating a method of performing image capturing using the optical lens assembly 100-2 illustrated in FIG. 3, in an electronic apparatus according to various embodiments.

According to one embodiment, in operation 2241, for example, the optical lens assembly 100-2 may receive light from the object side surface of the first lens L1-2 included in the optical lens assembly 100-2.

In operation 2242, for example, the first lens L1-2 included in the optical lens assembly may refract the light toward the second lens L2-2.

In operation 2243, for example, the second lens L2-2 included in the optical lens assembly may refract the light toward a third lens L3-2.

In operation 2244, for example, the third lens L3-2 included in the optical lens assembly may refract the light so that an incidence angle of light incident onto the object side surface of the third lens L3-2 and an exit angle of light emitted from the image side surface of the third lens L3-2, and may cause the light to be incident onto a fourth lens L4-2.

In operation 2245, for example, the light refracted from the fourth lens L4-2 may form an image on the image side IMG. According to various embodiments, the light may form an image on the image side IMG using an optical device OD. The optical device OD may include at least one of a low pass filter, an IR-cut filter, and a cover glass, for example.

In operation 2246, for example, the electronic apparatus including the optical lens assembly may capture the image using the light received from the image side IMG. For example, the electronic apparatus may capture the image using an image sensor (not shown) that constitutes at least a part of a camera module (example: a camera module 225 of FIG. 23, a camera module 391 of FIG. 24) included in the electronic apparatus.

In FIGS. 21 and 22, the method of forming an image using the optical lens assembly including four lenses has been described. However, an image may be captured in a similar way to a way described with reference to FIGS. 21 and 22 using the optical lens assembly having five lenses illustrated in FIGS. 5, 7, and 9, the optical lens assembly having six lenses illustrated in FIGS. 11, 13, and 15, and the optical lens assembly having seven lenses illustrated in FIG. 17.

An optical lens assembly according to various embodiments includes at least two lenses arranged from an object side to an image side, and at least one of the at least two lenses incudes a central region having planar surfaces on each of an object side surface and an image side surface of the at least one lens, and a peripheral region having an aspherical surface, and the at least one lens may satisfy the following Equation.

$$0.01 < \varphi\text{flat-object}/\varphi\text{full} < 0.5 \quad \text{(Equation)}$$

where, φflat-object is a diameter of a central region of the object side surface of the at least one lens, and φfull is an effective diameter of the at least one lens.

The optical lens assembly according to various embodiments may satisfy the following Equation.

$$0.01 < \varphi\text{flat-image}/\varphi\text{full} < 0.5 \quad \text{(Equation)}$$

, where φflat-image is a diameter of the central region of the image side surface of the at least one lens, and φfull is an effective diameter of the at least one lens.

For example, the plurality of lenses include a first lens, a second lens, a third lens, and a fourth lens, which are arranged from an object side to an image side, and the second lens or the third lens may include a central region having planar surfaces on an object side surface and an image side surface, respectively, and a peripheral region having an aspherical surface.

For example, the plurality of lenses include a first lens, a second lens, a third lens, a fourth lens, and a fifth lens, which are sequentially arranged from an object side to an image side, and at least one of the third lens and the fourth lens may include a central region having planar surfaces on an object side surface and an image side surface, respectively, and a peripheral region having an aspherical surface.

For example, the plurality of lenses include a first lens, a second lens, a third lens, a fourth lens, a fifth lens, and a sixth lens, which are sequentially arranged from an object side to an image side, and at least one of the first lens, the fourth lens, and the fifth lens may include a central region having planar surfaces on an object side surface and an image side surface, respectively, and a peripheral region having an aspherical surface.

For example, the plurality of lenses may include a first lens, a second lens, a third lens, a fourth lens, a fifth lens, a sixth lens, and a seventh lens, which are sequentially arranged from an object side to an image side, and the third lens may include a central region having planar surfaces on an object side surface and an image side surface, respectively, and a peripheral region having an aspherical surface.

For example, the plurality of lenses may include at least one aspherical lens.

For example, the plurality of lenses may include at least one plastic lens.

The optical lens assembly according to various embodiments may include at least two lenses arranged from an object side to an image side, and at least one of the at least two lenses may include a partial lens region having no refractive power, and the at least one lens may satisfy the following equation.

$$0.01 < \varphi\text{flat-object}/\varphi\text{full} < 0.5$$

where φflat-object is a diameter of a partial lens region of the object side surface of the at least one lens, and φfull is an effective diameter of the at least one lens.

For example, the at least one lens may satisfy the following equation.

$$0.01 < \varphi\text{flat-image}/\varphi\text{full} < 0.5$$

where φflat-image is a diameter of a partial lens region of the image side surface of the at least one lens, and φfull is an effective diameter of the at least one lens.

For example, the plurality of lenses may include a first lens, a second lens, a third lens, and a fourth lens, which are arranged from the object side to the image side, and the second lens or third lens may include a partial lens region having no refractive power.

For example, the plurality of lenses may include a first lens, a second lens, a third lens, a fourth lens, and a fifth lens, which are sequentially arranged from the object side to the image side, and at least one of the third lens and the fourth lens may include a partial lens region having no refractive power.

For example, the plurality of lenses may include a first lens, a second lens, a third lens, a fourth lens, a fifth lens, and a sixth lens, which are sequentially arranged from the object side to the image side, and at least one of the first lens, the fourth lens, and the fifth lens may include a peripheral region having a partial lens region having no refractive power.

For example, the plurality of lenses may include a first lens, a second lens, a third lens, a fourth lens, a fifth lens, a sixth lens, and a seventh lens, which are sequentially arranged from the object side to the image side, and the third lens may include a peripheral region having a partial lens region having no refractive power.

For example, the partial region of the partial lens region may have positive or negative refractive power.

For example, the plurality of lenses may include at least one aspherical lens.

For example, the plurality of lenses may include at least one plastic lens.

The optical lens assembly according to various embodiments may include a first lens having a positive refractive power; a second lens having a positive refractive power; a third lens having a negative refractive power; a fourth lens; a fifth lens; and a sixth lens having a negative refractive power, which are sequentially arranged from an object side to an image side, and there is no refractive power in a central region of at least one of the fourth lens and the fifth lens, and the at least one of the fourth lens and the fifth lens may satisfy the following equation.

$$0.01 < \varphi\text{flat-object}/\varphi\text{full} < 0.5$$

where φflat-object is a diameter of a central region of an object side surface of at least one of the fourth lens and the fifth lens, and φfull is an effective diameter of the fifth lens.

The optical lens assembly according to various embodiments may satisfy the following equation.

$$0.01 < \varphi\text{flat-image}/\varphi\text{full} < 0.5$$

where φflat-image is a diameter of a central region of an image side surface of at least one of the fourth lens and the fifth lens, and φfull is an effective diameter of the fifth lens.

For example, an aperture may be provided between the first lens and the second lens or between the second lens and the third lens.

For example, at least one of the first through sixth lenses may include an aspherical lens.

For example, at least one of the first through sixth lenses may include a plastic lens.

An electronic apparatus according to various embodiments may include an optical lens assembly; and an image sensor that receives light formed by the optical lens assembly, and the optical lens assembly may include at least two lenses arranged from an object side to an image side, and at least one of the at least two lenses may include a central region having planes on an object side surface and an image side surface, respectively, of the at least one lens, and a peripheral region having an aspherical surface, and the at least one lens may satisfy the following equation.

$$0.01 < \varphi\text{flat-object}/\varphi\text{full} < 0.5$$

where φflat-object is a diameter of a central region of an object side surface of the at least one lens, and φfull is an effective diameter of the at least one lens.

For example, the at least one lens may satisfy the following equation.

$$0.01 < \varphi\text{flat-image}/\varphi\text{full} < 0.5$$

where φflat-image is a diameter of a central region of an image side surface of the at least one lens, and φfull is an effective diameter of the at least one lens.

A method of forming an image according to various embodiments may include: receiving light incident onto a lens arranged closest to an object side of at least two or more lenses; refracting the light so that an incidence angle of light incident onto an object side surface of at least one of the at least two or more lenses and an exit angle of light emitted from an image side surface are the same; and receiving the light that passes through the at least two or more lenses to form an image using an image sensor.

For example, the at least two lenses may include a first lens, a second lens, a third lens, and a fourth lens, which are sequentially arranged from an object side to an image side, and the second lens or the third lens may include a central region having planar surfaces on an object side surface and an image side surface, respectively, and a peripheral region having an aspherical surface and may refract light so that an incidence angle of light incident onto the central region of the object side surface and an exit angle of light emitted from the central region of the image side surface are the same.

For example, the plurality of lenses may include a first lens, a second lens, a third lens, a fourth lens, and a sixth lens, which are sequentially arranged from an object side to an image side, and at least one of the third lens and the fourth lens may include a central region having planar surfaces on an object side surface and an image side surface, respectively, and a peripheral region having an aspherical surface and may refract the light so that an incidence angle of light incident onto the central region of the object side surface and an exit angle of light emitted from the central region of the image side surface are the same.

For example, the plurality of lenses may include a first lens, a second lens, a third lens, a fourth lens, a fifth lens, and a sixth lens, which are sequentially arranged from an object side to an image side, and at least one of the first lens, the fourth lens, and the fifth lens may include planar surfaces on an object side surface and an image side surface, respectively, and may refract light so that an incidence angle of light incident onto a central region of the object side surface and an exit angle of light emitted from the central region of the image side surface are the same.

For example, the plurality of lenses may include a first lens, a second lens, a third lens, a fourth lens, a fifth lens, a sixth lens, and a seventh lens, which are sequentially arranged from an object side to an image side, and the third lens may include a central region having planar surfaces on an object side surface and an image side surface, respectively, and a peripheral region having an aspherical surface and may refract light so that an incidence angle of light incident onto a central region of the object side surface and an exit angle of light emitted from the central region of the image side surface are the same.

Figure 23:
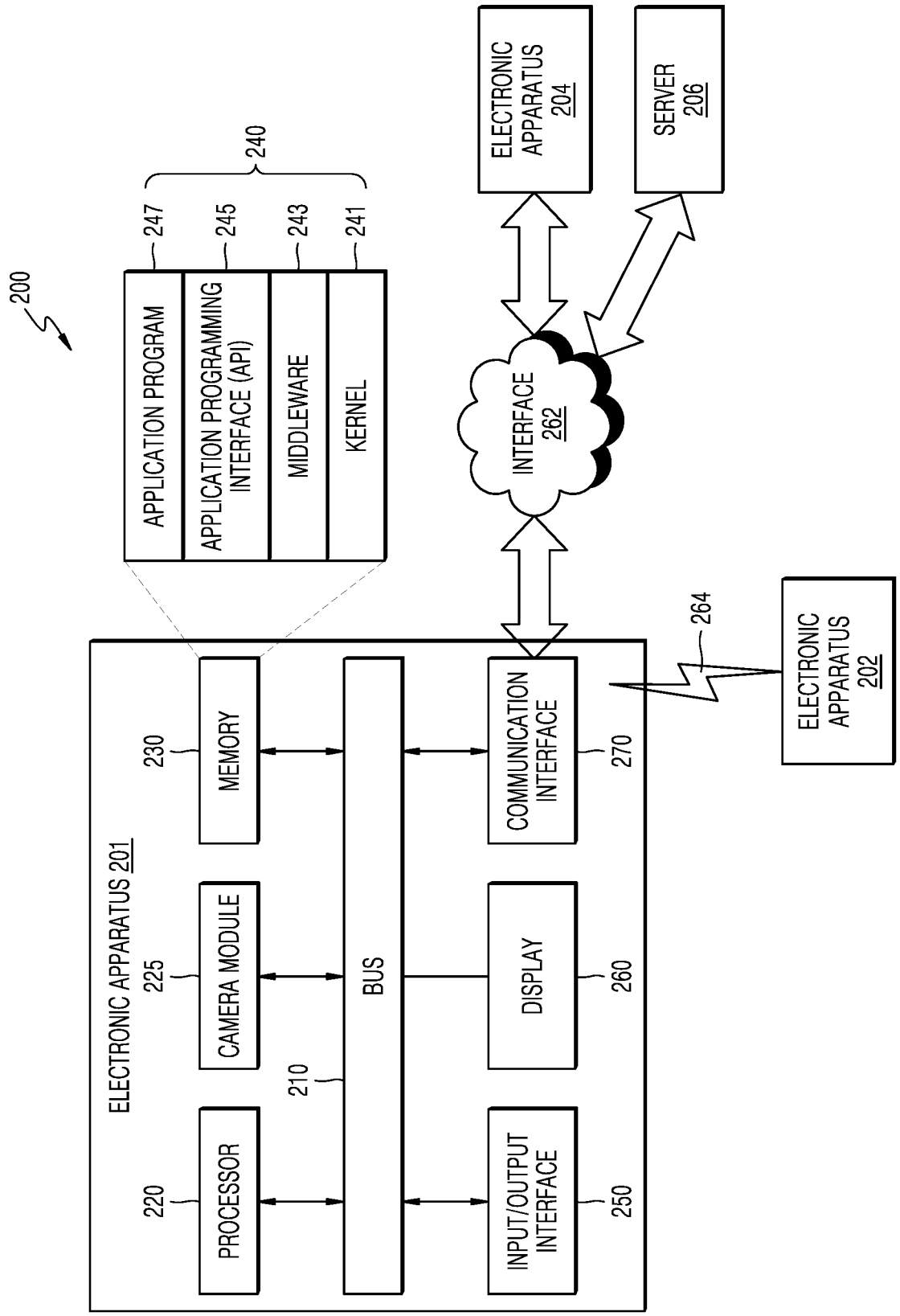
FIG. 23 is a block diagram of a network environment system according to various embodiments.

Referring to FIG. 23, an electronic apparatus 201 in a network environment 200, according to various embodiments is illustrated. The electronic apparatus 201 may include a bus 110, a processor 220, a camera module 225, memory 230, an input/output interface 250, a display 260, and a communication interface 270. In some embodiment, the electronic apparatus 201 may omit at least one of elements or may additionally include other elements.

The bus 210 may include a circuit that connects elements 210 to 270 and delivers communication (example: a control message and/or data) between the elements, for example.

The processor 220 may include one or more among a central processing unit (CPU), an application processor (AP), or a communication processor (CP). The processor 220 may perform an arithmetic operation or data processing regarding control and/or communication of at least other elements of the electronic apparatus 201, for example.

The camera module 225 that is an apparatus for imaging a still image and a video, for example, may include one or more image sensors (example: a front sensor or a rear sensor), a lens, an image signal processor (ISP), or a flash (example: a light-emitting diode (LED) or an xenon lamp, etc.), according to one embodiment. For example, an optical lens assembly according to various embodiments may be applied to the camera module 225.

The memory 230 may include volatile and/or non-volatile memory. The memory 230 may store instructions or data relating to at least one other element of the electronic apparatus 201, for example. According to one embodiment, the memory 230 may store software and/or a program 240. The program 240 may include a kernel 241, a middleware 243, an application programming interface (API) 245, and/or an application program (or an "application") 247, for example. At least a part of the kernel 241, the middleware 243, or the API 245 may be referred to as an operating system (OS).

The kernel 241 may control or manage system resources (example: the bus 210, the processor 220 or the memory 230, etc.) used to perform an operation or a function implemented in other programs (example: the middleware 243, the API 245, or the application program 247). Also, the kernel 241 may approach an individual element of the electronic apparatus 201 in the middleware 243, the API 245, or the application program 247, thereby providing an interface that may control or manage the system resources.

The middleware 243 may function as a mediator so that the API 245 or the application program 247 may communicate with the kernel 141 to exchange data, for example.

Also, the middleware 243 may process one or more work requests received from the application program 247 according to priorities of works. For example, the middleware 243 may assign priorities for using the system resources (example: the bus 210, the processor 220 or the memory 230, etc.) of the electronic apparatus 201 to at least one application program 247. For example, the middleware 243 may process the one or more work requests according to the priorities assigned to the at least one application program 247, thereby preforming scheduling or load balancing regarding the one or more work requests.

The API 245 that is an interface through which the application 247 controls a function provided by the kernel 241 or the middleware 243, for example, may include at least one interface or function (example: command) for file control, window control, image processing, text control, etc.

The input/output interface 250 may function as an interface that may deliver instructions or data input from a user or other external devices to other elements of the electronic apparatus 201. Also, the input/output interface 250 may output instructions or data received from other elements of the electronic apparatus 201 to the user or other external devices.

The display 260 may include a liquid crystal display (LCD), an LED display, an organic light-emitting diode (OLED) display, a microelectromechanical systems (MEMS) display, or an electronic paper, for example. The display 260 may display various contents (example: text, image, video, icon, or symbol, etc.) to the user, for example. The display 260 may include a touch screen and may receive touch using an electronic pen or the user's body part, gesture, proximity or hovering input, for example.

The communication interface 270 may set communication between the electronic apparatus 201 and an external apparatus (example: a first external electronic apparatus 202, a second external electronic apparatus 204, or a server 206), for example. For example, the communication interface 270 may be connected to a network 262 via wireless communication or wired communication to communicate with an external device (example: a second external electronic device 204 or a server 206).

In wireless communication, for example, at least one of long-term evolution (LTE), LTE Advance (LTE-A), code division multiple access (CDMA), wide band CDMA (WCDMA), universal mobile telecommunications system (UMTS), wireless broadband (WiBro), or global system for mobile communications (GSM) may be used as a cellular communication protocol. Also, wireless communication may include local area communication 264, for example. Local area communication 264 may include at least one of wireless fidelity (WiFi), Bluetooth, near field communication (NFC), or a global navigation satellite system (GNSS), for example. The GNSS may include at least one of a global positioning system (GPS), global navigation satellite system (Glonass), Beidou navigation satellite system (hereinafter, "Beidou") or Galileo, and an European global satellite-based navigation system according to a usage zone or bandwidth, etc. Hereinafter, in this document, "GPS" may be interchangeably used with "GNSS". Wired communication may include at least one of a universal serial bus (USB), a high definition multimedia interface (HDMI), a recommended standard-232 (RS-232), or plain old telephone service (POTS), for example. The network 262 may include at least one of a telecommunications network, for example, a computer network (example: LAN or WAN), an Internet, or a telephone network.

Each of first and second external electronic apparatuses 202 and 204 may be the same or different type of apparatus as or from the electronic apparatus 201. According to one embodiment, the server 206 may include one or more groups of servers. According to various embodiments, the whole or part of operations to be performed by the electronic apparatus 201 may be performed by another one or a plurality of electronic apparatuses (example: the electronic apparatuses 202 and 204 or the server 206). According to one embodiment, when the electronic apparatus 201 has to perform a function or service automatically or by a request, the electronic apparatus 201 may request at least a partial function relating to the function or service to other apparatuses (example: the electronic apparatuses 202 and 204, or the server 106) instead of performing the function or service or additionally. Other electronic apparatuses (example: the electronic apparatuses 202 and 204 or the server 106) may perform a requested function or an additional function and may deliver the result of performance to the electronic apparatus 201. The electronic apparatus 201 may process the result of reception without any change or additionally to provide the requested function or service. To this end, for example, a cloud computing technology, a distributed computing technology, or a client-server computing technology may be used.

Figure 24:
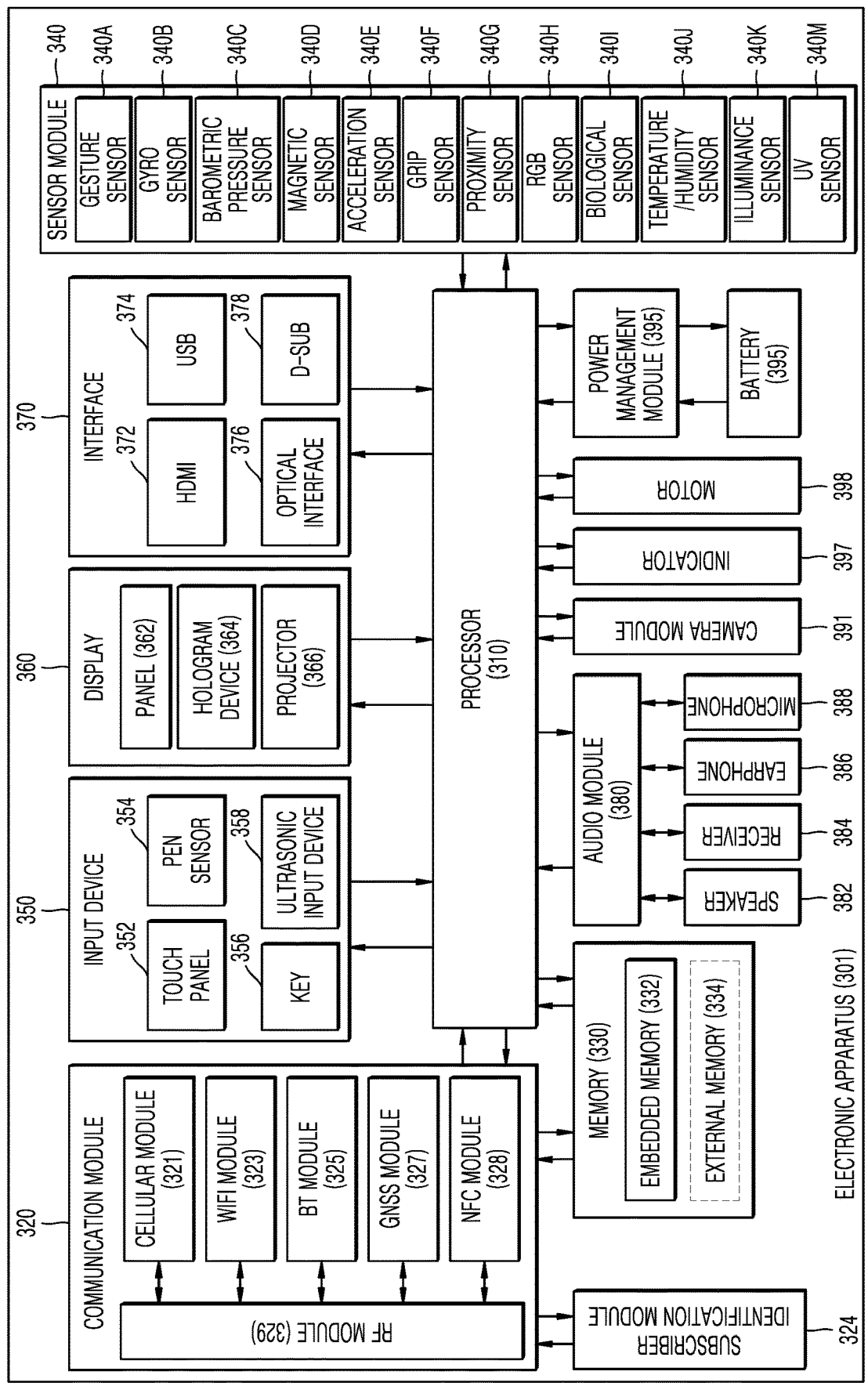
FIG. 24 is a block diagram of an electronic apparatus according to various embodiments.

FIG. 24 is a block diagram of an electronic apparatus 301 according to various embodiments. The electronic apparatus 301 may include the whole or part of the electronic apparatus 201 illustrated in FIG. 23, for example. The electronic apparatus 301 may include one or more processors 310 (example: an application processor (AP)), a communication module 320, a subscriber identification module 324, memory 330, a sensor module 340, an input device 350, a display 360, an interface 370, an audio module 380, a camera module 391, a power management module 395, a battery 396, an indicator 397, and a motor 398.

The processor 310 may control a plurality of hardware or software elements connected to the processor 310 by driving an operating system (OS) or an application program and may perform various data processing and arithmetic operations, for example. The processor 310 may be implemented with a system on chip (SOC), for example. According to one embodiment, the processor 310 may further include a graphic processing unit (GPU) and/or an image signal processor. The processor 310 may also include at least a part (example: the cellular module 321) of the elements illustrated in FIG. 23. The processor 310 may load and process instructions or data received from at least one of other elements (example: non-volatile memory) and may store various data in the non-volatile memory.

The communication module 320 may have the same or similar configuration as or to that of the communication interface 270 of FIG. 22. The communication module 320 may include the cellular module 321, a WiFi module 323, a Bluetooth module 325, a GNSS module 327 (example: a GPS module, a Glonass module, a Beidou module or a Galileo module), an NFC module 328, and a radio frequency (RF) module 329, for example.

The cellular module 321 may provide a voice call, a video call, a text service, or an Internet service, etc. via a communication network, for example. According to one embodiment, the cellular module 321 may perform identification and authorization of the electronic apparatus 301 in a communication network using the subscriber identification module (example: an SIM card) 324. According to one embodiment, the cellular module 221 may perform at least a part of functions provided by the processor 310. According to one embodiment, the cellular module 321 may include a communication processor (CP).

Each of the WiFi module 323, the Bluetooth module 325, the GNSS module 327, and the NFC module 328 may include a processor for processing data to be transmitted/received to/from a corresponding module, for example. In some embodiment, at least a part (example: two or more) of the cellular module 321, the WiFi module 323, the Bluetooth module 325, the GNSS module 327, and the NFC module 328 may be included in one integrated chip (IC) or an IC package.

The RF module 329 may transmit/receive communication signals (example: RF signals), for example. The RF module 329 may include a transceiver, a power amp module (PAM), a frequency filter, a low noise amplifier (LNA), or an antenna, for example. According to another embodiment, at least one of the cellular module 221, the WiFi module 323, the Bluetooth module 325, the GNSS module 327, and the NFC 328 may transmit/receive RF signals using a separate RF module.

The subscriber identification module 324 may include a card including a subscriber identification module and/or an embedded SIM, for example, and may include unique identification information (example: integrated circuit card identifier (ICCID)) or subscriber information (example: international mobile subscriber identity (IMSI).

The memory 330 (example: the memory 330) may include embedded memory 332 or external memory 334, for example. The embedded memory 332 may include at least one of volatile memory (example: dynamic RAM (DRAM), static RAM (SRAM), synchronous dynamic RAM (SDRAM), etc.), non-volatile memory (example: one time programmable ROM (OTPROM), programmable ROM (PROM), erasable and programmable ROM (EPROM), electrically erasable and programmable ROM (EEPROM)), mask ROM, flash ROM, flash memory (example: NAND flash or NOR flash, etc.), a hard drive, or a solid state drive (SSD), for example.

The external memory 334 may further include a flash drive, for example, compact flash (CF), secure digital (SD), micro secure digital (micro-SD), mini secure digital (mini-SD), extreme digital (xd), multi-media card (MMC) or a memory stick, etc. The external memory 334 may be functionally and/or physically connected to the electronic apparatus 301 via various interfaces.

The sensor module 340 may measure a physical amount or detect an operating state of the electronic apparatus 301 to convert the measured or detected information into electrical signals. The sensor module 340 may include at least one of a gesture sensor 340A, a gyro sensor 340B, a barometric pressure sensor 340C, a magnetic sensor 340D, an acceleration sensor 340E, a grip sensor 340F, a proximity sensor 340G, a color sensor 340H (example: a red, green, blue (RGB) sensor), a biosensor 340I, a temperature/humidity sensor 340J, an illuminance sensor 340K, and an ultra violet (UV) sensor 340M, for example. Additionally or alternatively, the sensor module 340 may include an E-nose sensor, an electromyography (EMG) sensor, an electroencephalogram (EEG) sensor, an electrocardiogram (ECG) sensor, an IR sensor, an iris sensor and/or a fingerprint sensor, for example. The sensor module 340 may further include a control circuit for controlling at least one sensor included in the sensor module 340. In some embodiment, the electronic apparatus 301 may further include a processor configured to control the sensor module 340 as a part of the processor 310 or separately to control the sensor module 340 while the processor 310 is in a sleep state.

The input device 350 may include a touch panel 352, a (digital) pen sensor 354, a key 356, or an ultrasonic input device 358, for example. At least one of an electrostatic touch panel, a resistive touch panel, an infrared touch panel, and an ultrasonic touch panel, for example, may be used as the touch panel 352. Also, the touch panel 352 may further include a control circuit. The touch panel 352 may further include a tactile layer to provide a tactile reaction to the user.

The (digital) pen sensor 354 may be a part of the touch panel 352 or may include an additional recognition sheet, for example. The key 356 may include a physical button, an optical key, or a keypad, for example. The ultrasonic input device 358 may detect ultrasonic waves generated in an input tool using a microphone (example: the microphone 388) to check data corresponding to the detected ultrasonic waves.

The display 360 (example: the display 360) may include a panel 362, a hologram device 364, or a projector 366. The panel 362 may further include the same or similar configuration as or to that of the display 260 of FIG. 21. The panel 362 may be implemented flexibly, transparently or wearably, for example. The panel 362 may also include the touch panel 352 and one module. According to one embodiment, the panel 362 may include a pressure sensor (or a force sensor) that may measure intensity of pressure against the user's touch. The pressure sensor may be implemented integrally with the touch panel 352 or as one or more sensors separately from the touch panel 352. The hologram device 364 may provide a stereoscopic image in the air using interference of light. The projector 366 may project light onto a screen to display an image. The screen may be placed inside or outside the electronic apparatus 301, for example. According to one embodiment, the display 360 may further include a control circuit for controlling the panel 362, the hologram device 364, or the projector 366.

The interface 370 may include an HDMI 372, a USB 374, an optical interface 376, or a D-subminiature (D-sub) 378, for example. The interface 370 may be included in the communication interface 370 illustrated in FIG. 22, for example. Additionally and alternatively, the interface 370 may include a mobile high-definition link (MHL) interface, a secure digital (SD) card/multi-media card (MMC) interface, or an infrared data association (IrDA) specification interface, for example.

The audio module 380 may convert sound and electrical signals interactively, for example. At least a part of elements of the audio module 380 may be included in the input/output interface 245 illustrated in FIG. 22, for example. The audio module 380 may process sound information to be input or output through a speaker 382, a receiver 384, an earphone 386 or a microphone 388.

The camera module 391 that is an apparatus capable of capturing a still image or a video, for example, may include one or more image sensors (example: a front sensor or rear sensor), a lens, an image signal processor (ISP), or a flash (example: an LED or an xenon lamp, etc.) according to one embodiment. For example, an optical lens assembly according to various embodiments may be applied to the camera module 391, for example.

The power management module 395 may manage power of the electronic apparatus 301, for example. The electronic apparatus 301 may be an electronic apparatus to which power is supplied via a battery. However, embodiments are not limited thereto. According to one embodiment, the power management module 395 may include a power management integrated circuit (PMIC), a charger integrated circuit (IC), a battery or fuel gauge. The PMIC may have a wired and/or wireless charging method. The wireless charging method may include a magnetic resonance method, a magnetic induction method or an electromagnetic method, for example, and may further include an additional circuit for wireless charging, for example, a coil loop, a resonance circuit, or a rectifier, etc. The battery gauge may measure the remnant amount of the battery 396, a voltage, a current, or a temperature during charging, for example. The battery 396 may include a rechargeable battery and/or a solar battery, for example.

The indicator 397 may indicate a particular state of the electronic apparatus 301 or a part thereof, for example, a booting state, a message state, or a charging state, etc. The motor 398 may convert electrical signals into mechanical vibration and may generate vibration or a haptic effect. Although not shown, the electronic apparatus 301 may include a processing device (example: GPU) for supporting a mobile TV. The processing device for supporting the mobile TV may process media data according to a specification of digital multimedia broadcasting (DMB), digital video broadcasting (DVB), or mediaFlo™, for example.

Each of elements described in this document may include one or more components, and names of the elements may change according to types of electronic apparatuses. In various embodiments, the electronic apparatus may include at least one of the elements described in this document and may omit a part of the elements or may further include other additional elements. Also, a part of the elements of the electronic apparatus according to various embodiments is combined to constitute one entity so that functions of the elements before being combined may be performed in the same way.

The term "module" used in this document may mean a unit including one or two or more combinations of hardware, software or firmware, for example. The "module" may be interchangeably used with the term, such as a unit, a logic, a logical block, a component, or a circuit, for example. The "module" may be a minimum unit or a part of integrally-configured components. The "module" may also be a minimum unit or a part for performing one or more functions. The "module" may be mechanically or electronically implemented. For example, the "module" may include at least one of an application-specific integrated circuit (ASIC) chip, field-programmable gate arrays (FPGAs) or a programmable-logic device to perform known operations or operations to be developed.

At least a part of an apparatus (example: modules or functions thereof) or a method (example: operations) according to various embodiments may be implemented with commands stored in a computer-readable storage media in the form of a computer module, for example. When the commands are executed by a processor (example: the processor 220 of FIG. 23), the one or more processors may perform functions corresponding to the commands. The computer-readable storage media may be the memory 230, for example.

The computer-readable storage media may include a hard disc, a floppy disc, a magnetic media (example: a magnetic tape), an optical media (example: compact disc read only memory (CD ROM), a digital versatile disc (DVD), magneto-optical media (example: a floptical disk), a hardware device (example: read only memory (ROM), random access memory (RAM), or flash memory, etc.), etc. Also, program instructions may include a machine language code made by a complier and a high-level language code that may be executed by a computer using an interpreter, etc. The above-described hardware device may be configured to operate as one or more software modules so as to perform an operation according to various embodiments, and vice versa. A module or program module according to various embodiments may include at least one or more of the above-described elements, may omit a part of the elements, or may further include other additional elements. Operations performed by the module, the program module or other elements according to various modules may be performed in a sequential, parallel, repetitive or heuristic way. Also, a part of operations may be performed in different orders, or may be omitted, or other operations may be added. Embodiments in this document are suggested for explanation and understanding of the disclosed technology and do not limit the scope of the technology described in this document.

It should be understood that embodiments described herein should be considered in a descriptive sense only and not for purposes of limitation. Descriptions of features or aspects within each embodiment should typically be considered as available for other similar features or aspects in other embodiments.

While embodiments of the claimed subject matter have been described with reference to the figures, it will be understood by those of ordinary skill in the art that various changes in form and details may be made therein without departing from the spirit and scope of the claimed subject matter as defined by the following claims.

What is claimed is:

1. An optical lens assembly comprising:
   a first lens, a second lens, a third lens, and a fourth lens which are sequentially arranged along an axis from an object side to an image side, wherein at least one of the first lens, second lens, third lens, and fourth lens comprises an object side surface having a planar central region, an image side surface having a planar central region, and a peripheral region having an aspherical surface, and wherein the at least one of the first lens, second lens, third lens, and fourth lens satisfies the following equation:

$$0.01 < \text{"}\varphi\text{flat-object"}/\varphi\text{full} < 0.5,$$

where φflat-object is a diameter of the planar central region of the object side surface, and φfull is an effective diameter of the at least one lens,
   wherein the third lens is spatially separated from the second lens and the fourth lens.

2. The optical lens assembly of claim 1, wherein the at least one of the first lens, second lens, third lens, and fourth lens satisfies the following equation:

$$0.01 < \text{"}\varphi\text{flat-image}/\varphi\text{full"} < 0.5,$$

wherein φflat-image is a diameter of the planar central region of the image side surface, and φfull is the effective diameter of the at least one lens.

3. The optical lens assembly of claim 1, further comprising:
   a fifth lens, arranged on the image side, and at least one of the third lens and the fourth lens comprises the object side surface having the planar central region, the image side surface having the planar central region, and the peripheral region having the aspherical surface.

4. The optical lens assembly of claim 1, further comprising:
   a fifth lens, and a sixth lens, which are sequentially arranged from fourth lens to the image side, and at least one of the first lens, the fourth lens, and the fifth lens comprises the object side surface having the planar central region, the image side surface having the planar central region, and the peripheral region having the aspherical surface.

5. The optical lens assembly of claim 1, further comprising:
   a fifth lens, a sixth lens, and a seventh lens, which are sequentially arranged from fourth lens to the image side, and the third lens comprises the object side surface having the planar central region, the image side surface having the planar central region, and the peripheral region having the aspherical surface.

6. The optical lens assembly of claim 1, wherein the first lens, second lens, third lens, and fourth lens comprise at least one aspherical lens.

7. The optical lens assembly of claim 1, wherein the first lens, second lens, third lens, and fourth lens comprise at least one plastic lens.

8. An optical lens assembly comprising:
a first lens, second lens, third lens, and fourth lens sequentially arranged along an axis from an object side to an image side, wherein at least one lens of the first lens, second lens, third lens, and fourth lens comprises an overall partial lens region having zero refractive power, and
the at least one lens satisfies the following equation:

$$0.01 < \text{"}\varphi\text{flat-object}/\varphi\text{full"} < 0.5,$$

where "φflat-object" is a diameter of an object side partial lens region of an object side surface of the at least one lens, and φfull is an effective diameter of the at least one lens,
wherein the third lens is spatially separated from the second lens and the fourth lens.

9. The optical lens assembly of claim 8, wherein the at least one lens of the first lens, second lens, third lens, and fourth lens, satisfies the following equation:
ti $0.01 < \text{"}\varphi\text{flat-image}/\varphi\text{full"} < 0.5$,
wherein φflat-image is a diameter of a partial lens region of the image side surface of the at least one lens, and φfull is the effective diameter of the at least one lens.

10. The optical lens assembly of claim 8, further comprising:
a fifth lens, between the fourth lens and the image side, and at least one of the third lens and the fourth lens comprises the overall partial lens region having no refractive power.

11. The optical lens assembly of claim 8, further comprising:
a fifth lens, and a sixth lens, which are sequentially arranged from the fourth lens to the image side, and at least one of the first lens, the fourth lens, and the fifth lens comprises a peripheral region including the overall partial lens region having no refractive power.

12. The optical lens assembly of claim 8, a fifth lens, a sixth lens, and a seventh lens, which are sequentially arranged from the fourth lens to the image side, and the third lens comprises a peripheral region including the overall partial lens region having no refractive power.

13. The optical lens assembly of claim 8 wherein a peripheral region of the partial lens region has a positive or negative refractive power.

14. The optical lens assembly of claim 8, wherein the first lens, second lens, third lens and fourth lens comprise at least one aspherical lens.

15. The optical lens assembly of claim 8, wherein the first lens, second lens, third lens, and fourth lens comprise at least one plastic lens.

16. An optical lens assembly comprising, in an order from an object side to an image side:
a first lens having positive refractive power;
a second lens having positive refractive power;
a third lens having negative refractive power;
a fourth lens;
a fifth lens; and
a sixth lens having negative refractive power,
wherein an overall central region of at least one of the fourth lens and the fifth lens has zero refractive power, and the at least one of the fourth lens and the fifth lens satisfies the following equation:

$$0.01 < \text{"}\varphi\text{flat-object}/\varphi\text{full"} < 0.5,$$

where φflat-object is a diameter of an object side central region of an object side surface of at least one of the fourth lens and the fifth lens, the object side central region being an object side portion of the overall central region having zero refractive power, and φfull is an effective diameter of the fifth lens.

17. The optical lens assembly of claim 16, wherein the optical lens assembly satisfies the following equation:

$$0.01 < \text{"}\varphi\text{flat-image}/\varphi\text{full"} < 0.5,$$

wherein φflat-image is a diameter of an image side central region of an image side surface of the overall central region having zero refractive power, and φfull is the effective diameter of the fifth lens.

18. The optical lens assembly of claim 16, wherein an aperture is provided between the first lens and the second lens or between the second lens and the third lens.

* * * * *

UNITED STATES PATENT AND TRADEMARK OFFICE
CERTIFICATE OF CORRECTION

PATENT NO. : 10,495,849 B2
APPLICATION NO. : 15/407323
DATED : December 3, 2019
INVENTOR(S) : Jeong-kil Shin et al.

It is certified that error appears in the above-identified patent and that said Letters Patent is hereby corrected as shown below:

In the Claims

Column 45, Claim 9, Line 29 should read as follows:
--...$0.01 < \text{"}\varphi\text{flat-image}/\varphi\text{full"} < 0.5$,...--

Signed and Sealed this
Seventh Day of January, 2020

Andrei Iancu
*Director of the United States Patent and Trademark Office*